(12) United States Patent
Agatsuma

(10) Patent No.: US 8,094,382 B2
(45) Date of Patent: Jan. 10, 2012

(54) ZOOM LENS SYSTEM AND ELECTRONIC IMAGING DEVICE USING THE SAME

(75) Inventor: Ken Agatsuma, Tokyo (JP)

(73) Assignee: Hoya Corporation, Tokyo (JP)

( * ) Notice: Subject to any disclaimer, the term of this patent is extended or adjusted under 35 U.S.C. 154(b) by 250 days.

(21) Appl. No.: 12/621,752

(22) Filed: Nov. 19, 2009

(65) Prior Publication Data

US 2010/0128364 A1 May 27, 2010

(30) Foreign Application Priority Data

Nov. 26, 2008 (JP) ................................. 2008-300327
Aug. 24, 2009 (JP) ................................. 2009-193296

(51) Int. Cl.
*G02B 15/14* (2006.01)
(52) U.S. Cl. ........................................ 359/689; 359/784
(58) Field of Classification Search .................. 359/689, 359/784
See application file for complete search history.

(56) References Cited

U.S. PATENT DOCUMENTS

| 7,324,289 | B2 * | 1/2008 | Iijima ........................... 359/689 |
| 2001/0013980 | A1 | 8/2001 | Kohno et al. |
| 2002/0008920 | A1 | 1/2002 | Mihara et al. |
| 2005/0036209 | A1 | 2/2005 | Iwasawa et al. |
| 2005/0057816 | A1 | 3/2005 | Sato |
| 2005/0057818 | A1 | 3/2005 | Sato |
| 2005/0057821 | A1 | 3/2005 | Sato |
| 2005/0063070 | A1 | 3/2005 | Watanabe et al. |
| 2007/0217027 | A1 | 9/2007 | Iijima |
| 2009/0034090 | A1 | 2/2009 | Eguchi |
| 2009/0034092 | A1 | 2/2009 | Eguchi |
| 2009/0244719 | A1 | 10/2009 | Nakamura et al. |
| 2009/0257132 | A1 | 10/2009 | Hayakawa et al. |
| 2009/0273849 | A1 | 11/2009 | Nakamura et al. |

FOREIGN PATENT DOCUMENTS

| JP | 2002-48975 | 2/2002 |
| JP | 2005-37727 | 2/2005 |
| JP | 2005-84647 | 3/2005 |
| JP | 2005-84648 | 3/2005 |
| JP | 2005-84649 | 3/2005 |
| JP | 2005-99091 | 4/2005 |
| JP | 2006-276897 | 10/2006 |
| JP | 2007-286577 | 11/2007 |

\* cited by examiner

*Primary Examiner* — Joseph P Martinez
(74) *Attorney, Agent, or Firm* — Greenblum & Bernstein P.L.C.

(57) ABSTRACT

A zoom lens system includes a negative first lens group, a positive second lens group and a positive third lens group, in this order from the object. The second lens group includes a cemented lens having a positive first lens element and a negative second lens element, and a meniscus lens element having the concave surface facing toward the image. The zoom lens system satisfies the following conditions:

$$-0.4 < f23/f24 < 0.4 \quad (1)$$

$$0.7 < f3/ft < 1.3 \quad (2)$$

wherein
f23: the combined focal length of the cemented lens;
f24: the focal length of the meniscus lens element;
f3: the focal length of the third lens group; and
ft: the focal length of the zoom lens system at the long focal length extremity.

8 Claims, 37 Drawing Sheets

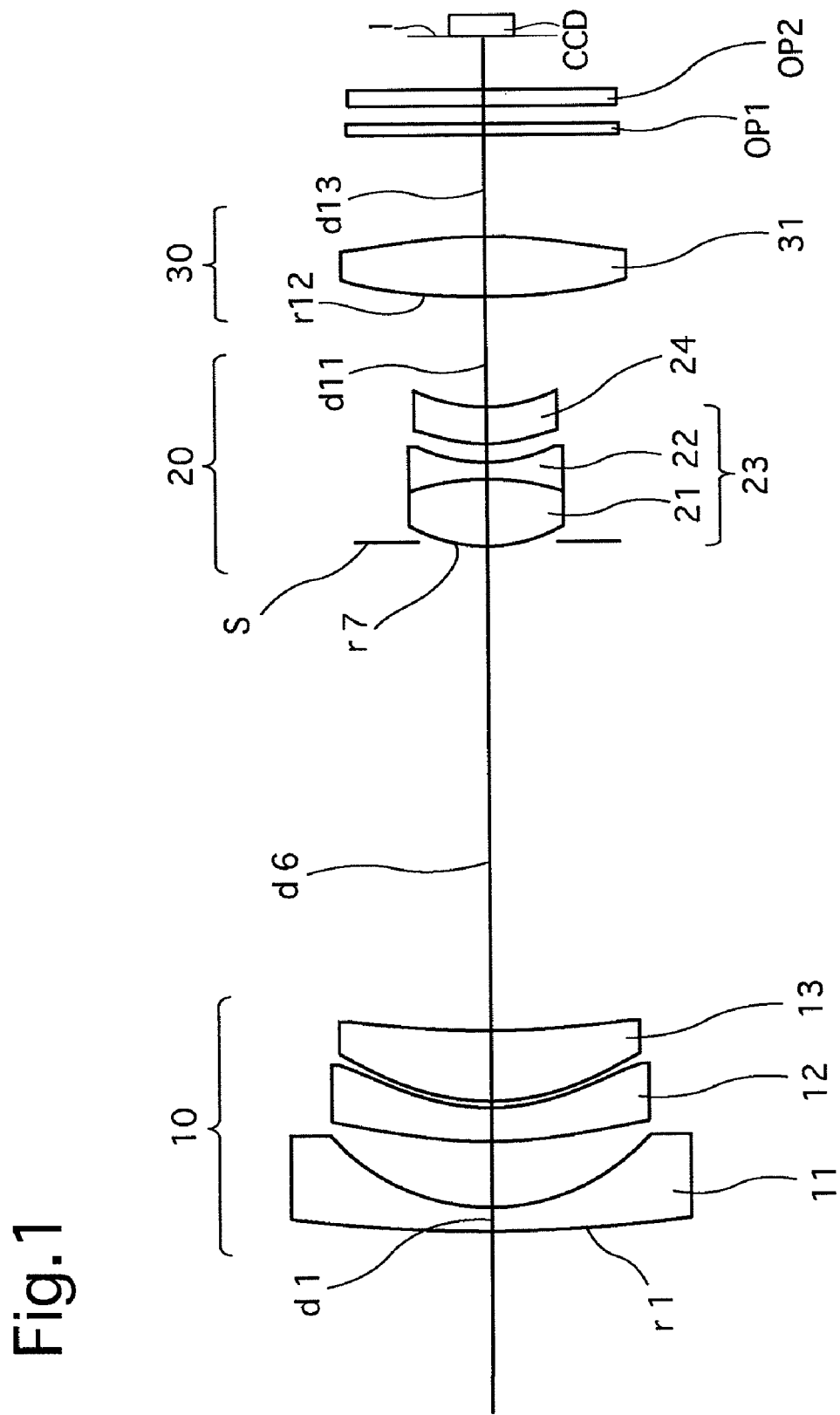

FNO.= 1: 2.6

—— d Line
······ g Line
---- C Line

-0.1   0.1
SPHERICAL
ABERRATION

CHROMATIC
ABERRATION

W= 39.8

-0.01  0.01
LATERAL
CHROMATIC
ABERRATION

W= 39.8

—— S
-- M

-0.1   0.1
ASTIGMATISM

W= 39.8

-10   10 %
DISTORTION

FNO.= 1: 3.7

—— d Line
······ g Line
---- C Line

-0.1   0.1
SPHERICAL
ABERRATION

CHROMATIC
ABERRATION

W= 22.9

-0.01  0.01
LATERAL
CHROMATIC
ABERRATION

W= 22.9

—— S
-- M

-0.1   0.1
ASTIGMATISM

W= 22.9

-10   10 %
DISTORTION

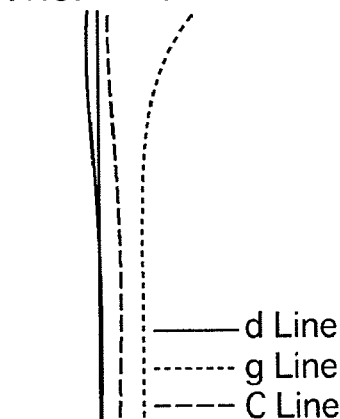

FNO.= 1: 2.7

—— d Line
······ g Line
---- C Line

-0.1  0.1
SPHERICAL
ABERRATION
CHROMATIC
ABERRATION

W= 39.7

-0.01  0.01
LATERAL
CHROMATIC
ABERRATION

W= 39.7

—— S
-- M

-0.1  0.1
ASTIGMATISM

W= 39.7

-10  10 %
DISTORTION

FNO.= 1: 3.8

—— d Line
······ g Line
---- C Line

-0.1  0.1
SPHERICAL
ABERRATION
CHROMATIC
ABERRATION

W= 22.9

-0.01  0.01
LATERAL
CHROMATIC
ABERRATION

W= 22.9

—— S
-- M

-0.1  0.1
ASTIGMATISM

W= 22.9

-10  10 %
DISTORTION

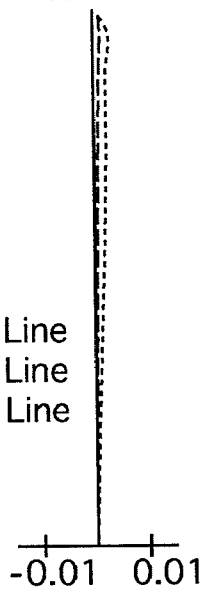
Fig. 8A
FNO.= 1: 6.0
——— d Line
------- g Line
-- -- C Line
-0.1  0.1
SPHERICAL
ABERRATION
CHROMATIC
ABERRATION
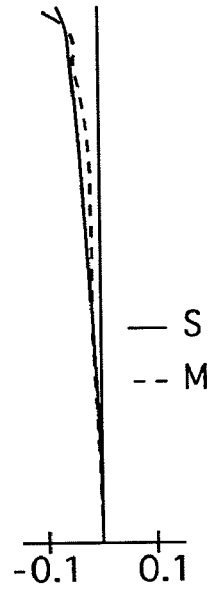
Fig. 8B
W= 11.6
-0.01  0.01
LATERAL
CHROMATIC
ABERRATION
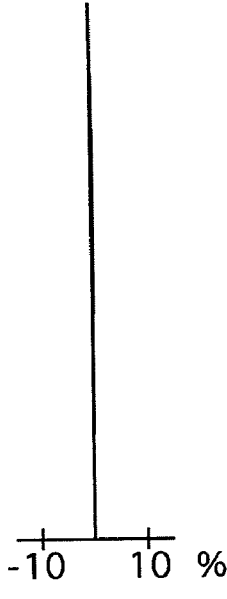
Fig. 8C
W= 11.6
— S
-- M
-0.1  0.1
ASTIGMATISM
Fig. 8D
W= 11.6
-10  10 %
DISTORTION

FNO.= 1: 2.6

-0.1  0.1
SPHERICAL
ABERRATION
CHROMATIC
ABERRATION

W= 39.8

-0.01  0.01
LATERAL
CHROMATIC
ABERRATION

W= 39.8

— S
-- M

-0.1  0.1
ASTIGMATISM

W= 39.8

-10  10 %
DISTORTION

FNO.= 1: 3.7

-0.1  0.1
SPHERICAL
ABERRATION
CHROMATIC
ABERRATION

W= 22.9

-0.01  0.01
LATERAL
CHROMATIC
ABERRATION

W= 22.9

— S
-- M

-0.1  0.1
ASTIGMATISM

W= 22.9

-10  10 %
DISTORTION

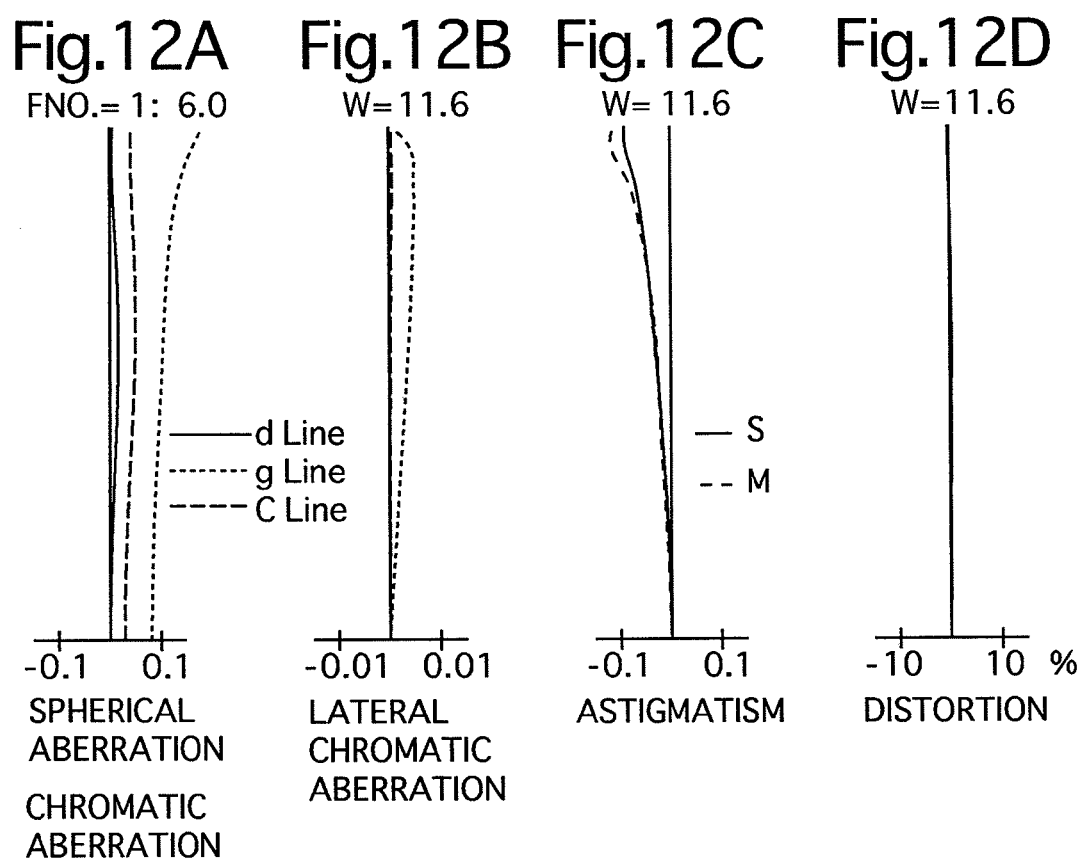

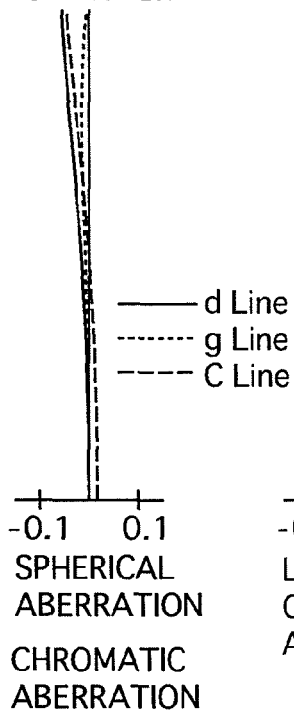
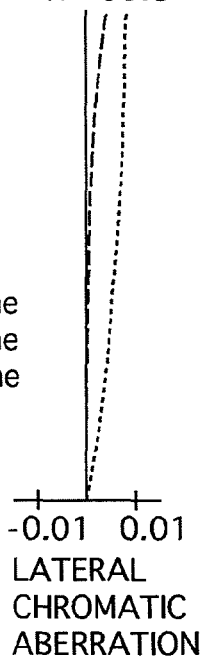
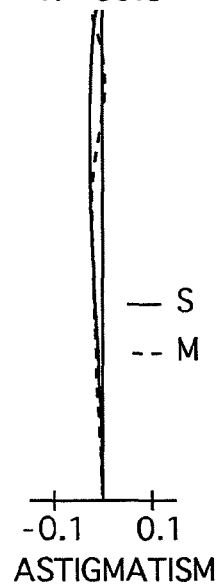
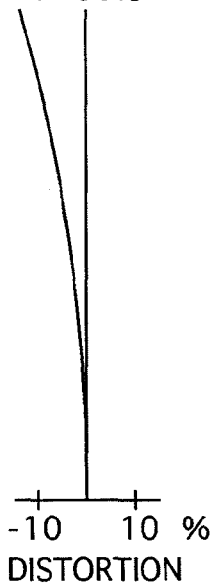
Fig.14A FNO.= 1: 2.7 — SPHERICAL ABERRATION CHROMATIC ABERRATION
Fig.14B W= 39.8 — LATERAL CHROMATIC ABERRATION
Fig.14C W= 39.8 — ASTIGMATISM
Fig.14D W= 39.8 — DISTORTION
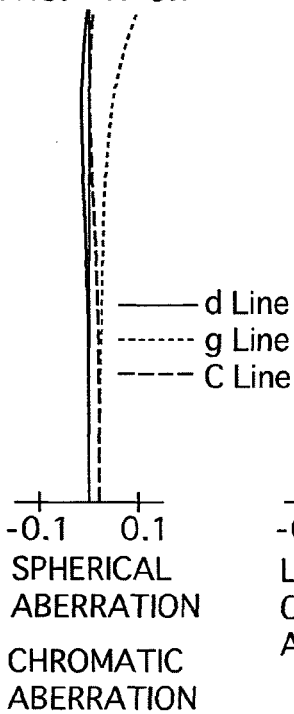
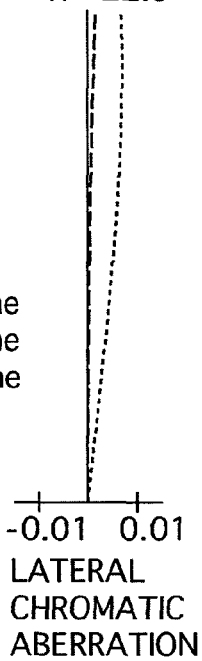
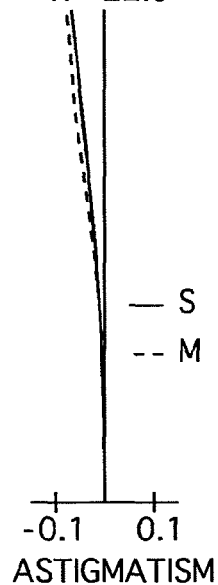
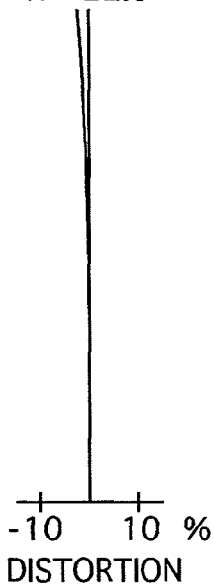
Fig.15A FNO.= 1: 3.7 — SPHERICAL ABERRATION CHROMATIC ABERRATION
Fig.15B W= 22.9 — LATERAL CHROMATIC ABERRATION
Fig.15C W= 22.9 — ASTIGMATISM
Fig.15D W= 22.9 — DISTORTION

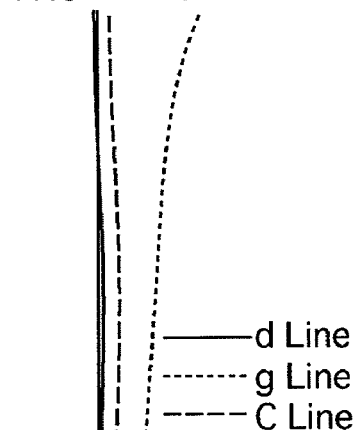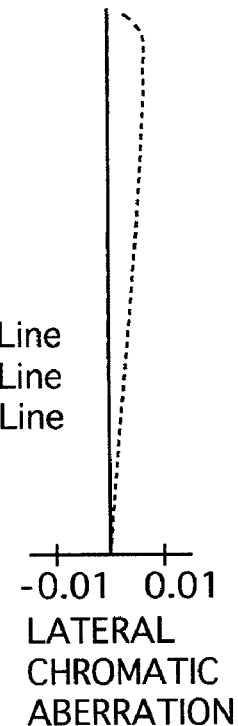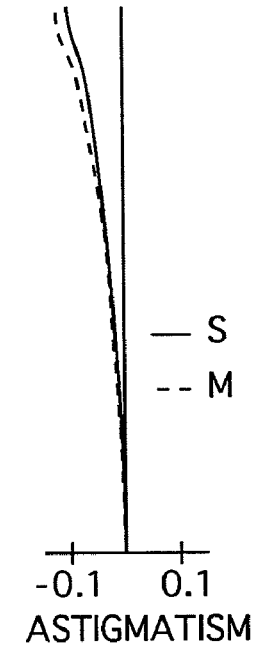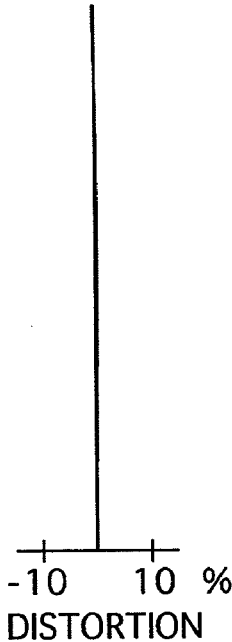
Fig.16A  FNO.= 1: 5.9
-0.1  0.1
SPHERICAL ABERRATION
CHROMATIC ABERRATION
— d Line
-- g Line
---- C Line
Fig.16B  W= 11.6
-0.01  0.01
LATERAL CHROMATIC ABERRATION
Fig.16C  W= 11.6
-0.1  0.1
ASTIGMATISM
— S
-- M
Fig.16D  W= 11.6
-10  10 %
DISTORTION

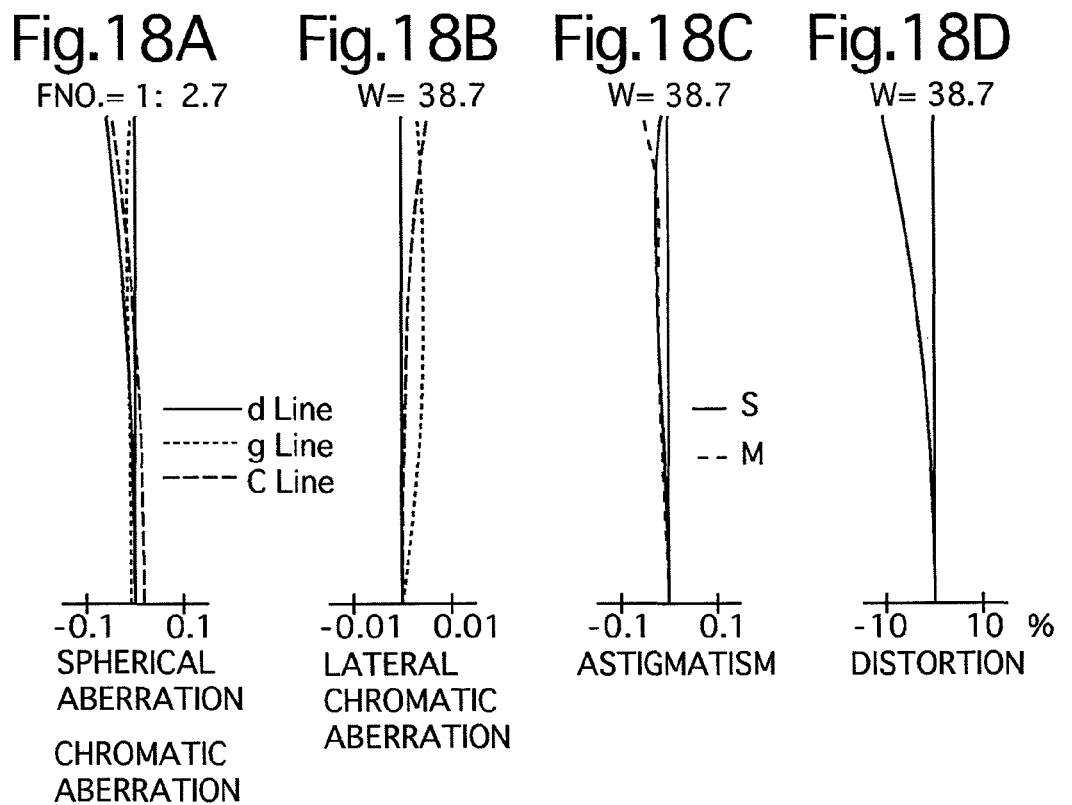
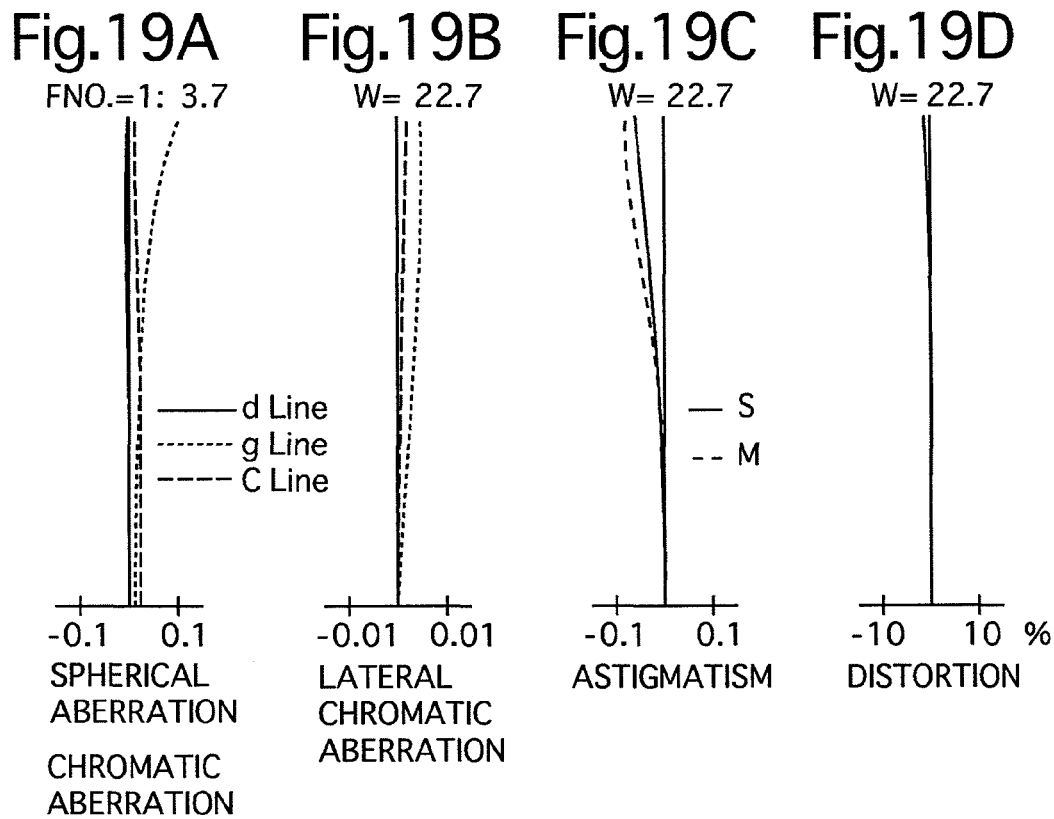

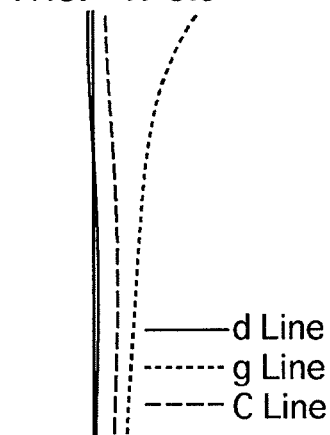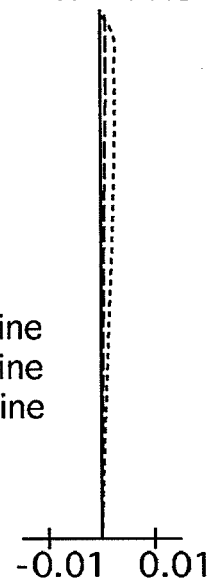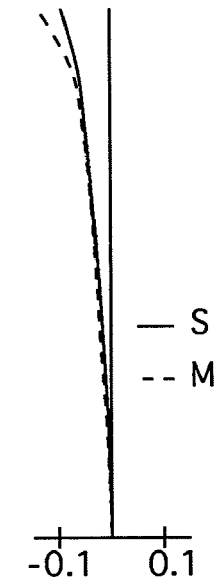

FNO.= 1: 2.7

-0.1　0.1
SPHERICAL
ABERRATION
CHROMATIC
ABERRATION

— d Line
······ g Line
---- C Line

W= 38.7

-0.01　0.01
LATERAL
CHROMATIC
ABERRATION

W= 38.7

-0.1　0.1
ASTIGMATISM

— S
-- M

W= 38.7

-10　10 %
DISTORTION

FNO.= 1: 3.7

-0.1　0.1
SPHERICAL
ABERRATION
CHROMATIC
ABERRATION

— d Line
······ g Line
---- C Line

W= 22.6

-0.01　0.01
LATERAL
CHROMATIC
ABERRATION

W= 22.6

-0.1　0.1
ASTIGMATISM

— S
-- M

W= 22.6

-10　10 %
DISTORTION

Fig.24A
FNO.= 1: 5.9
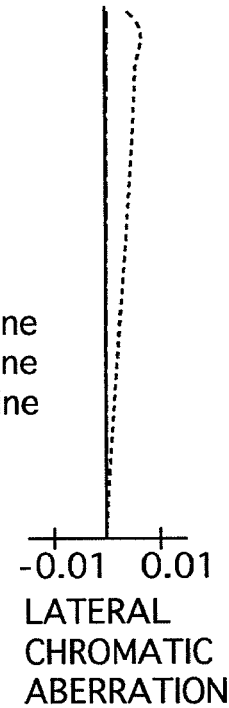
— d Line
----- g Line
-·-·- C Line
-0.1  0.1
SPHERICAL
ABERRATION
CHROMATIC
ABERRATION
Fig.24B
W= 11.4
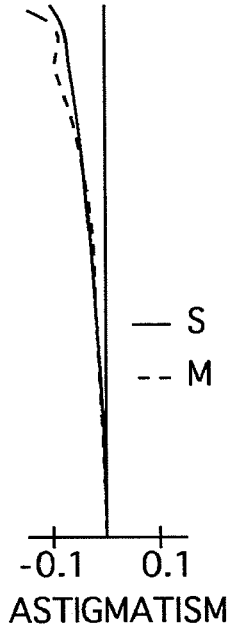
-0.01  0.01
LATERAL
CHROMATIC
ABERRATION
Fig.24C
W= 11.4
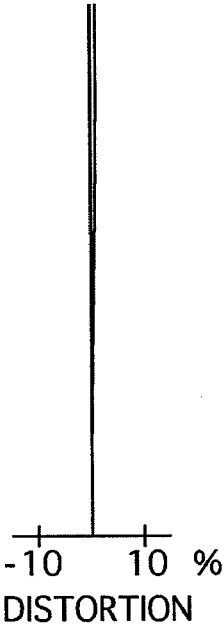
— S
-- M
-0.1  0.1
ASTIGMATISM
Fig.24D
W= 11.4
-10  10 %
DISTORTION

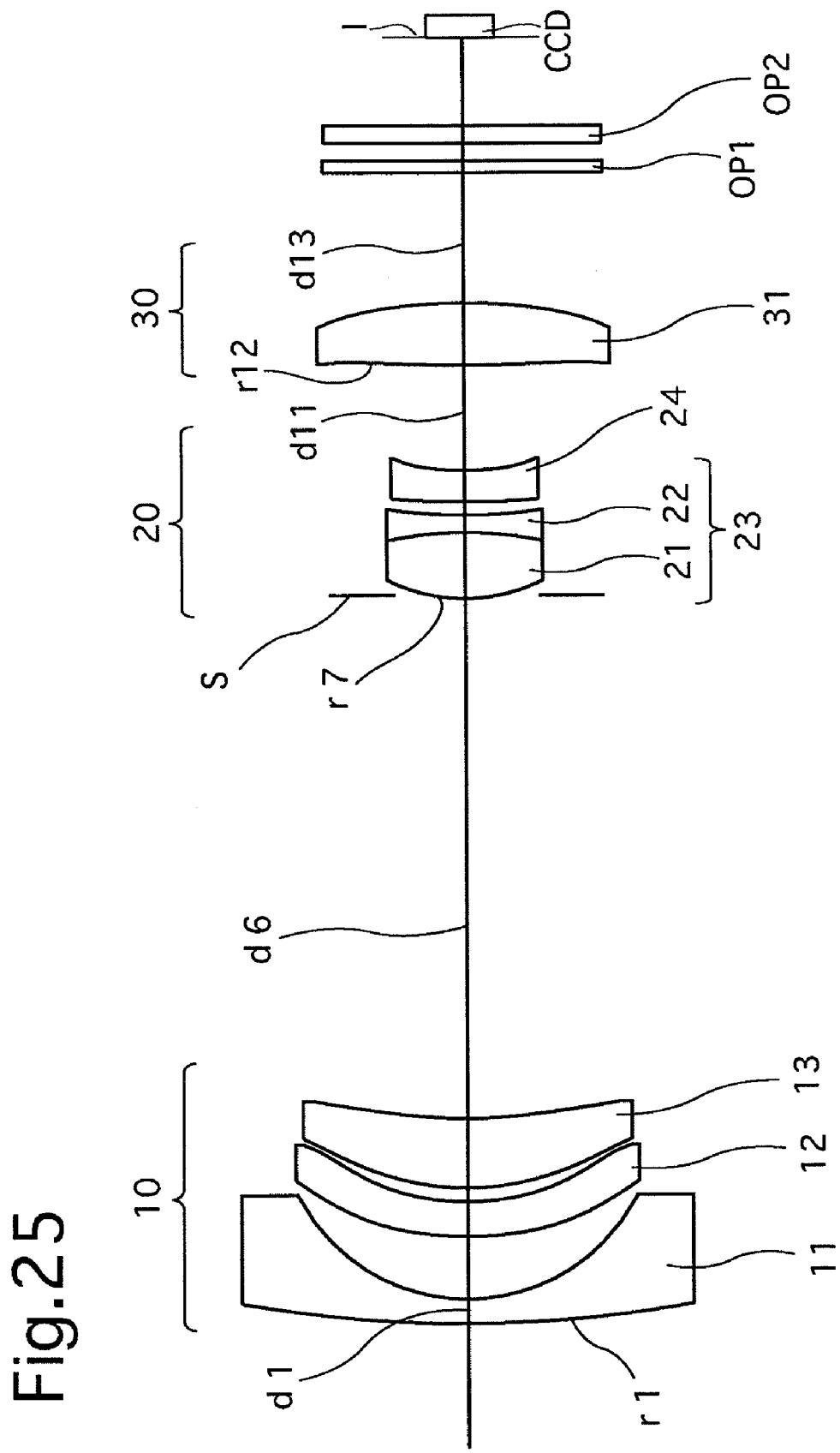

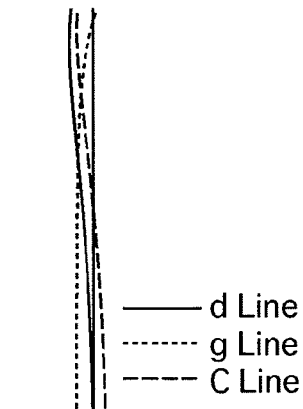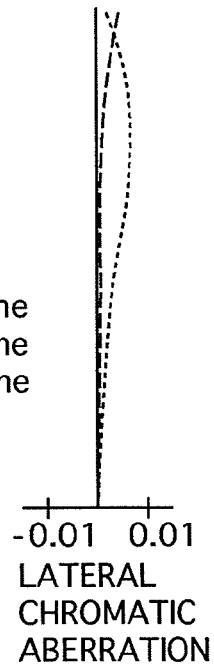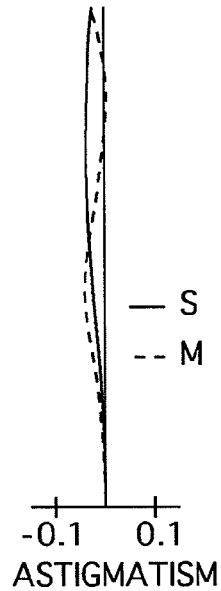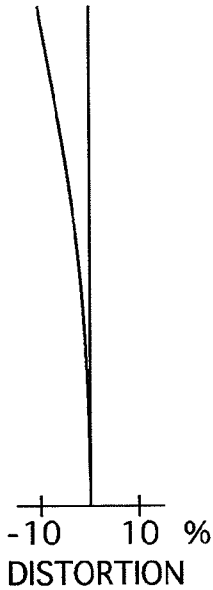
Fig.26A
FNO.= 1: 2.7
Fig.26B
W= 38.7
Fig.26C
W= 38.7
Fig.26D
W= 38.7
— d Line
······ g Line
--- C Line
— S
-- M
-0.1  0.1
SPHERICAL
ABERRATION
CHROMATIC
ABERRATION
-0.01  0.01
LATERAL
CHROMATIC
ABERRATION
-0.1  0.1
ASTIGMATISM
-10  10 %
DISTORTION
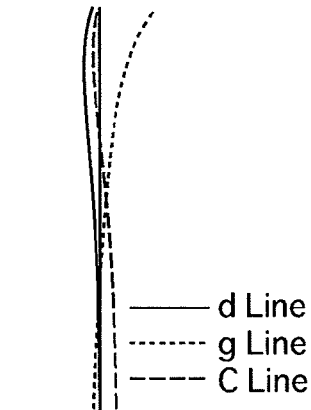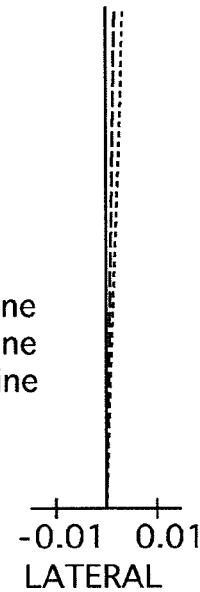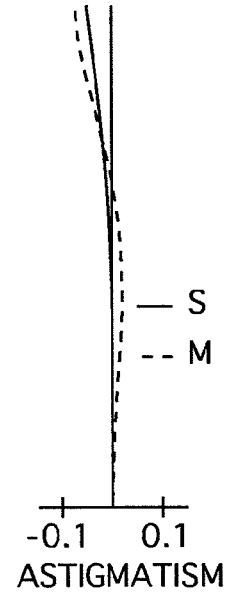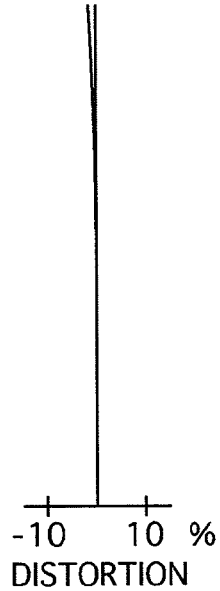
Fig.27A
FNO.= 1: 3.7
Fig.27B
W= 22.8
Fig.27C
W= 22.8
Fig.27D
W= 22.8
— d Line
······ g Line
--- C Line
— S
-- M
-0.1  0.1
SPHERICAL
ABERRATION
CHROMATIC
ABERRATION
-0.01  0.01
LATERAL
CHROMATIC
ABERRATION
-0.1  0.1
ASTIGMATISM
-10  10 %
DISTORTION

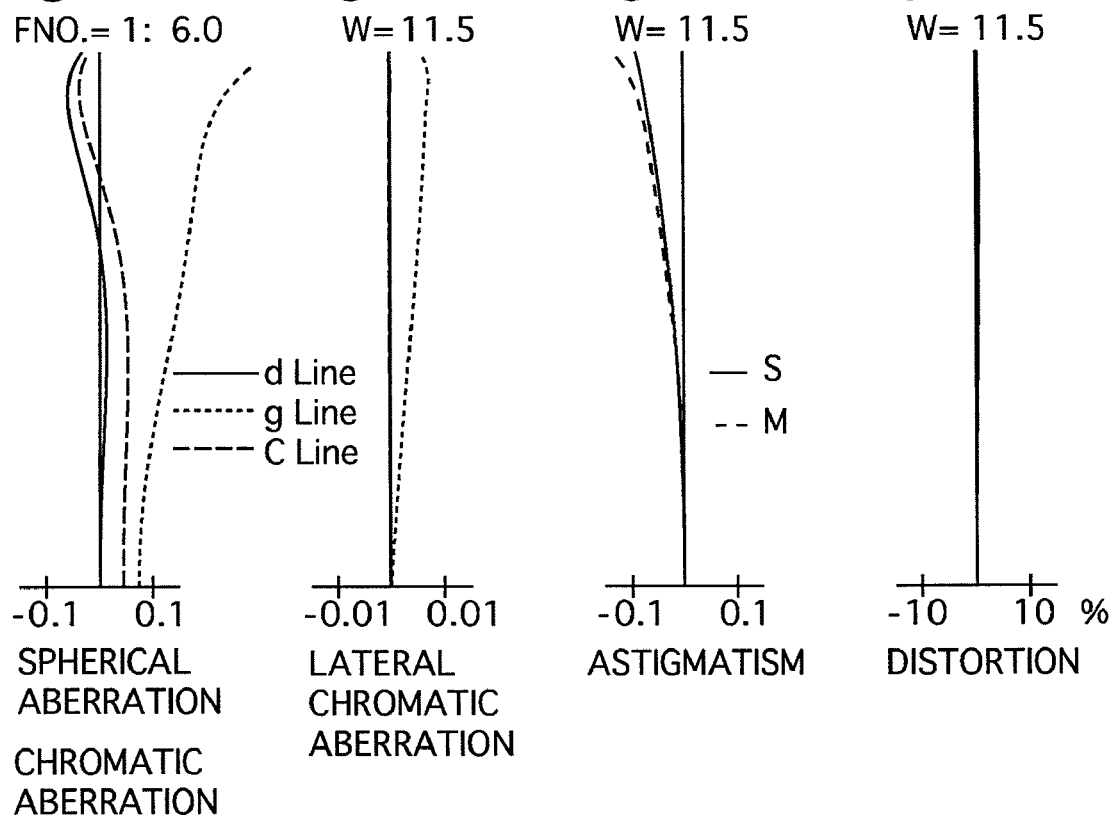

FNO.= 1: 2.6

—— d Line
······· g Line
---- C Line

-0.1  0.1
SPHERICAL
ABERRATION
CHROMATIC
ABERRATION

W= 39.9

-0.01  0.01
LATERAL
CHROMATIC
ABERRATION

W= 39.9

—— S
-- M

-0.1  0.1
ASTIGMATISM

W= 39.9

-10  10 %
DISTORTION

FNO.= 1: 3.7

—— d Line
······· g Line
---- C Line

-0.1  0.1
SPHERICAL
ABERRATION
CHROMATIC
ABERRATION

W= 22.6

-0.01  0.01
LATERAL
CHROMATIC
ABERRATION

W= 22.6

—— S
-- M

-0.1  0.1
ASTIGMATISM

W= 22.6

-10  10 %
DISTORTION

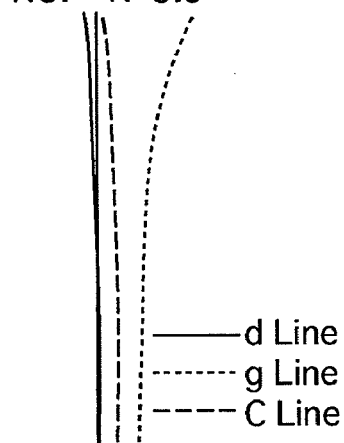
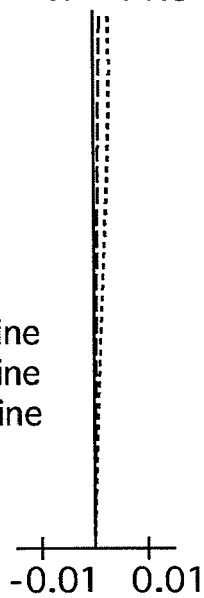
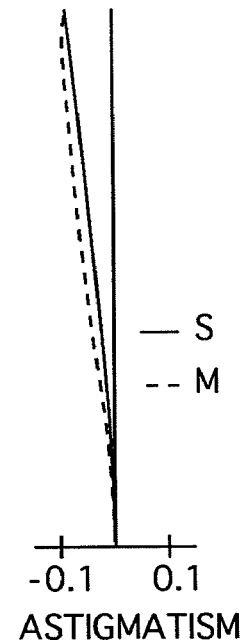
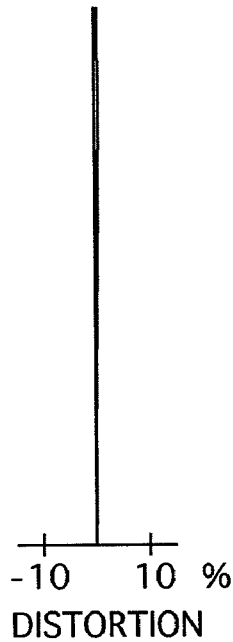
Fig.32A FNO.= 1: 5.9
SPHERICAL ABERRATION
CHROMATIC ABERRATION
Fig.32B W= 11.5
LATERAL CHROMATIC ABERRATION
Fig.32C W= 11.5
ASTIGMATISM
Fig.32D W= 11.5
DISTORTION

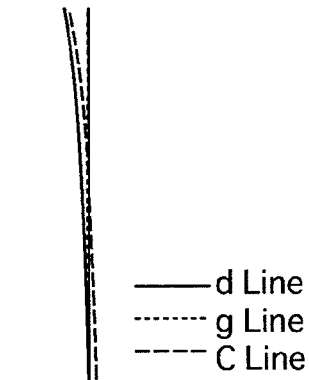
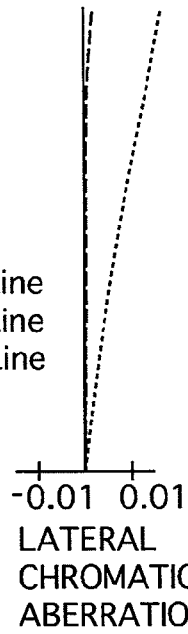
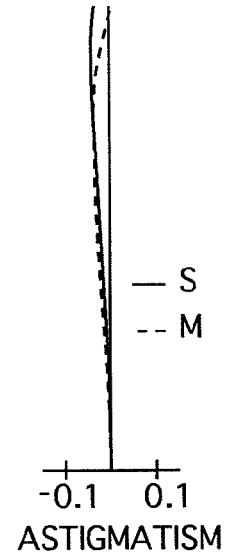
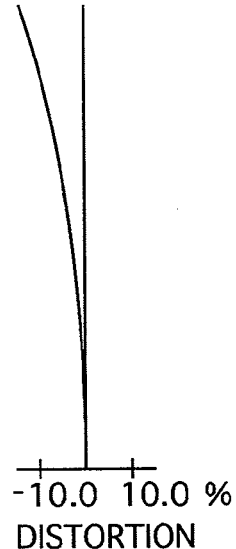
Fig.34A FNO.=1:2.7 — SPHERICAL ABERRATION CHROMATIC ABERRATION
Fig.34B W=39.9 — LATERAL CHROMATIC ABERRATION
Fig.34C W=39.9 — ASTIGMATISM
Fig.34D W=39.9 — DISTORTION
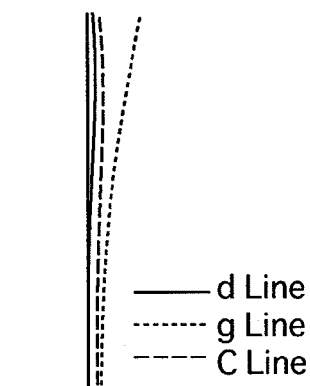
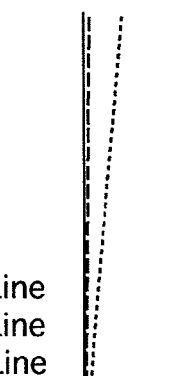
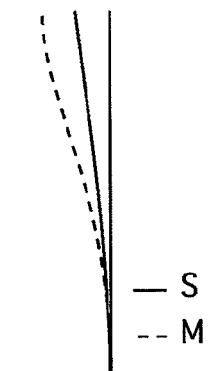
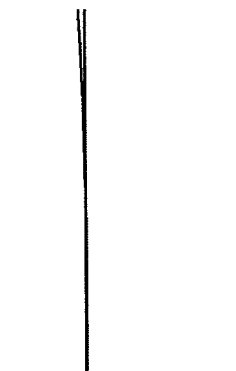
Fig.35A FNO.=1:3.7 — SPHERICAL ABERRATION CHROMATIC ABERRATION
Fig.35B W=22.8 — LATERAL CHROMATIC ABERRATION
Fig.35C W=22.8 — ASTIGMATISM
Fig.35D W=22.8 — DISTORTION

FNO.=1:5.9

—— d Line
······· g Line
--- C Line

-0.1  0.1
SPHERICAL
ABERRATION
CHROMATIC
ABERRATION

W=11.6

-0.01  0.01
LATERAL
CHROMATIC
ABERRATION

W=11.6

—— S
-- M

-0.1  0.1
ASTIGMATISM

W=11.6

-10.0  10.0 %
DISTORTION

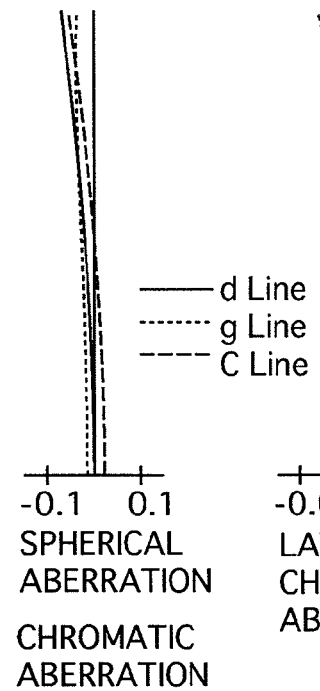
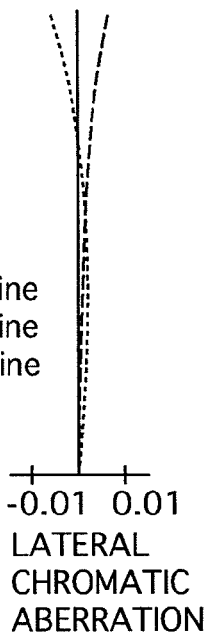
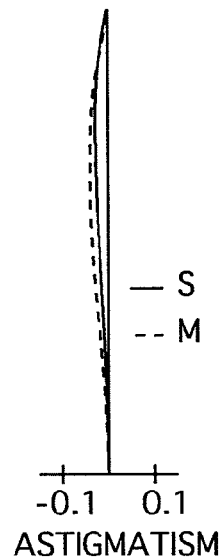
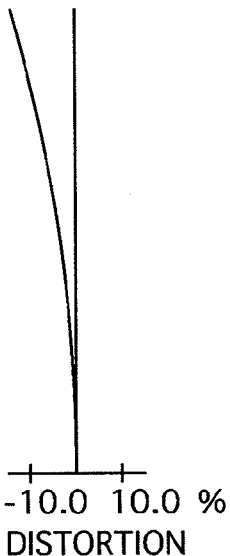
Fig.38A FNO.=1:2.7 — SPHERICAL ABERRATION CHROMATIC ABERRATION (d Line, g Line, C Line), -0.1 to 0.1
Fig.38B W=39.9 — LATERAL CHROMATIC ABERRATION, -0.01 to 0.01
Fig.38C W=39.9 — ASTIGMATISM (S, M), -0.1 to 0.1
Fig.38D W=39.9 — DISTORTION, -10.0 to 10.0 %
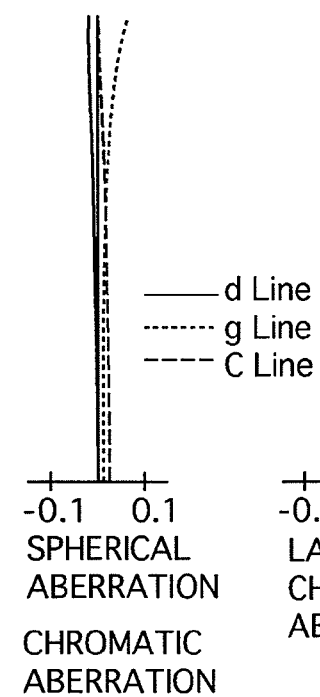
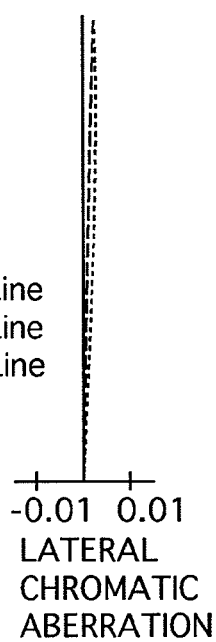
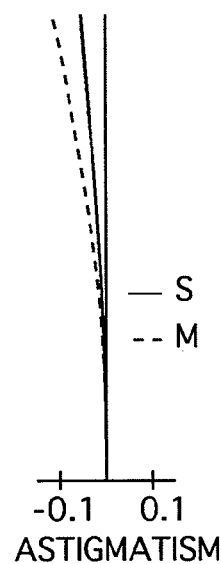
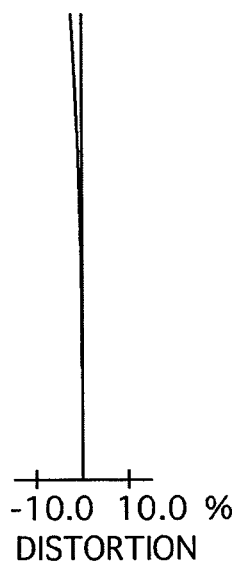
Fig.39A FNO.=1:3.7 — SPHERICAL ABERRATION CHROMATIC ABERRATION (d Line, g Line, C Line), -0.1 to 0.1
Fig.39B W=22.9 — LATERAL CHROMATIC ABERRATION, -0.01 to 0.01
Fig.39C W=22.9 — ASTIGMATISM (S, M), -0.1 to 0.1
Fig.39D W=22.9 — DISTORTION, -10.0 to 10.0 %

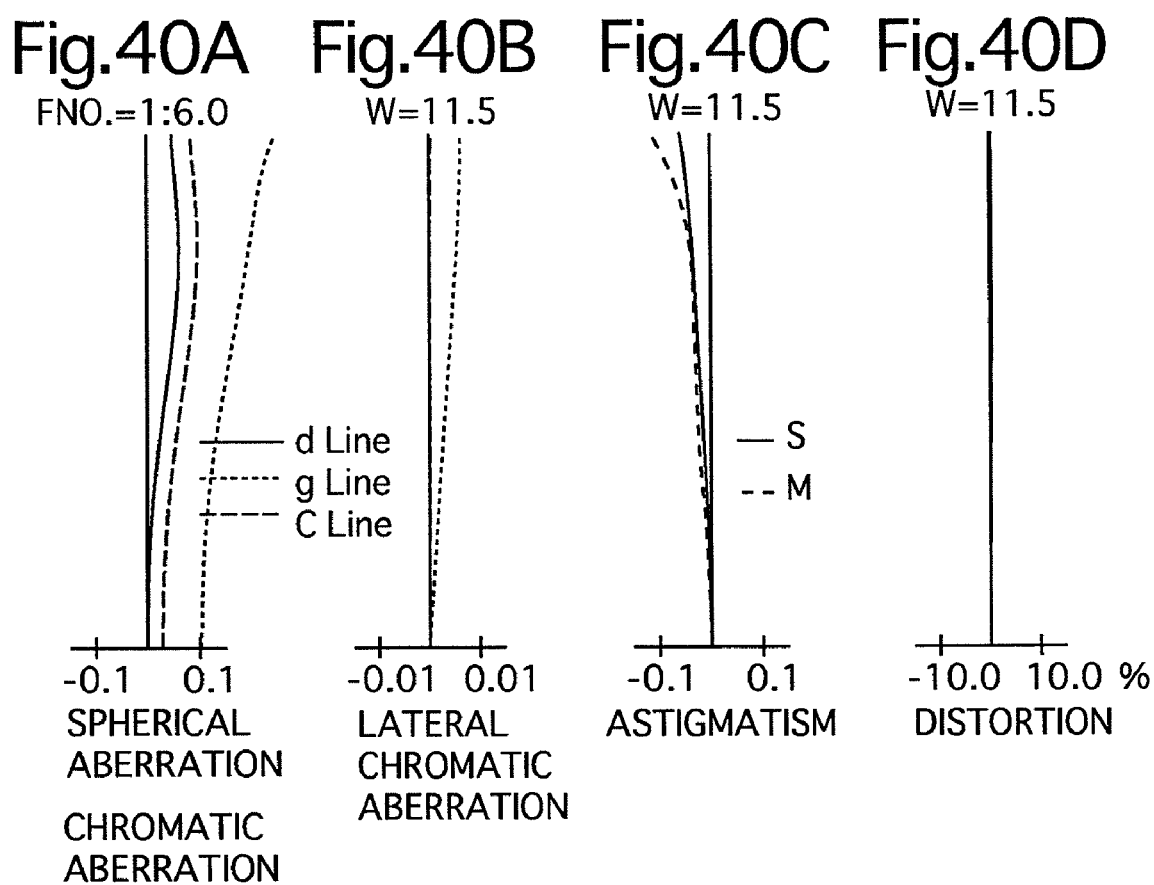

FNO.=1:2.7

-0.1  0.1
SPHERICAL
ABERRATION

CHROMATIC
ABERRATION

— d Line
······ g Line
---- C Line

W=39.6

-0.01  0.01
LATERAL
CHROMATIC
ABERRATION

W=39.6

-0.1  0.1
ASTIGMATISM

— S
-- M

W=39.6

-10.0  10.0 %
DISTORTION

FNO.=1:3.7

-0.1  0.1
SPHERICAL
ABERRATION

CHROMATIC
ABERRATION

— d Line
······ g Line
---- C Line

W=22.5

-0.01  0.01
LATERAL
CHROMATIC
ABERRATION

W=22.5

-0.1  0.1
ASTIGMATISM

— S
-- M

W=22.5

-10.0  10.0 %
DISTORTION

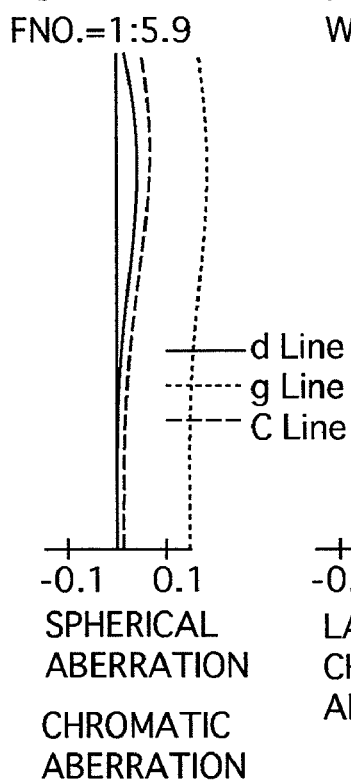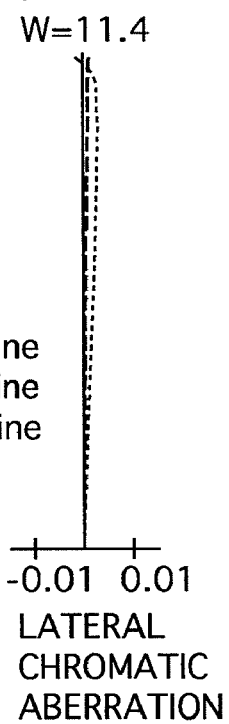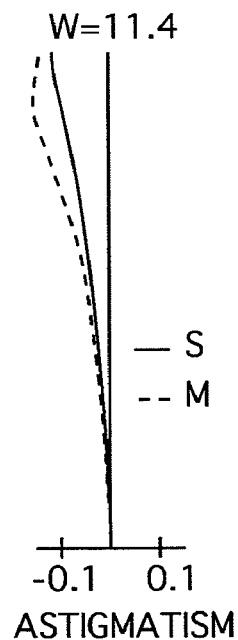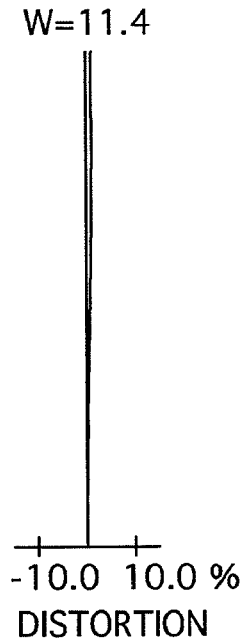

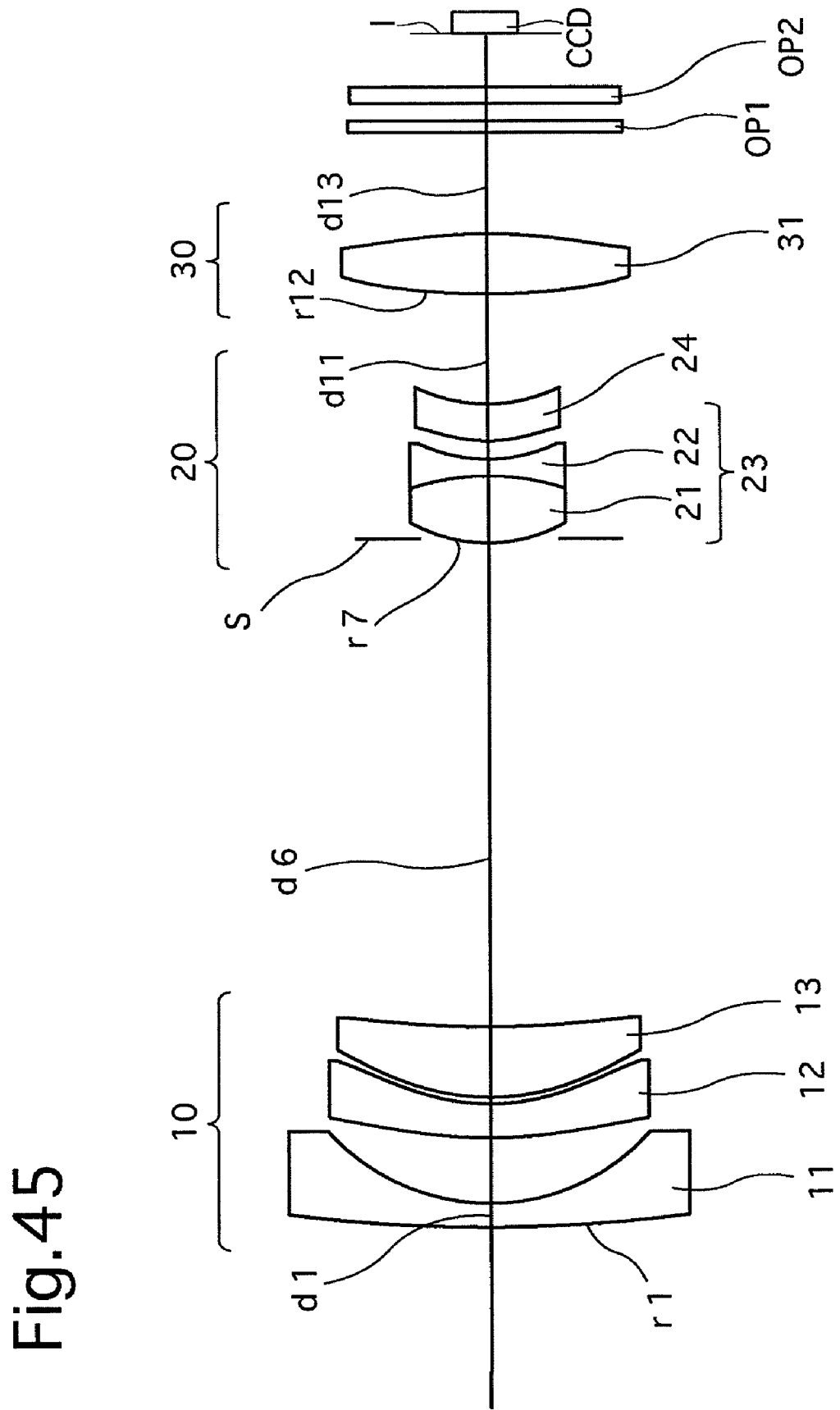

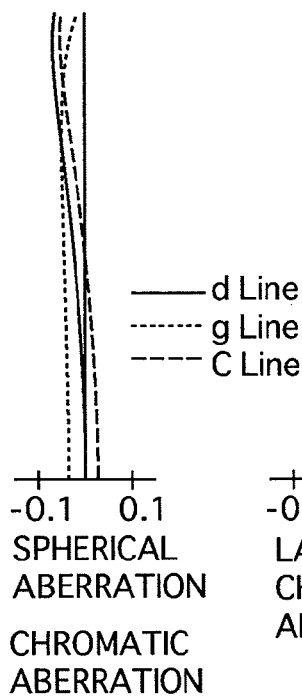
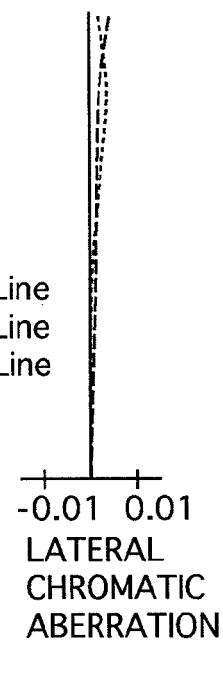
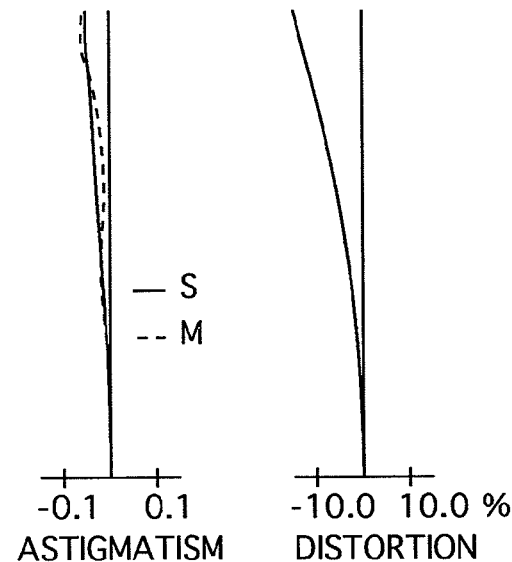
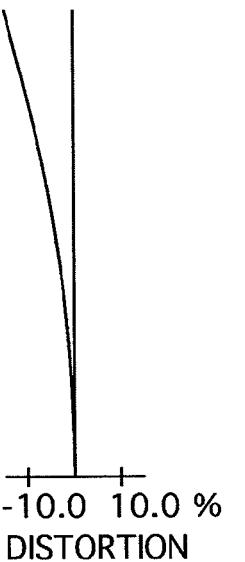
Fig.46A
FNO.=1:2.7
Fig.46B
W=40.1
Fig.46C
W=40.1
Fig.46D
W=40.1
—— d Line
------ g Line
---- C Line
—— S
-- M
-0.1   0.1
SPHERICAL
ABERRATION
CHROMATIC
ABERRATION
-0.01  0.01
LATERAL
CHROMATIC
ABERRATION
-0.1   0.1
ASTIGMATISM
-10.0  10.0 %
DISTORTION
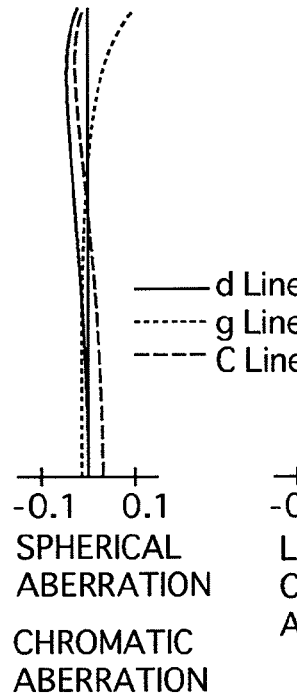
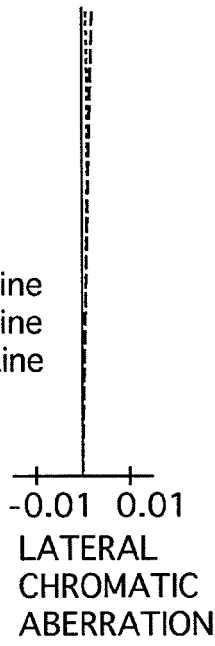
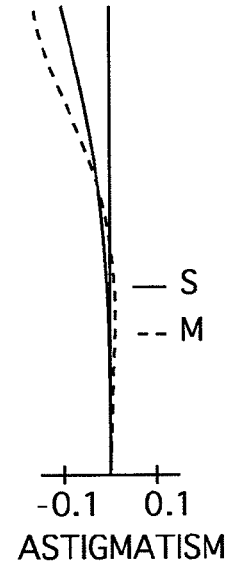
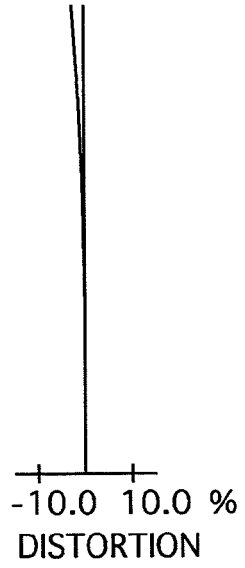
Fig.47A
FNO.=1:3.6
Fig.47B
W=23.0
Fig.47C
W=23.0
Fig.47D
W=23.0
—— d Line
------ g Line
---- C Line
—— S
-- M
-0.1   0.1
SPHERICAL
ABERRATION
CHROMATIC
ABERRATION
-0.01  0.01
LATERAL
CHROMATIC
ABERRATION
-0.1   0.1
ASTIGMATISM
-10.0  10.0 %
DISTORTION

FNO.=1:5.8  W=11.6  W=11.6  W=11.6

—— d Line
······ g Line
--- C Line

— S
-- M

-0.1   0.1  -0.01  0.01  -0.1   0.1  -10.0  10.0 %
SPHERICAL  LATERAL  ASTIGMATISM  DISTORTION
ABERRATION  CHROMATIC
           ABERRATION
CHROMATIC
ABERRATION

US 8,094,382 B2

ZOOM LENS SYSTEM AND ELECTRONIC IMAGING DEVICE USING THE SAME

BACKGROUND OF THE INVENTION

1. Field of the Invention

The present invention relates to a zoom lens system and an electronic imaging device that uses such a zoom lens system, for use in a digital camera, etc.

2. Description of Related Art

In a retractable zoom lens system which retracts the lens groups thereof by reducing the distances (spaces) therebetween during a lens-retracting operation and has a zoom ratio of approximately 3, it is common to utilize three lens groups of a negative-lead type zoom lens system in order to achieve further miniaturization thereof, as disclosed in, e.g., Japanese Unexamined Patent Publication Nos. 2002-48975, 2005-37727, 2006-276897 and 2007-286577.

Furthermore, zoom lens systems which use many glass aspherical lens elements in order to achieve a zoom ratio of approximately 3.6 and a wide angle-of-view at the wide extremity (short focal length extremity) are known in the art, as disclosed in, e.g., in Japanese Unexamined Patent Publication Nos. 2005-099091, 2005-084647, 2005-084648 and 2005-084649.

Moreover, it is common to utilize a zoom lens system that has four lens groups of a positive-lead type zoom lens system having a zoom ratio exceeding 4.

In the zoom lens systems taught in the above-mentioned Japanese Unexamined Patent Publication Nos. 2002-48975, 2005-37727, 2006-276897 and 2007-286577 (the negative-lead type zoom lens system), since the zoom ratio thereof is approximately 3, the zooming capability is insufficient. Moreover, if such types of zoom lens systems are used to achieve a zoom ratio of approximately 4.0, the size of the lens elements thereof becomes too large; and, if an attempt is made to miniaturize such lens systems while attaining the same optical quality, the number of lens elements has to be increased, and many glass aspherical lens elements have to be used, which undesirably increases production costs. For example, in the zoom lens systems disclosed in the above-mentioned Japanese Unexamined Patent Publication Nos. 2005-099091, 2005-084647, 2005-084648 and 2005-084649, since a large number of glass aspherical lens elements are used, the production costs thereof are high, and miniaturization of the zoom lens systems is insufficient.

On the other hand, in the positive-lead type zoom lens system having four lens groups, the overall length thereof when in use can be shortened even if the zoom ratio is increased. However, since the number of lens groups increases, it is difficult to reduce the overall length of the zoom lens system when retracted to the accommodated position, and the diameter of the first lens group becomes large. Consequently, miniaturization of the positive-lead type zoom lens system is insufficient.

Accordingly, a further miniaturized negative-lead type zoom lens system of three lens groups, which has a zoom ratio of approximately 4.0 and can be produced at low costs, is desired.

SUMMARY OF THE INVENTION

The present invention has been devised in view of the above-mentioned problems, and provides a further miniaturized negative-lead type zoom lens system of three lens groups which has a zoom ratio of approximately 4.0 and can be produced at low costs.

According to an aspect of the present invention, there is provided a zoom lens system including a first lens group having a negative refractive power (hereinafter, a negative first lens group), a second lens group having a positive refractive power (hereinafter, a positive second lens group) and a third lens group having a positive refractive power (hereinafter, a positive third lens group), in this order from the object.

Upon zooming from the short focal length extremity to the long focal length extremity, each of the negative first lens group, the positive second lens group and the positive third lens group is moved along the optical axis thereof.

The negative first lens group includes a first lens element having a negative refractive power (hereinafter, a negative first lens element), a second lens element having a negative refractive power (hereinafter, a negative second lens element), and a third lens element having a positive refractive power (hereinafter, a positive third lens element), in this order from the object.

The positive second lens group includes a cemented lens having a positive first lens element and a negative second lens element in this order from the object, and a meniscus lens element having the concave surface facing toward the image, in this order from the object.

The zoom lens system satisfies the following conditions:

$$-0.4 < f23/f24 < 0.4 \quad (1)$$

$$0.7 < f3/ft < 1.3 \quad (2)$$

wherein f23 designates the combined focal length of the cemented lens of the positive second lens group;

f24 designates the focal length of the meniscus lens element, of the positive second lens group, having the concave surface facing toward the image;

f3 designates the focal length of the positive third lens group; and ft designates the focal length of the entire zoom lens system at the long focal length extremity.

The zoom lens system preferably satisfies the following condition when condition (2) is satisfied:

$$0.7 < f3/ft < 1.2 \quad (2a)$$

The zoom lens system preferably satisfies the following conditions:

$$0.3 < f11/f12 < 1.3 \quad (3)$$

$$-0.14 < (R15-R14)/(R15+R14) < 0.14 \quad (4)$$

wherein f11 designates the focal length of the negative first lens element of the negative first lens group;

f12 designates the focal length of the negative second lens element of the negative first lens group;

R14 designates the radius of curvature of the image-side surface of the negative second lens element of the negative first lens group; and R15 designates the radius of curvature of the object-side surface of the positive third lens element of the negative first lens group.

Furthermore, the zoom lens system preferably satisfies the following condition when condition (4) is satisfied:

$$-0.14 < (R15-R14)/(R15+R14) < 0.10 \quad (4a)$$

The positive third lens group includes a single positive lens element, and preferably satisfies the following condition:

$$1.05 < \beta 3t/\beta 3w < 1.3 \quad (5)$$

wherein $\beta 3t$ designates the lateral magnification of the positive third lens group at the long focal length extremity when an object at infinity is in an in-focus state; and $\beta 3w$ designates the lateral magnification of the positive third lens group at the short focal length extremity when an object at infinity is in an in-focus state.

The negative second lens element and the positive third lens element in the negative first lens group are made of resin, and each of these lens elements have at least one aspherical surface; and, the meniscus lens element, in the positive second lens group, is made of resin, has the concave surface facing toward the image, and has at least one aspherical surface.

These lens resin elements preferably satisfy the following condition:

$$|f1/f1p - f2/f2p| < 0.6 \quad (6)$$

wherein f1 designates the focal length of the negative first lens group;

f1p designates the combined focal length of the resin lens elements in the negative first lens group;

f2 designates the focal length of the positive second lens group; and f2p designates the combined focal length of the resin lens element in the positive second lens group.

Furthermore, the zoom lens system preferably satisfies the following condition when condition (6) is satisfied:

$$|f1/f1p - f2/f2p| < 0.45 \quad (6a)$$

The positive third lens group preferably includes a resin lens element having at least one aspherical surface, and moves along the optical axis towards an object when focusing from an object at infinity to an object at a closer distance is performed.

In an embodiment, an electronic imaging device is provided, including the above described rear focus wide-angle lens system.

According to another aspect of the present invention, there is provided a zoom lens system including a negative first lens group, a positive second lens group and a positive third lens group, in this order from the object.

Upon zooming from the short focal length extremity to the long focal length extremity, each of the negative first lens group, the positive second lens group and the positive third lens group is moved along the optical axis thereof.

The negative first lens group includes a negative first lens element, a negative second lens element, and a positive third lens element, in this order from the object.

The positive second lens group includes a cemented lens having a positive first lens element and a negative second lens element, and a meniscus lens element having the concave surface facing toward the image, in this order from the object.

The zoom lens system satisfies the following conditions:

$$0.3 < f11/f12 < 1.3 \quad (3)$$

$$-0.14 < (R15 - R14)/(R15 + R14) < 0.14 \quad (4)$$

wherein f11 designates the focal length of the negative first lens element of the negative first lens group;

f12 designates the focal length of the negative second lens element of the negative first lens group;

R14 designates the radius of curvature of the image-side surface of the negative second lens element of the negative first lens group; and R15 designates the radius of curvature of the object-side surface of the positive third lens element of the negative first lens group.

Furthermore, the zoom lens system preferably satisfies the following condition when condition (4) is satisfied:

$$-0.14 < (R15 - R14)/(R15 + R14) < 0.10 \quad (4a)$$

According to the present invention, a further miniaturized negative-lead type zoom lens system of three lens groups, which has a zoom ratio of approximately 4.0 and can be produced at low costs, is provided:

The present disclosure relates to subject matter contained in Japanese Patent Applications No. 2008-300327 (filed on Nov. 26, 2008) and No. 2009-193296 (filed on Aug. 24, 2009) which are expressly incorporated herein in their entirety.

BRIEF DESCRIPTION OF THE DRAWINGS

The present invention will be discussed below in detail with reference to the accompanying drawings, in which:

FIG. 1 shows a lens arrangement of a first embodiment of a zoom lens system according to the present invention;

FIGS. 4A, 4B, 4C and 4D show aberrations of the lens arrangement shown in FIG. 1 at the long focal length extremity when an object at infinity is in an in-focus state;

FIGS. 8A, 8B, 8C and 8D show aberrations of the lens arrangement shown in FIG. 5 at the long focal length extremity when an object at infinity is in an in-focus state;

FIGS. 12A, 12B, 12C and 12D show aberrations of the lens arrangement shown in FIG. 9 at the long focal length extremity when an object at infinity is in an in-focus state;

FIGS. 14A, 14B, 14C and 14D show aberrations of the lens arrangement shown in FIG. 13 at the short focal length extremity when an object at infinity is in an in-focus state;

FIGS. 15A, 15B, 15C and 15D show aberrations of the lens arrangement shown in FIG. 13 at an intermediate focal length position when an object at infinity is in an in-focus state;

FIGS. 16A, 16B, 16C and 16D show aberrations of the lens arrangement shown in FIG. 13 at the long focal length extremity when an object at infinity is in an in-focus state;

FIGS. 18A, 18B, 18C and 18D show aberrations of the lens arrangement shown in FIG. 17 at the short focal length extremity when an object at infinity is in an in-focus state;

FIGS. 19A, 19B, 19C and 19D show aberrations of the lens arrangement shown in FIG. 17 at an intermediate focal length position when an object at infinity is in an in-focus state;

FIGS. 20A, 20B, 20C and 20D show aberrations of the lens arrangement shown in FIG. 17 at the long focal length extremity when an object at infinity is in an in-focus state;

FIGS. 24A, 24B, 24C and 24D show aberrations of the lens arrangement shown in FIG. 21 at the long focal length extremity when an object at infinity is in an in-focus state;

FIG. 25 shows a lens arrangement of a seventh embodiment of a zoom lens system according to the present invention;

FIGS. 26A, 26B, 26C and 26D show aberrations of the lens arrangement shown in FIG. 25 at the short focal length extremity when an object at infinity is in an in-focus state;

FIGS. 27A, 27B, 27C and 27D show aberrations of the lens arrangement shown in FIG. 25 at an intermediate focal length position when an object at infinity is in an in-focus state;

FIGS. 28A, 28B, 28C and 28D show aberrations of the lens arrangement shown in FIG. 25 at the long focal length extremity when an object at infinity is in an in-focus state;

FIGS. 32A, 32B, 32C and 32D show aberrations of the lens arrangement shown in FIG. 29 at the long focal length extremity when an object at infinity is in an in-focus state;

FIGS. 34A, 34B, 34C and 34D show aberrations of the lens arrangement shown in FIG. 33 at the short focal length extremity when an object at infinity is in an in-focus state;

FIGS. 35A, 35B, 35C and 35D show aberrations of the lens arrangement shown in FIG. 33 at an intermediate focal length position when an object at infinity is in an in-focus state;

FIGS. 38A, 38B, 38C and 38D show aberrations of the lens arrangement shown in FIG. 37 at the short focal length extremity when an object at infinity is in an in-focus state;

FIGS. 39A, 39B, 39C and 39D show aberrations of the lens arrangement shown in FIG. 37 at an intermediate focal length position when an object at infinity is in an in-focus state;

FIGS. 40A, 40B, 40C and 40D show aberrations of the lens arrangement shown in FIG. 37 at the long focal length extremity when an object at infinity is in an in-focus state;

FIGS. 44A, 44B, 44C and 44D show aberrations of the lens arrangement shown in FIG. 41 at the long focal length extremity when an object at infinity is in an in-focus state;

FIG. 45 shows a lens arrangement of a twelfth embodiment of a zoom lens system according to the present invention;

FIGS. 46A, 46B, 46C and 46D show aberrations of the lens arrangement shown in FIG. 45 at the short focal length extremity when an object at infinity is in an in-focus state;

FIGS. 47A, 47B, 47C and 47D show aberrations of the lens arrangement shown in FIG. 45 at an intermediate focal length position when an object at infinity is in an in-focus state;

DESCRIPTION OF THE PREFERRED EMBODIMENTS

Figure 49:
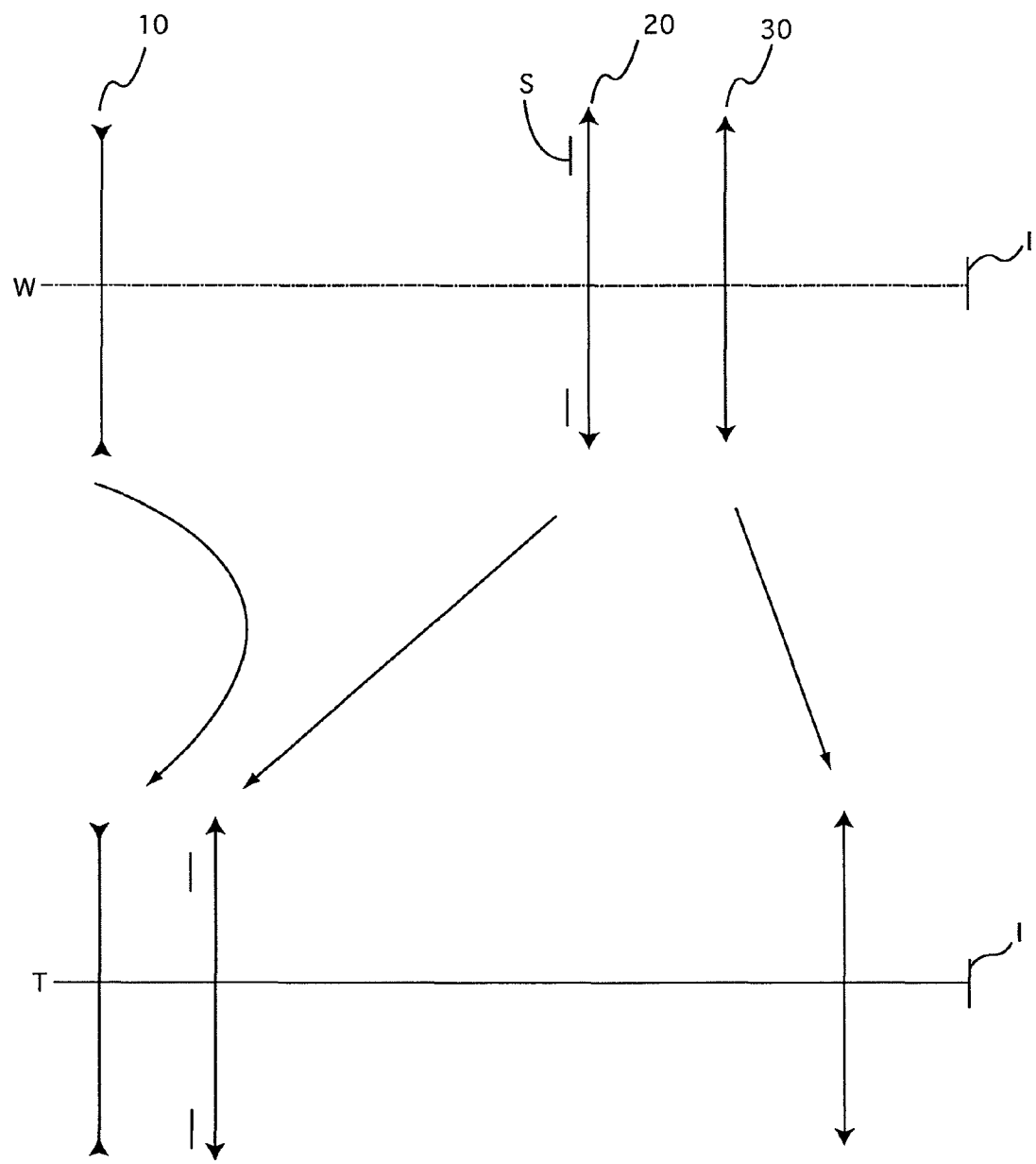
FIG. 49 is the schematic view of the lens-group moving paths for the zoom lens system according to the present invention.

The zoom lens system of the present invention, as shown in the lens-group moving paths of FIG. 49, includes a negative first lens group 10, a diaphragm S, a positive second lens group 20, and a positive third lens group 30, in this order from the object. 'I' designates the imaging plane where the light-receiving surface of a CCD (an electronic imaging device) is positioned. Two optical filters (e.g., a cover glass), which are not shown, are provided in front of the CCD.

A focusing operation on an object at infinity to an object at a close distance is performed by moving the positive third lens group 30 along the optical axis toward the object.

Upon zooming from the short focal length extremity (Wide) to the long focal length extremity (Tele), the negative first lens group 10, the positive second lens group 20 and the positive third lens group 30 each move along the optical axis. More specifically, upon zooming from the short focal length extremity to the long focal length extremity, the negative first lens group 10 initially moves toward the image and thereafter moves toward the object, the positive second lens group 20 monotonically moves toward the object, and the positive third lens group 30 monotonically moves toward the image. The diaphragm S (fixed aperture stop) is provided between the negative first lens group 10 and the positive second lens group 20, and integrally moves with the positive second lens group 20 upon zooming.

As shown in each embodiments of FIGS. 1, 5, 9, 13, 17, 21, 25, 29, 33, 37, 41 and 45, the negative first lens group 10 includes a negative first lens element 11, a negative second lens element 12 and a positive third lens element 13, in this order from the object.

The positive second lens group 20 includes a cemented lens 23 having a positive first lens element 21 and a negative second lens element 22, and a meniscus lens element 24 having the concave surface facing toward the image, in this order from the object. This weak powered meniscus lens element 24 can either have a positive or negative refractive power.

The positive third lens group 30 includes a single positive lens element 31.

In the all embodiments, the second lens element 12 of the negative first lens group 10, the meniscus lens element 24 of the positive second lens group 20, and the single positive lens element 31 are constituted by resin lens elements, and are made aspherical on both surfaces thereof.

In the embodiments except the second and ninth embodiments, the positive third lens element 13 of the negative first lens group 10 is constituted by a resin lens element, and is made aspherical on both surfaces thereof.

Condition (1) is to determine a ratio, f23/f24, of the combined focal length f23 of the cemented lens 23 (the positive first lens element 21 and the negative second lens element 22 of the positive second lens group 20) to the focal length f24 of the meniscus lens element 24 (having the concave surface facing toward the image) of the positive second lens group 20, in order to achieve a high zoom ratio, while an increase of the overall length of the zoom lens system is prevented.

If f23/f24 exceeds the lower limit of condition (1), the correcting of spherical aberrations becomes difficult.

If f23/f24 exceeds the upper limit of condition (1), the principal point of the positive second lens group 20 approaches the image, so that the overall length of the zoom lens system becomes longer. Moreover, the refractive power of the negative first lens group 10 becomes stronger. As a result, the correcting of field curvature and astigmatism becomes difficult.

Condition (2) is to determine a ratio, f3/ft, of the focal length f3 of the positive third lens group 30 to the focal length ft of the entire zoom lens system at the long focal length extremity, in order to attain better telecentricity, while an increase of the overall length of the zoom lens system is prevented.

If f3/ft exceeds the lower limit of condition (2), the correcting of field curvature and astigmatism becomes difficult.

If f3/ft exceeds the upper limit of condition (2), the telecentricity of the zoom lens system deteriorates.

Condition (3) is to determine a ratio, f11/f12, of the focal length f11 of the negative first lens element 11 to the focal length f12 in the negative second lens element 12 of the negative first lens group 10, in order to suitably perform the correcting of aberrations, while an increase of the size of the zoom lens system is prevented. Furthermore, condition (3) is provided for suitably distributing the negative refractive power of the negative first lens group 10 over the negative first lens element 11 and the negative second lens element 12.

If f11/f12 exceeds the lower limit of condition (3), the thickness, at the optical axis position, of the negative first lens element 11 becomes noticeably different from that of, at the peripheral area of the negative first lens element 11, so that the thickness of the negative first lens group 10 becomes larger.

If f11/f12 exceeds the upper limit of condition (3), the refractive power of the negative first lens element 11 becomes insufficient, so that the diameter of the negative first lens element 11 has to be increased in order to strengthen the refractive power.

Condition (4) concerns the shaping factor of an air lens defined between the image-side surface of the negative second lens element 12 and the object-side surface of the positive third lens element 13 in the negative first lens group 10, in order to suitably perform the correcting of aberrations and to determine the shape of the above-mentioned air lens, while an increase of the size of the zoom lens system is prevented.

If (R15−R14)/(R15+R14) exceeds the lower limit of condition (4), the air distance between the peripheral area of the negative second lens element 12 and that of the positive third lens element 13 becomes longer, so that the thickness (length in the optical axis direction) of the negative first lens group 10 increases.

If (R15−R14)/(R15+R14) exceeds the upper limit of condition (4), the correcting of astigmatism becomes difficult.

Condition (5) determines a ratio, β3t/β3w, of the lateral magnification β3t of the positive third lens group at the long focal length extremity to the lateral magnification β3w thereof at the short focal length extremity when an object at infinity is in an in-focus state, in order to achieve a high zoom ratio, while an increase of the overall length of the zoom lens system is prevented, when the positive third lens group 30 is constituted by a single positive lens element.

If β3t/β3w exceeds the lower limit of condition (5), zooming has to be substantially performed by the negative first lens group 10 and the positive second lens group 20 only. Consequently, the size of the negative first lens group 10 and that of the positive second lens group 20 become larger. Moreover, the refractive power of the negative first lens group 10 and that of the positive second lens group 20 become stronger, so that the correcting of field curvature and astigmatism becomes difficult.

If β3t/β3w exceeds the upper limit of condition (5), zooming has to be substantially performed by the positive third lens group 30 only. Consequently, the traveling distance of the positive third lens group 30 becomes longer, so that it becomes difficult to secure the back focal distance. Moreover, the refractive power of the positive third lens group 30 becomes stronger, so that the change of field curvature becomes larger when focusing on a close-distant object is performed by the positive third lens group 30.

Condition (6) concerns the difference between a ratio f1/f1p to a ratio f2/f2p when the negative second lens element 12 and the positive third lens element 13, in the negative first lens group 10, are respectively constituted by a resin lens element having at least one aspherical surface; and, the meniscus lens element 24, in the positive second lens group 20, having the concave surface facing toward the image is constituted by a resin lens element having at least one aspherical surface.

Here, f1 designates the focal length of the negative first lens group 10; f1p designates the combined focal length of the resin lens elements (the negative second lens element 12 and the positive third lens element 13) in the negative first lens group 10; f2 designates the focal length of the positive second lens group 20; and f2p designates the combined focal length of the resin lens element (the meniscus lens element 24) in the positive second lens group 20.

By satisfying this condition, focal shift due to a change in temperature in the resin lens elements (i.e., the negative second lens element 12 and the positive third lens element 13 in the negative first lens group 10, and the meniscus lens element 24 in the positive second lens group 20) can be reduced; and the refractive power of the resin lens elements can be suitably maintained so as not to be too strong.

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, W designates the half angle-of-view, the two types of dotted lines respectively indicate magnification with respect to the g and C lines; however, the d line as the base line coincides with the ordinate.

In the diagrams of astigmatism, W designates the half angle-of-view, S designates the sagittal image, and M designates the meridional image.

In the diagrams of distortion, y designates the image height.

In the tables, FNO. designates the F-number, f designates the focal length of the entire lens system, W designates the half angle-of-view) (°), fB designates the back focal distance (the distance between the image-side surface of the most image-side cover glass to the imaging plane), L designates the length of the lens system, r designates the radius of curvature, d designates the lens-element thickness or a distance between lens elements (lens groups), $N_d$ designates the refractive index of the d-line, and v designates the Abbe number.

FNO., f, W, fB, L and d (which changes according to zooming) are shown in the following order: "the short focal length extremity", "an intermediate focal length position" and "the long focal length extremity".

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 shows the lens arrangement of a first embodiment of a zoom lens system according to the present invention. FIGS. 2A through 2D show aberrations of the lens arrangement shown in FIG. 1 at the short focal length extremity when an object at infinity is in an in-focus state. FIGS. 3A through 3D show aberrations of the lens arrangement shown in FIG. 1 at an intermediate focal length position when an object at infinity is in an in-focus state. FIGS. 4A through 4D show aberrations of the lens arrangement shown in FIG. 1 at the long focal length extremity when an object at infinity is in an in-focus state.

Table 1 shows the lens-surface data of the zoom lens system, Table 2 shows the aspherical-surface data, Table 3 shows the data on the variable values according to zooming, and Table 4 shows lens-group data.

The zoom lens system of the first embodiment includes a negative first lens group 10, a diaphragm S, a positive second lens group 20, and a positive third lens group 30, in this order from the object. Two optical filters OP1 and OP2 are provided between the positive third lens group 30 and the imaging plane I where the light-receiving surface of a CCD (an electronic imaging device) is positioned.

The negative first lens group 10 includes a negative meniscus lens element 11 having the convex surface facing toward the object, a negative meniscus lens element 12 having the convex surface facing toward the object, and a positive meniscus lens element 13 having the convex surface facing toward the object, in this order from the object. The negative meniscus lens element 12 and the positive meniscus lens element 13 are respectively formed as resin lens elements, each of which has aspherical surfaces on both surfaces thereof.

The positive second lens group 20 includes a cemented lens 23 having a biconvex positive lens element 21 and a biconcave negative lens element 22, and a positive meniscus lens element 24 having the concave surface facing toward the image, in this order from the object. The positive meniscus lens element 24 is formed as a resin lens element having aspherical surfaces on both sides thereof.

The positive third lens group 30 includes a single biconvex positive lens element 31 formed as a resin lens element having aspherical surfaces on both surface thereof. Note that in each embodiment, lens elements having aspherical surfaces on both side are resin lens elements.

The diaphragm S is provided at a position where the diaphragm S contacts surface No. 7, i.e., the front surface of the cemented lens (lens element 21) of the positive second lens group 20.

TABLE 1

Surface Data

| Surf. No. | r | d | Nd | v |
|---|---|---|---|---|
| 1 | 48.000 | 0.700 | 1.71300 | 53.9 |
| 2 | 6.474 | 1.958 | | |
| 3* | 13.733 | 1.000 | 1.54358 | 55.7 |
| 4* | 6.240 | 0.200 | | |
| 5* | 7.017 | 2.100 | 1.60641 | 27.2 |
| 6* | 27.206 | D6 | | |
| 7 | 4.760 | 2.000 | 1.88300 | 40.8 |
| 8 | −7.461 | 0.500 | 1.76182 | 26.6 |
| 9 | 4.803 | 0.550 | | |
| 10* | 4.556 | 1.100 | 1.54358 | 55.7 |
| 11* | 4.866 | D11 | | |
| 12* | 25.454 | 1.800 | 1.54358 | 55.7 |
| 13* | −14.566 | D13 | | |
| 14 | ∞ | 0.350 | 1.51633 | 64.1 |
| 15 | ∞ | 0.510 | | |
| 16 | ∞ | 0.500 | 1.51633 | 64.1 |
| 17 | ∞ | — | | |

The symbol * designates the aspherical surface which is rotationally symmetrical with respect to the optical axis.

TABLE 2

Aspherical surface data (the aspherical surface coefficients not indicated are zero (0.00)):

| Surf. No. | K | A4 | A6 | A8 | A10 |
|---|---|---|---|---|---|
| 3 | 0.000 | $-0.7710 \times 10^{-3}$ | $0.2171 \times 10^{-4}$ | $-0.3441 \times 10^{-6}$ | $-0.2859 \times 10^{-1}$ |
| 4 | 0.000 | $-0.1289 \times 10^{-2}$ | $0.1633 \times 10^{-4}$ | $-0.1413 \times 10^{-5}$ | 0.0000 |
| 5 | 0.000 | $-0.2118 \times 10^{-3}$ | $-0.7521 \times 10^{-5}$ | $-0.4613 \times 10^{-6}$ | 0.0000 |
| 6 | 0.000 | $-0.1931 \times 10^{-3}$ | $0.2654 \times 10^{-5}$ | 0.0000 | 0.0000 |
| 10 | 0.000 | $-0.3265 \times 10^{-2}$ | $-0.3366 \times 10^{-3}$ | $-0.6428 \times 10^{-4}$ | $0.1456 \times 10^{-5}$ |
| 11 | 0.000 | $0.1016 \times 10^{-2}$ | $-0.1369 \times 10^{-3}$ | $-0.9476 \times 10^{-4}$ | $0.1000 \times 10^{-4}$ |

TABLE 2-continued

Aspherical surface data (the aspherical surface coefficients not indicated are zero (0.00)):

| Surf. No. | K | A4 | A6 | A8 | A10 |
|---|---|---|---|---|---|
| 12 | 0.000 | $0.5690 \times 10^{-3}$ | $-0.2479 \times 10^{-4}$ | $0.9607 \times 10^{-6}$ | 0.0000 |
| 13 | 0.000 | $0.9701 \times 10^{-3}$ | $-0.4473 \times 10^{-4}$ | $0.1381 \times 10^{-5}$ | 0.0000 |

TABLE 3

Lens Data (Zoom Ratio = 3.88)

| | Short Focal Length Extremity | Intermediate Focal Length Position | Long Focal Length Extremity |
|---|---|---|---|
| FNO. = | 2.6 | 3.7 | 6.0 |
| f = | 5.00 | 9.62 | 19.42 |
| W = | 39.8 | 22.9 | 11.6 |
| fB = | 0.59 | 0.59 | 0.59 |
| L = | 36.03 | 32.37 | 37.09 |
| D6 = | 14.425 | 5.691 | 0.895 |
| D11 = | 3.296 | 8.843 | 19.313 |
| D13 = | 3.053 | 2.576 | 1.624 |

TABLE 4

Lens Group Data of Zoom Lens System

| Lens Group | First Surf. No. | Focal Length |
|---|---|---|
| 1 | 1 | −13.31 |
| 2 | 7 | 10.15 |
| 3 | 12 | 17.32 |

Embodiment 2

Figure 2A:
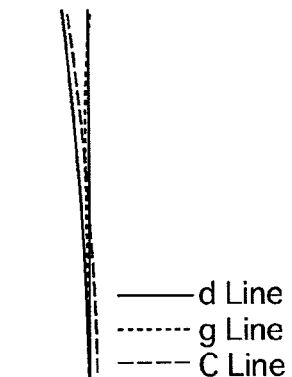
FIGS. 2A, 2B, 2C and 2D show aberrations of the lens arrangement shown in FIG. 1 at the short focal length extremity when an object at infinity is in an in-focus state.
Figure 2B:
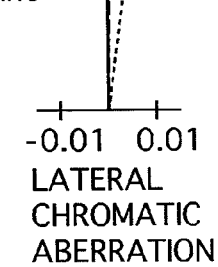
Figure 2C:
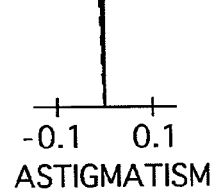
Figure 2D:
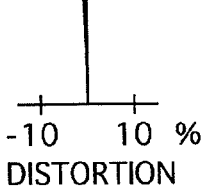
Figure 3A:
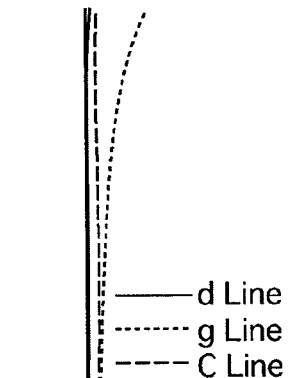
FIGS. 3A, 3B, 3C and 3D show aberrations of the lens arrangement shown in FIG. 1 at an intermediate focal length position when an object at infinity is in an in-focus state.
Figure 3B:
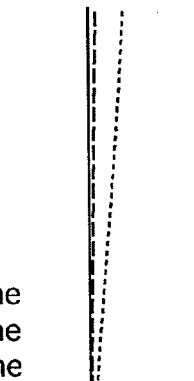
Figure 3C:
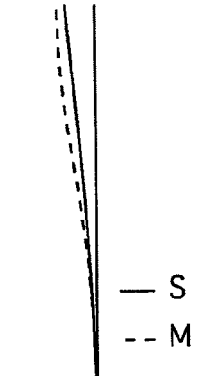
Figure 3D:
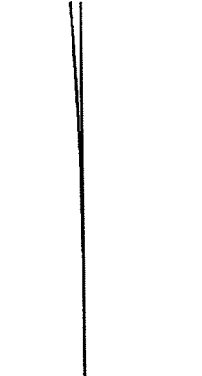
Figure 5:
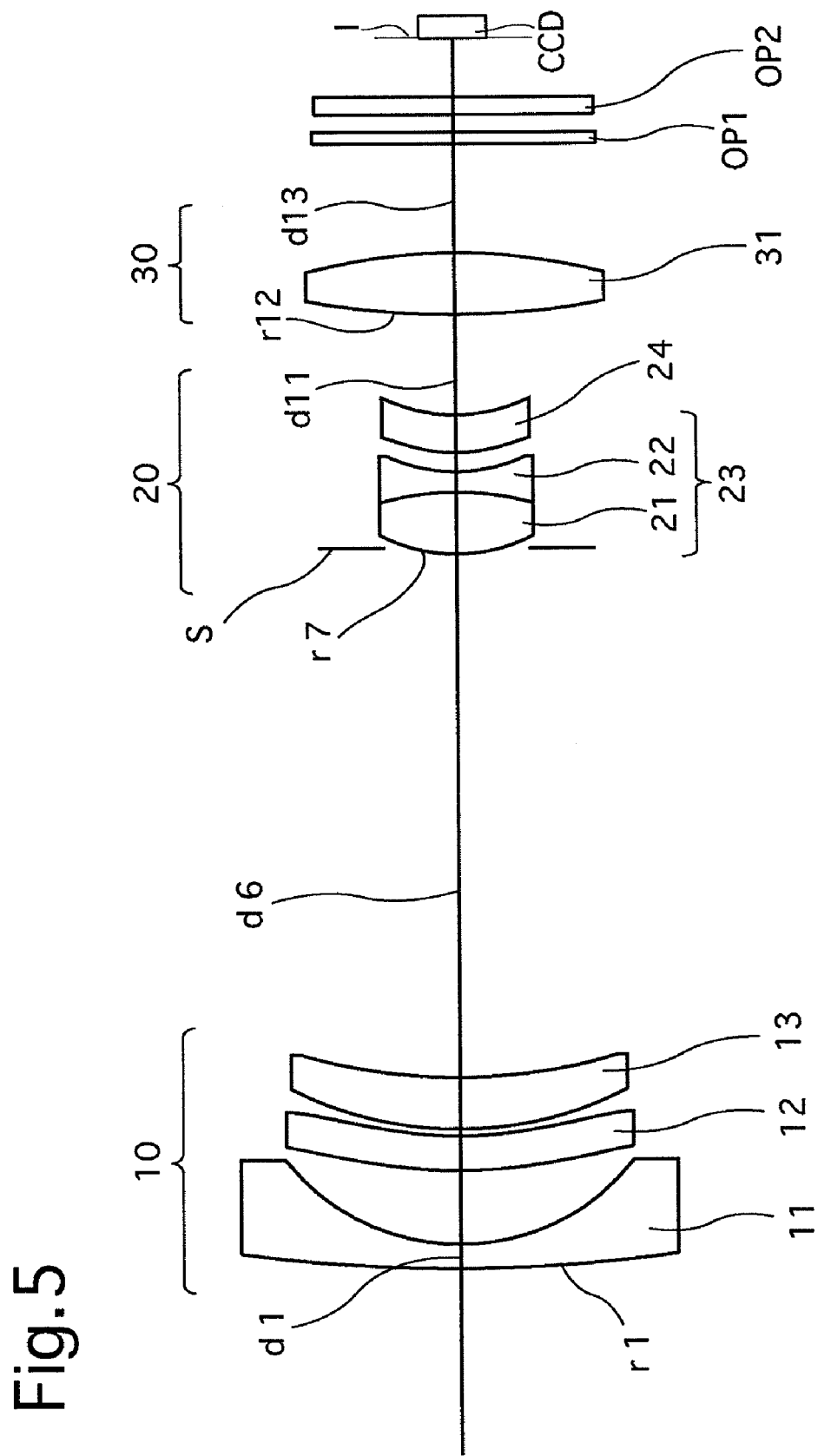
FIG. 5 shows a lens arrangement of a second embodiment of a zoom lens system according to the present invention.
Figure 6A:
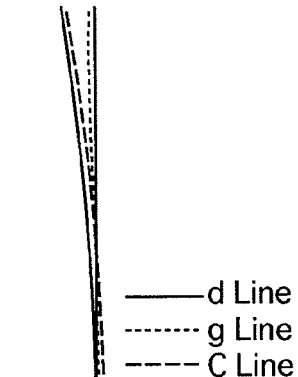
FIGS. 6A, 6B, 6C and 6D show aberrations of the lens arrangement shown in FIG. 5 at the short focal length extremity when an object at infinity is in an in-focus state.
Figure 6B:
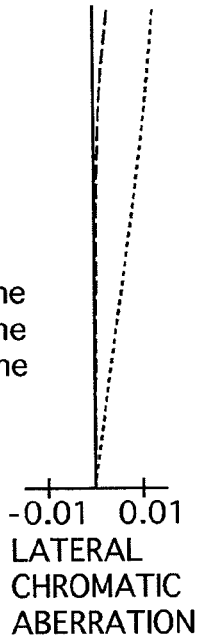
Figure 6C:
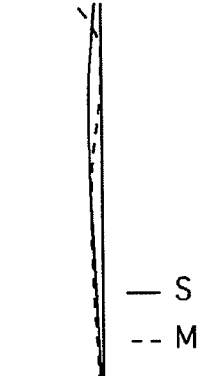
Figure 6D:
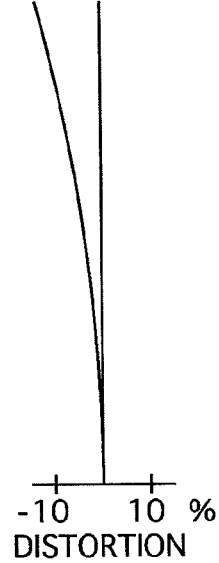
Figure 7A:
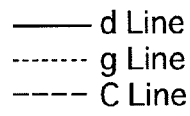
FIGS. 7A, 7B, 7C and 7D show aberrations of the lens arrangement shown in FIG. 5 at an intermediate focal length position when an object at infinity is in an in-focus state.
Figure 7B:
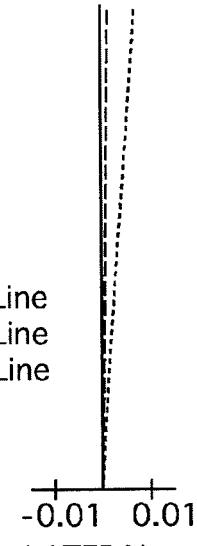
Figure 7C:
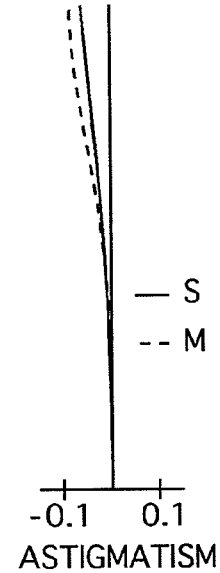
Figure 7D:
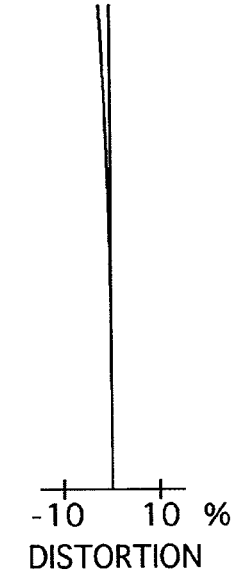

FIG. 5 shows the lens arrangement of the second embodiment of a zoom lens system according to the present invention. FIGS. 6A through 6D show aberrations of the lens arrangement shown in FIG. 5 at the short focal length extremity when an object at infinity is in an in-focus state. FIGS. 7A through 7D show aberrations of the lens arrangement shown in FIG. 5 at an intermediate focal length position when an object at infinity is in an in-focus state. FIGS. 8A through 8D show aberrations of the lens arrangement shown in FIG. 5 at the long focal length extremity when an object at infinity is in an in-focus state.

Table 5 shows the lens-surface data of the zoom lens system, Table 6 shows the aspherical-surface data, Table 7 shows the data on the variable values according to zooming, and Table 8 shows lens-group data.

The basic lens arrangement of the second embodiment is the same as that of the first embodiment except that the positive meniscus lens element 13 is not a resin aspherical lens element.

The diaphragm S is provided at a position where the diaphragm S contacts surface No. 7, i.e., the front surface of the cemented lens (lens element 21) of the positive second lens group 20.

TABLE 5

Surface Data

| Surf. No. | r | d | Nd | ν |
|---|---|---|---|---|
| 1 | 48.000 | 0.700 | 1.72000 | 50.3 |
| 2 | 6.483 | 2.133 | | |
| 3* | 13.103 | 1.000 | 1.54358 | 55.7 |
| 4* | 10.708 | 0.200 | | |
| 5 | 10.854 | 1.500 | 1.94595 | 18.0 |
| 6 | 16.478 | D6 | | |
| 7 | 4.748 | 1.800 | 1.88300 | 40.8 |
| 8 | −7.911 | 0.600 | 1.76182 | 26.6 |
| 9 | 4.700 | 0.550 | | |
| 10* | 4.339 | 1.100 | 1.54358 | 55.7 |
| 11* | 4.794 | D11 | | |
| 12* | 28.719 | 1.800 | 1.54358 | 55.7 |
| 13* | −13.690 | D13 | | |
| 14 | ∞ | 0.350 | 1.51633 | 64.1 |
| 15 | ∞ | 0.510 | | |
| 16 | ∞ | 0.500 | 1.51633 | 64.1 |
| 17 | ∞ | — | | |

The symbol * designates the aspherical surface which is rotationally symmetrical with respect to the optical axis.

TABLE 6

Aspherical surface data (the aspherical surface coefficients not indicated are zero (0.00)):

| Surf. No. | K | A4 | A6 |
|---|---|---|---|
| 3 | 0.000 | $-0.7710 \times 10^{-3}$ | $0.2171 \times 10^{-4}$ |
| 4 | 0.000 | $-0.1076 \times 10^{-2}$ | $0.2597 \times 10^{-4}$ |
| 10 | 0.000 | $-0.2769 \times 10^{-2}$ | $-0.2695 \times 10^{-3}$ |
| 11 | 0.000 | $0.1583 \times 10^{-2}$ | $-0.5542 \times 10^{-4}$ |
| 12 | 0.000 | $0.4704 \times 10^{-3}$ | $-0.2924 \times 10^{-4}$ |
| 13 | 0.000 | $0.8178 \times 10^{-3}$ | $-0.4361 \times 10^{-4}$ |

| Surf. No. | A8 | A10 |
|---|---|---|
| 3 | $-0.3441 \times 10^{-6}$ | $-0.2859 \times 10^{-8}$ |
| 4 | $-0.6720 \times 10^{-6}$ | 0.0000 |
| 10 | $-0.7599 \times 10^{-4}$ | $0.1750 \times 10^{-5}$ |
| 11 | $-0.1187 \times 10^{-3}$ | $0.1074 \times 10^{-4}$ |
| 12 | $0.7774 \times 10^{-6}$ | 0.0000 |
| 13 | $0.1022 \times 10^{-5}$ | 0.0000 |

TABLE 7

Lens Data (Zoom Ratio = 3.88)

| | Short Focal Length Extremity | Intermediate Focal Length Position | Long Focal Length Extremity |
|---|---|---|---|
| FNO. = | 2.7 | 3.8 | 6.0 |
| f = | 5.00 | 9.62 | 19.42 |
| W = | 39.7 | 22.9 | 11.6 |
| fB = | 0.59 | 0.59 | 0.59 |
| L = | 36.04 | 31.73 | 35.70 |
| D6 = | 15.185 | 5.994 | 0.956 |

TABLE 7-continued

Lens Data (Zoom Ratio = 3.88)

| | Short Focal Length Extremity | Intermediate Focal Length Position | Long Focal Length Extremity |
|---|---|---|---|
| D11 = | 2.926 | 8.326 | 18.406 |
| D13 = | 3.196 | 2.673 | 1.606 |

TABLE 8

Lens Group Data of Zoom Lens System

| Lens Group | First Surf. No. | Focal Length |
|---|---|---|
| 1 | 1 | −14.12 |
| 2 | 7 | 10.19 |
| 3 | 12 | 17.31 |

Embodiment 3

Figure 9:
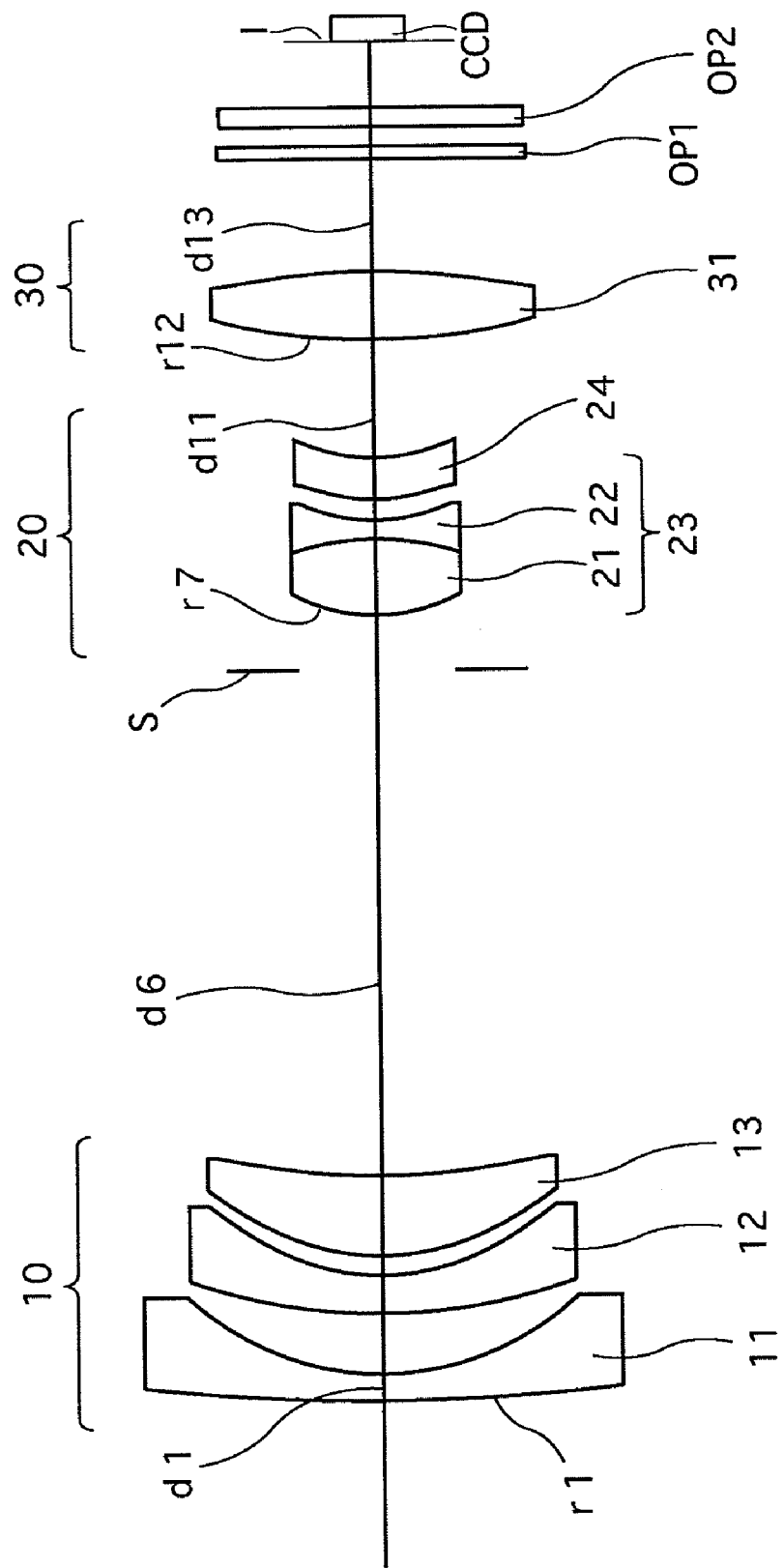
FIG. 9 shows a lens arrangement of a third embodiment of a zoom lens system according to the present invention.
Figure 10A:
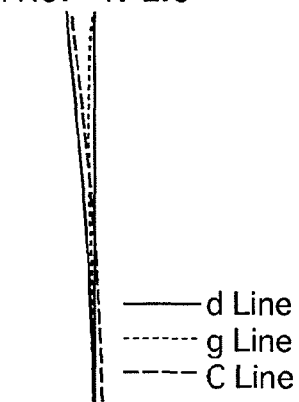
FIGS. 10A, 10B, 10C and 10D show aberrations of the lens arrangement shown in FIG. 9 at the short focal length extremity when an object at infinity is in an in-focus state.
Figure 10B:
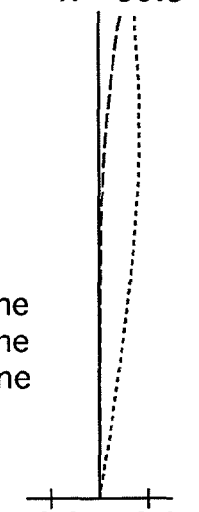
Figure 10C:
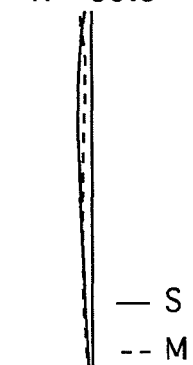
Figure 10D:
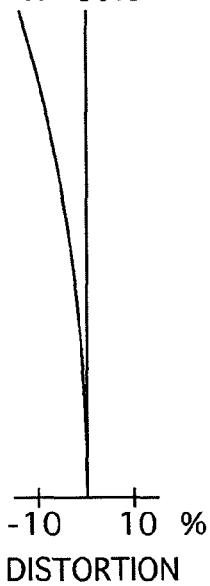
Figure 11A:
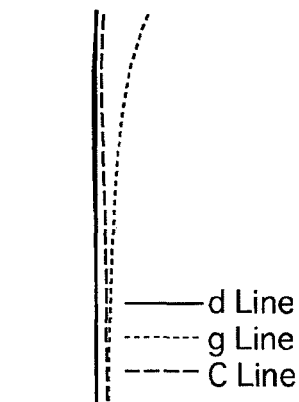
FIGS. 11A, 11B, 11C and 11D show aberrations of the lens arrangement shown in FIG. 9 at an intermediate focal length position when an object at infinity is in an in-focus state.
Figure 11B:
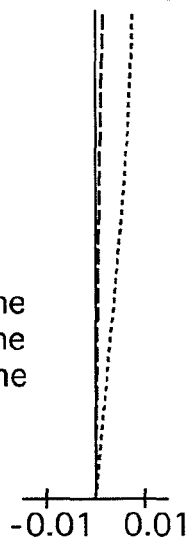
Figure 11C:
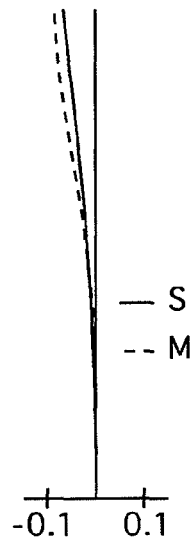
Figure 11D:
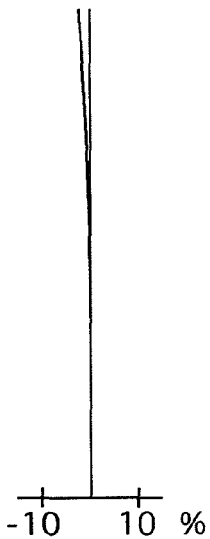

FIG. 9 shows the lens arrangement of the third embodiment of a zoom lens system according to the present invention. FIGS. 10A through 10D show aberrations of the lens arrangement shown in FIG. 9 at the short focal length extremity when an object at infinity is in an in-focus state. FIGS. 11A through 11D show aberrations of the lens arrangement shown in FIG. 9 at an intermediate focal length position when an object at infinity is in an in-focus state. FIGS. 12A through 12D show aberrations of the lens arrangement shown in FIG. 9 at the long focal length extremity when an object at infinity is in an in-focus state.

Table 9 shows the lens-surface data of the zoom lens system, Table 10 shows the aspherical-surf ace data, Table 11 shows the data on the variable values according to zooming, and Table 12 shows lens-group data.

The basic lens arrangement of the third embodiment is the same as that of the first embodiment, and only the numerical data shown in Tables 9 through 12 differ.

The diaphragm S is provided at a position where the diaphragm S contacts surface No. 7, i.e., the front surface of the cemented lens (lens element 21) of the positive second lens group 20.

TABLE 9

Surface Data

| Surf. No. | r | d | Nd | ν |
|---|---|---|---|---|
| 1 | 54.766 | 0.700 | 1.71300 | 53.9 |
| 2 | 7.590 | 1.586 | | |
| 3* | 15.575 | 1.000 | 1.54358 | 55.7 |
| 4* | 5.873 | 0.514 | | |
| 5* | 6.225 | 2.100 | 1.60641 | 27.2 |
| 6* | 17.212 | D6 | | |
| 7 | 4.732 | 2.000 | 1.88300 | 40.8 |
| 8 | −7.320 | 0.500 | 1.76182 | 26.6 |
| 9 | 4.754 | 0.550 | | |
| 10* | 4.551 | 1.100 | 1.54358 | 55.7 |
| 11* | 4.860 | D11 | | |
| 12* | 21.432 | 1.800 | 1.54358 | 55.7 |
| 13* | −15.612 | D13 | | |
| 14 | ∞ | 0.350 | 1.51633 | 64.1 |
| 15 | ∞ | 0.510 | | |
| 16 | ∞ | 0.500 | 1.51633 | 64.1 |
| 17 | ∞ | — | | |

The symbol * designates the aspherical surface which is rotationally symmetrical with respect to the optical axis.

TABLE 10

Aspherical surface data (the aspherical surface coefficients not indicated are zero (0.00)):

| Surf. No. | K | A4 | A6 |
|---|---|---|---|
| 3 | 0.000 | $-0.9948 \times 10^{-4}$ | $0.1423 \times 10^{-4}$ |
| 4 | 0.000 | $-0.7445 \times 10^{-3}$ | $0.2971 \times 10^{-4}$ |
| 5 | 0.000 | $-0.5205 \times 10^{-3}$ | $0.7716 \times 10^{-5}$ |
| 6 | 0.000 | $-0.1796 \times 10^{-3}$ | $-0.1107 \times 10^{-5}$ |
| 10 | 0.000 | $-0.3472 \times 10^{-2}$ | $-0.3413 \times 10^{-3}$ |
| 11 | 0.000 | $0.7712 \times 10^{-3}$ | $-0.1059 \times 10^{-3}$ |
| 12 | 0.000 | $0.5751 \times 10^{-3}$ | $-0.2896 \times 10^{-4}$ |
| 13 | 0.000 | $0.9516 \times 10^{-3}$ | $-0.4898 \times 10^{-4}$ |

| Surf. No. | A8 | A10 |
|---|---|---|
| 3 | $-0.5036 \times 10^{-6}$ | $0.4426 \times 10^{-8}$ |
| 4 | $-0.1599 \times 10^{-5}$ | 0.0000 |
| 5 | $-0.7044 \times 10^{-6}$ | 0.0000 |
| 6 | 0.0000 | 0.0000 |
| 10 | $-0.6872 \times 10^{-4}$ | $0.1160 \times 10^{-5}$ |
| 11 | $-0.1065 \times 10^{-3}$ | $0.1082 \times 10^{-4}$ |
| 12 | $0.9558 \times 10^{-6}$ | 0.0000 |
| 13 | $0.1354 \times 10^{-5}$ | 0.0000 |

TABLE 11

Lens Data (Zoom Ratio = 3.88)

| | Short Focal Length Extremity | Intermediate Focal Length Position | Long Focal Length Extremity |
|---|---|---|---|
| FNO. = | 2.6 | 3.7 | 6.0 |
| f = | 5.00 | 9.62 | 19.42 |
| w = | 39.8 | 22.9 | 11.6 |
| fB = | 0.59 | 0.59 | 0.59 |
| L = | 36.04 | 31.96 | 36.51 |
| D6 = | 14.737 | 5.722 | 0.949 |
| D11 = | 3.119 | 8.385 | 18.758 |
| D13 = | 2.980 | 2.652 | 1.601 |

TABLE 12

Lens Group Data of Zoom Lens System

| Lens Group | First Surf. No. | Focal Length |
|---|---|---|
| 1 | 1 | −13.75 |
| 2 | 7 | 10.11 |
| 3 | 12 | 16.91 |

Embodiment 4

Figure 13:
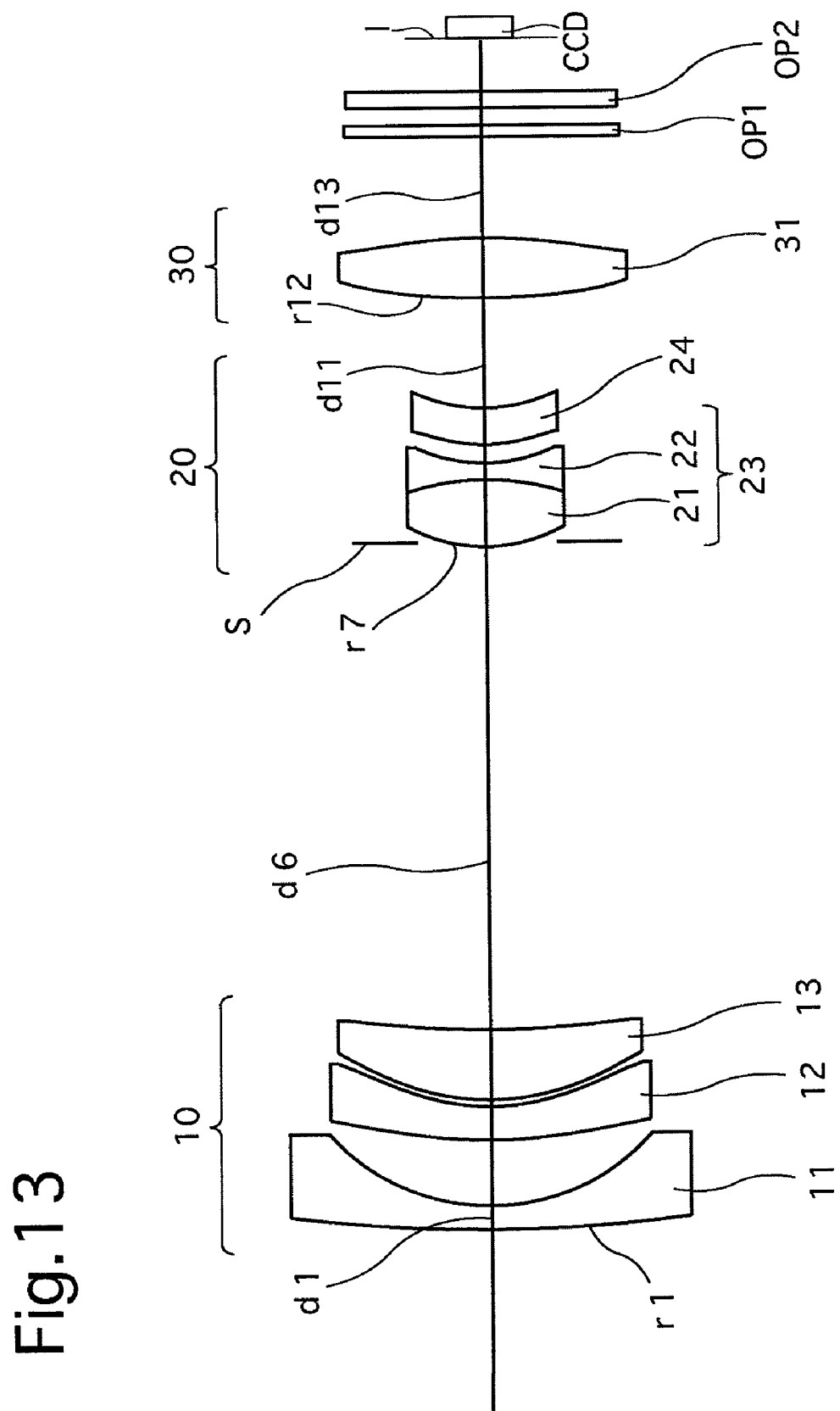
FIG. 13 shows a lens arrangement of a fourth embodiment of a zoom lens system according to the present invention.

FIG. 13 shows the lens arrangement of the fourth embodiment of a zoom lens system according to the present invention. FIGS. 14A through 14D show aberrations of the lens arrangement shown in FIG. 13 at the short focal length extremity when an object at infinity is in an in-focus state. FIGS. 15A through 15D show aberrations of the lens arrangement shown in FIG. 13 at an intermediate focal length position when an object at infinity is in an in-focus state. FIGS. 16A through 16D show aberrations of the lens arrangement shown in FIG. 13 at the long focal length extremity when an object at infinity is in an in-focus state.

Table 13 shows the lens-surface data of the zoom lens system, Table 14 shows the aspherical-surface data, Table 15 shows the data on the variable values according to zooming, and Table 16 shows lens-group data.

The basic lens arrangement of the fourth embodiment is the same as that of the first embodiment, and only the numerical data shown in Tables 13 through 16 differ.

The diaphragm S is provided at a position where the diaphragm S contacts surface No. 7, i.e., the front surface of the cemented lens (lens element 21) of the positive second lens group 20.

TABLE 13

Surface Data

| Surf. No. | r | d | Nd | ν |
|---|---|---|---|---|
| 1 | 68.030 | 0.700 | 1.69680 | 55.5 |
| 2 | 10.108 | 1.247 | | |
| 3* | 22.833 | 1.000 | 1.54358 | 55.7 |
| 4* | 5.719 | 0.853 | | |
| 5* | 5.926 | 2.100 | 1.60641 | 27.2 |
| 6* | 13.283 | D6 | | |
| 7 | 4.766 | 2.000 | 1.88300 | 40.8 |
| 8 | −7.426 | 0.500 | 1.76182 | 26.6 |
| 9 | 4.790 | 0.550 | | |
| 10* | 4.586 | 1.100 | 1.54358 | 55.7 |
| 11* | 4.908 | D11 | | |
| 12* | 19.160 | 1.800 | 1.54358 | 55.7 |
| 13* | −17.349 | D13 | | |
| 14 | ∞ | 0.350 | 1.51633 | 64.1 |
| 15 | ∞ | 0.510 | | |
| 16 | ∞ | 0.500 | 1.51633 | 64.1 |
| 17 | ∞ | — | | |

The symbol * designates the aspherical surface which is rotationally symmetrical with respect to the optical axis.

TABLE 14

Aspherical surface data (the aspherical surface coefficients not indicated are zero (0.00)):

| Surf. No. | K | A4 | A6 |
|---|---|---|---|
| 3 | 0.000 | $0.3855 \times 10^{-3}$ | $0.4537 \times 10^{-5}$ |
| 4 | 0.000 | $-0.6457 \times 10^{-3}$ | $0.5670 \times 10^{-4}$ |
| 5 | 0.000 | $-0.1039 \times 10^{-2}$ | $0.2796 \times 10^{-4}$ |
| 6 | 0.000 | $-0.3049 \times 10^{-3}$ | $-0.1155 \times 10^{-5}$ |
| 10 | 0.000 | $-0.3215 \times 10^{-2}$ | $-0.3050 \times 10^{-3}$ |
| 11 | 0.000 | $0.9505 \times 10^{-3}$ | $-0.9294 \times 10^{-4}$ |
| 12 | 0.000 | $0.5741 \times 10^{-3}$ | $-0.2488 \times 10^{-4}$ |
| 13 | 0.000 | $0.9255 \times 10^{-3}$ | $-0.4512 \times 10^{-4}$ |

| Surf. No. | A8 | A10 |
|---|---|---|
| 3 | $-0.3887 \times 10^{-6}$ | $0.4282 \times 10^{-8}$ |
| 4 | $-0.2031 \times 10^{-5}$ | 0.0000 |
| 5 | $-0.1046 \times 10^{-5}$ | 0.0000 |
| 6 | 0.0000 | 0.0000 |
| 10 | $-0.7334 \times 10^{-4}$ | $0.2029 \times 10^{-5}$ |
| 11 | $-0.1018 \times 10^{-3}$ | $0.1002 \times 10^{-4}$ |
| 12 | $0.1098 \times 10^{-5}$ | 0.0000 |
| 13 | $0.1552 \times 10^{-5}$ | 0.0000 |

TABLE 15

Lens Data (Zoom Ratio = 3.88)

| | Short Focal Length Extremity | Intermediate Focal Length Position | Long Focal Length Extremity |
|---|---|---|---|
| FNO. = | 2.7 | 3.7 | 5.9 |
| f = | 5.00 | 9.62 | 19.42 |
| W = | 39.8 | 22.9 | 11.6 |
| fB = | 0.59 | 0.59 | 0.59 |
| L = | 37.04 | 31.91 | 35.89 |

TABLE 15-continued

Lens Data (Zoom Ratio = 3.88)

| | Short Focal Length Extremity | Intermediate Focal Length Position | Long Focal Length Extremity |
|---|---|---|---|
| D6 = | 15.841 | 6.030 | 1.000 |
| D11 = | 3.112 | 7.966 | 18.076 |
| D13 = | 2.883 | 2.711 | 1.610 |

TABLE 16

Lens Group Data of Zoom Lens System

| Lens Group | First Surf. No. | Focal Length |
|---|---|---|
| 1 | 1 | −14.50 |
| 2 | 7 | 10.22 |
| 3 | 12 | 17.05 |

Embodiment 5

Figure 17:
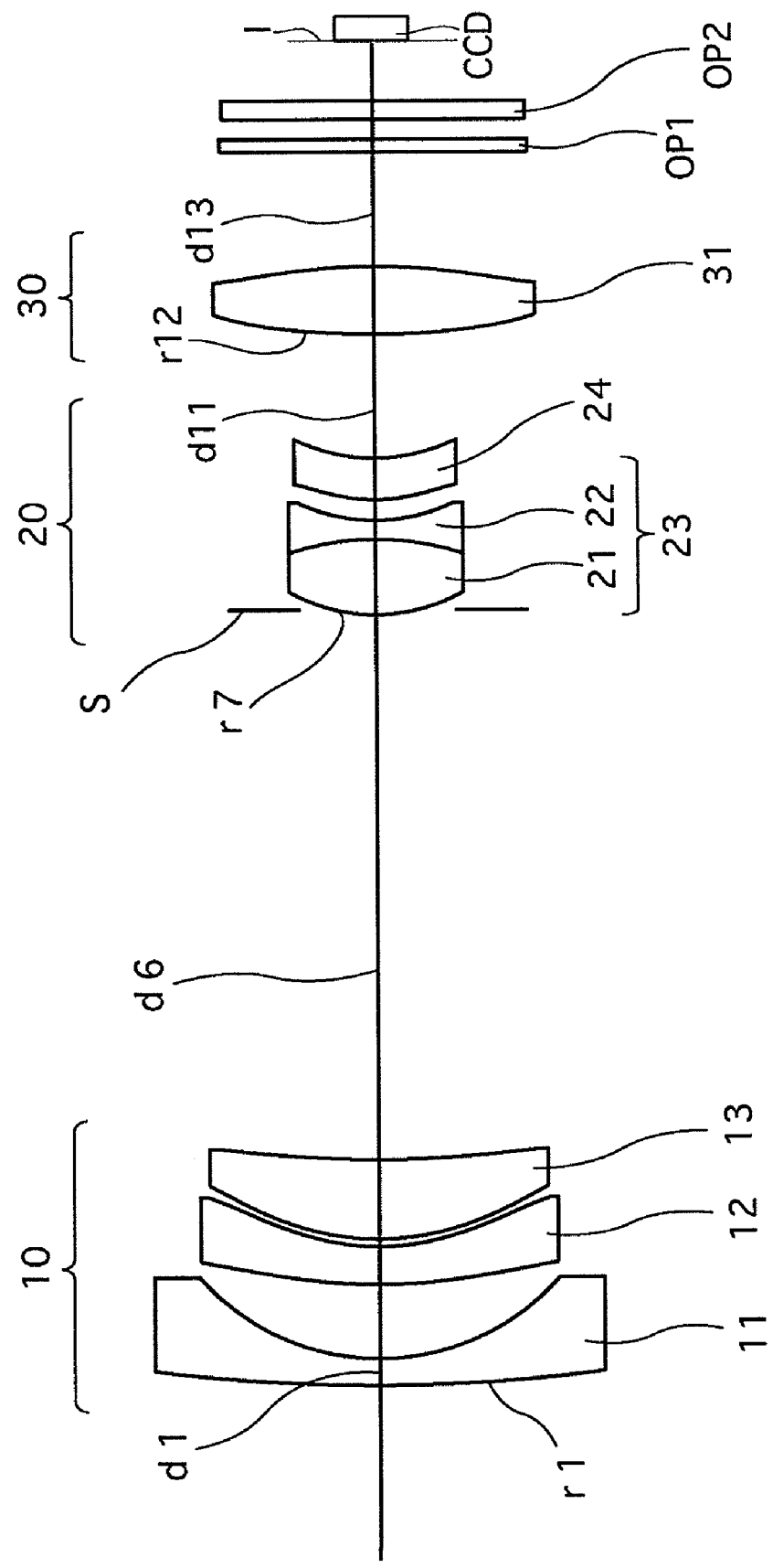
FIG. 17 shows a lens arrangement of a fifth embodiment of a zoom lens system according to the present invention.

FIG. 17 shows the lens arrangement of the fifth embodiment of a zoom lens system according to the present invention. FIGS. 18A through 18D show aberrations of the lens arrangement shown in FIG. 17 at the short focal length extremity when an object at infinity is in an in-focus state. FIGS. 19A through 19D show aberrations of the lens arrangement shown in FIG. 17 at an intermediate focal length position when an object at infinity is in an in-focus state. FIGS. 20A through 20D show aberrations of the lens arrangement shown in FIG. 17 at the long focal length extremity when an object at infinity is in an in-focus state.

Table 17 shows the lens-surface data of the zoom lens system, Table 18 shows the aspherical-surface data, Table 19 shows the data on the variable values according to zooming, and Table 20 shows lens-group data.

The basic lens arrangement of the fifth embodiment is the same as that of the first embodiment, and only the numerical data shown in Tables 17 through 20 differ.

The diaphragm S is provided at a position where the diaphragm S contacts surface No. 7, i.e., the front surface of the cemented lens (lens element 21) of the positive second lens group 20.

TABLE 17

Surface Data

| Surf. No. | r | d | Nd | ν |
|---|---|---|---|---|
| 1 | 38.097 | 0.700 | 1.71300 | 53.9 |
| 2 | 6.308 | 1.686 | | |
| 3* | 11.905 | 0.900 | 1.54358 | 55.7 |
| 4* | 6.168 | 0.414 | | |
| 5* | 6.919 | 2.200 | 1.60641 | 27.2 |
| 6* | 21.635 | D6 | | |
| 7 | 4.823 | 2.000 | 1.88300 | 40.8 |
| 8 | −7.571 | 0.500 | 1.76182 | 26.6 |
| 9 | 4.962 | 0.550 | | |
| 10* | 4.472 | 1.100 | 1.54358 | 55.7 |
| 11* | 4.612 | D11 | | |
| 12* | 23.130 | 1.800 | 1.54358 | 55.7 |
| 13* | −15.213 | D13 | | |
| 14 | ∞ | 0.350 | 1.51633 | 64.1 |
| 15 | ∞ | 0.510 | | |

TABLE 17-continued

Surface Data

| Surf. No. | r | d | Nd | ν |
|---|---|---|---|---|
| 16 | ∞ | 0.500 | 1.51633 | 64.1 |
| 17 | ∞ | — | | |

The symbol * designates the aspherical surface which is rotationally symmetrical with respect to the optical axis.

TABLE 18

Aspherical surface data (the aspherical surface coefficients not indicated are zero (0.00)):

| Surf. No. | K | A4 | A6 |
|---|---|---|---|
| 3 | 0.000 | $-0.3106 \times 10^{-3}$ | $0.2220 \times 10^{-4}$ |
| 4 | 0.000 | $-0.1331 \times 10^{-2}$ | $0.3417 \times 10^{-4}$ |
| 5 | 0.000 | $-0.7254 \times 10^{-3}$ | $0.4135 \times 10^{-5}$ |
| 6 | 0.000 | $-0.2969 \times 10^{-3}$ | $-0.5746 \times 10^{-5}$ |
| 10 | 0.000 | $-0.2886 \times 10^{-2}$ | $-0.3329 \times 10^{-3}$ |
| 11 | 0.000 | $0.1352 \times 10^{-2}$ | $-0.1541 \times 10^{-3}$ |
| 12 | 0.000 | $0.5950 \times 10^{-3}$ | $-0.2604 \times 10^{-4}$ |
| 13 | 0.000 | $0.1002 \times 10^{-2}$ | $-0.4480 \times 10^{-4}$ |

| Surf. No. | A8 | A10 |
|---|---|---|
| 3 | $-0.6500 \times 10^{-6}$ | $0.2771 \times 10^{-8}$ |
| 4 | $-0.1472 \times 10^{-5}$ | 0.0000 |
| 5 | $-0.3974 \times 10^{-6}$ | 0.0000 |
| 6 | 0.0000 | 0.0000 |
| 10 | $-0.5819 \times 10^{-4}$ | $0.1040 \times 10^{-5}$ |
| 11 | $-0.8629 \times 10^{-4}$ | $0.8181 \times 10^{-5}$ |
| 12 | $0.7132 \times 10^{-6}$ | 0.0000 |
| 13 | $0.1043 \times 10^{-5}$ | 0.0000 |

TABLE 19

Lens Data (Zoom Ratio = 3.88)

| | Short Focal Length Extremity | Intermediate Focal Length Position | Long Focal Length Extremity |
|---|---|---|---|
| FNO. = | 2.7 | 3.7 | 5.9 |
| f = | 5.00 | 9.62 | 19.42 |
| W = | 38.7 | 22.7 | 11.5 |
| fB = | 0.59 | 0.59 | 0.59 |
| L = | 36.54 | 32.23 | 36.71 |
| D6 = | 15.069 | 5.813 | 0.816 |
| D11 = | 3.250 | 8.539 | 18.882 |
| D13 = | 3.016 | 2.675 | 1.811 |

TABLE 20

Lens Group Data of Zoom Lens System

| Lens Group | First Surf. No. | Focal Length |
|---|---|---|
| 1 | 1 | -13.84 |
| 2 | 7 | 10.26 |
| 3 | 12 | 17.17 |

Embodiment 6

Figure 21:
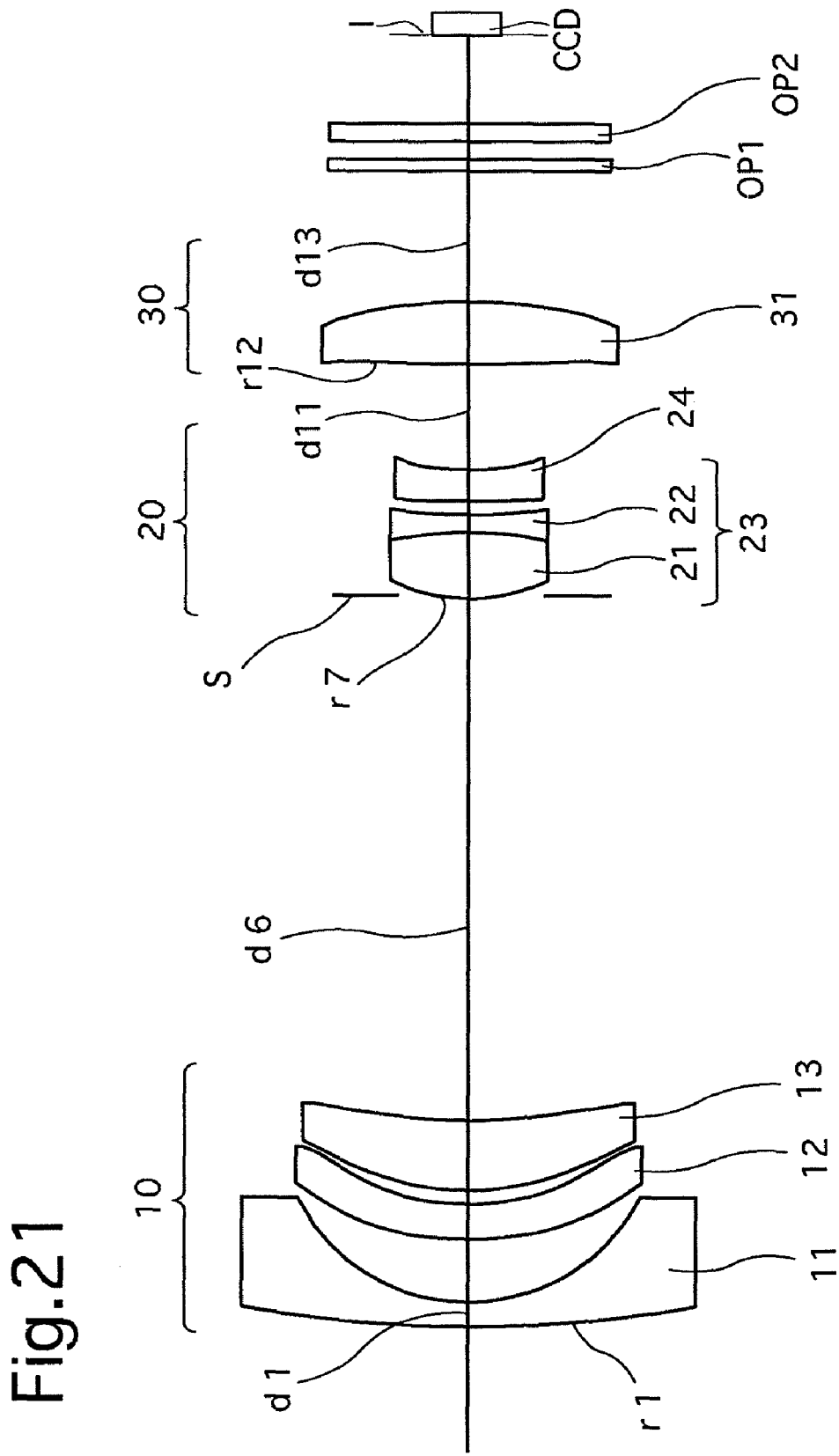
FIG. 21 shows a lens arrangement of a sixth embodiment of a zoom lens system according to the present invention.
Figure 22A:
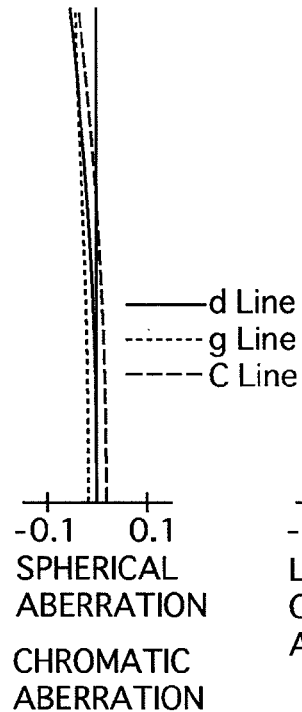
FIGS. 22A, 22B, 22C and 22D show aberrations of the lens arrangement shown in FIG. 21 at the short focal length extremity when an object at infinity is in an in-focus state.
Figure 22B:
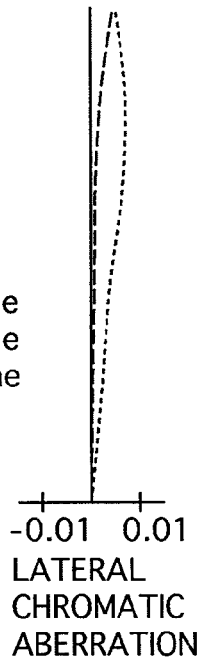
Figure 22C:
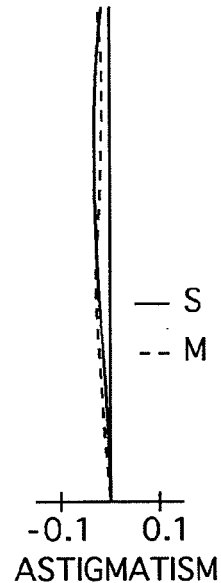
Figure 22D:
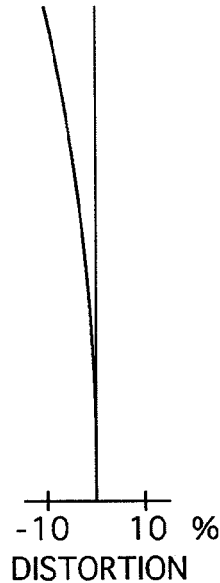
Figure 23A:
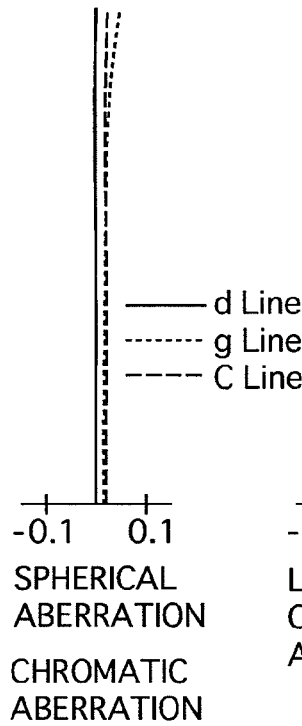
FIGS. 23A, 23B, 23C and 23D show aberrations of the lens arrangement shown in FIG. 21 at an intermediate focal length position when an object at infinity is in an in-focus state.
Figure 23B:
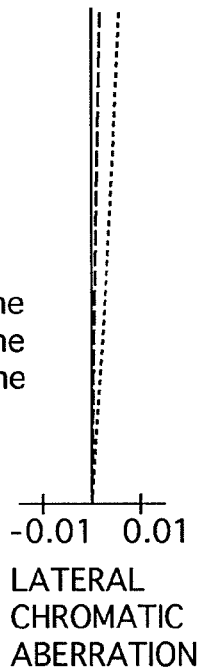
Figure 23C:
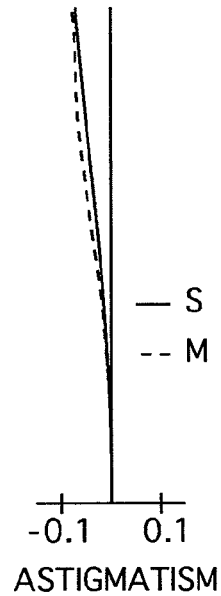
Figure 23D:
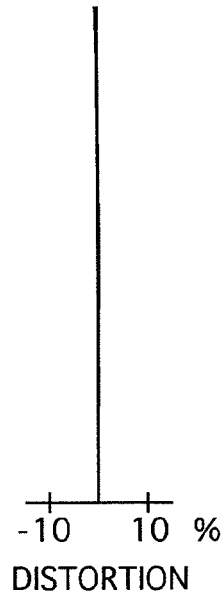

FIG. 21 shows the lens arrangement of the sixth embodiment of a zoom lens system according to the present invention. FIGS. 22A through 22D show aberrations of the lens arrangement shown in FIG. 21 at the short focal length extremity when an object at infinity is in an in-focus state. FIGS. 23A through 23D show aberrations of the lens arrangement shown in FIG. 21 at an intermediate focal length position when an object at infinity is in an in-focus state. FIGS. 24A through 24D show aberrations of the lens arrangement shown in FIG. 21 at the long focal length extremity when an object at infinity is in an in-focus state.

Table 21 shows the lens-surface data of the zoom lens system, Table 22 shows the aspherical-surf ace data, Table 23 shows the data on the variable values according to zooming, and Table 24 shows lens-group data.

The basic lens arrangement of the sixth embodiment is the same as that of the first embodiment, and only the numerical data shown in Tables 21 through 24 differ.

The diaphragm S is provided at a position where the diaphragm S contacts surface No. 7, i.e., the front surface of the cemented lens (lens element 21) of the positive second lens group 20.

TABLE 21

Surface Data

| Surf. No. | r | d | Nd | ν |
|---|---|---|---|---|
| 1 | 63.734 | 0.700 | 1.64000 | 60.2 |
| 2 | 9.260 | 0.953 | | |
| 3* | 16.000 | 0.900 | 1.54358 | 55.7 |
| 4* | 5.982 | 1.147 | | |
| 5* | 6.380 | 2.200 | 1.60641 | 27.2 |
| 6* | 11.603 | D6 | | |
| 7 | 4.771 | 2.000 | 1.88300 | 40.8 |
| 8 | -7.508 | 0.500 | 1.74077 | 27.8 |
| 9 | 4.174 | 0.218 | | |
| 10* | 4.126 | 1.100 | 1.54358 | 55.7 |
| 11* | 5.030 | D11 | | |
| 12* | 19.891 | 1.800 | 1.54358 | 55.7 |
| 13* | -14.999 | D13 | | |
| 14 | ∞ | 0.350 | 1.51633 | 64.1 |
| 15 | ∞ | 0.510 | | |
| 16 | ∞ | 0.500 | 1.51633 | 64.1 |
| 17 | ∞ | — | | |

The symbol * designates the aspherical surface which is rotationally symmetrical with respect to the optical axis.

TABLE 22

Aspherical surface data (the aspherical surface coefficients not indicated are zero (0.00)):

| Surf. No. | K | A4 | A6 |
|---|---|---|---|
| 3 | 0.000 | $0.1006 \times 10^{-2}$ | $-0.2516 \times 10^{-4}$ |
| 4 | 0.000 | $0.3805 \times 10^{-3}$ | $0.3170 \times 10^{-4}$ |
| 5 | 0.000 | $-0.9179 \times 10^{-3}$ | $0.4467 \times 10^{-4}$ |
| 6 | 0.000 | $-0.6248 \times 10^{-3}$ | $0.2167 \times 10^{-4}$ |
| 10 | 0.000 | $-0.2206 \times 10^{-2}$ | $-0.2499 \times 10^{-3}$ |
| 11 | 0.000 | $0.2396 \times 10^{-2}$ | $-0.6754 \times 10^{-6}$ |
| 12 | 0.000 | $0.4901 \times 10^{-3}$ | $-0.2937 \times 10^{-4}$ |
| 13 | 0.000 | $0.9244 \times 10^{-3}$ | $-0.4765 \times 10^{-4}$ |

| Surf. No. | A8 | A10 |
|---|---|---|
| 3 | $0.3418 \times 10^{-6}$ | $-0.3173 \times 10^{-8}$ |
| 4 | $-0.1575 \times 10^{-5}$ | 0.0000 |
| 5 | $-0.1329 \times 10^{-5}$ | $0.1286 \times 10^{-8}$ |
| 6 | $-0.6199 \times 10^{-6}$ | 0.0000 |
| 10 | $-0.7006 \times 10^{-4}$ | $0.1612 \times 10^{-6}$ |
| 11 | $-0.9791 \times 10^{-4}$ | $0.7753 \times 10^{-5}$ |
| 12 | $0.1214 \times 10^{-5}$ | 0.0000 |
| 13 | $0.1605 \times 10^{-5}$ | 0.0000 |

TABLE 23

Lens Data (Zoom Ratio = 3.88)

|  | Short Focal Length Extremity | Intermediate Focal Length Position | Long Focal Length Extremity |
|---|---|---|---|
| FNO. = | 2.7 | 3.7 | 5.9 |
| f = | 5.00 | 9.62 | 19.42 |
| W = | 38.7 | 22.6 | 11.4 |
| fB = | 0.59 | 0.59 | 0.59 |
| L = | 36.54 | 31.98 | 36.14 |
| D6 = | 15.481 | 6.085 | 1.000 |
| D11 = | 3.249 | 8.415 | 18.454 |
| D13 = | 2.941 | 2.610 | 1.813 |

TABLE 24

Lens Group Data of Zoom Lens System

| Lens Group | First Surf. No. | Focal Length |
|---|---|---|
| 1 | 1 | −14.54 |
| 2 | 7 | 10.22 |
| 3 | 12 | 16.02 |

Embodiment 7

FIG. 25 shows the lens arrangement of the seventh embodiment of a zoom lens system according to the present invention. FIGS. 26A through 26D show aberrations of the lens arrangement shown in FIG. 25 at the short focal length extremity when an object at infinity is in an in-focus state. FIGS. 27A through 27D show aberrations of the lens arrangement shown in FIG. 25 at an intermediate focal length position when an object at infinity is in an in-focus state. FIGS. 28A through 28D show aberrations of the lens arrangement shown in FIG. 25 at the long focal length extremity when an object at infinity is in an in-focus state.

Table 25 shows the lens-surface data of the zoom lens system, Table 26 shows the aspherical-surface data, Table 27 shows the data on the variable values according to zooming, and Table 28 shows lens-group data.

The basic lens arrangement of the seventh embodiment is the same as that of the first embodiment except that in the positive second lens group 20, the meniscus lens element having the concave surface facing toward the image is provided with a negative refractive power.

The diaphragm S is provided at a position where the diaphragm S contacts surface No. 7, i.e., the front surface of the cemented lens (lens element 21) of the positive second lens group 20.

TABLE 25

Surface Data

| Surf. No. | r | d | Nd | ν |
|---|---|---|---|---|
| 1 | 37.618 | 0.700 | 1.61800 | 63.4 |
| 2 | 5.563 | 1.804 | | |
| 3* | 12.000 | 1.000 | 1.54358 | 55.7 |
| 4* | 8.016 | 0.388 | | |
| 5* | 7.295 | 2.000 | 1.60641 | 27.2 |
| 6* | 13.624 | D6 | | |
| 7 | 5.103 | 1.900 | 1.88300 | 40.8 |
| 8 | −10.734 | 0.500 | 1.84666 | 23.8 |
| 9 | 15.048 | 0.400 | | |
| 10* | 200.000 | 0.900 | 1.60641 | 27.2 |
| 11* | 11.145 | D11 | | |
| 12* | 49.550 | 1.800 | 1.54358 | 55.7 |
| 13* | −15.075 | D13 | | |
| 14 | ∞ | 0.350 | 1.51633 | 64.1 |
| 15 | ∞ | 0.510 | | |
| 16 | ∞ | 0.500 | 1.51633 | 64.1 |
| 17 | ∞ | — | | |

The symbol * designates the aspherical surface which is rotationally symmetrical with respect to the optical axis.

TABLE 26

Aspherical surface data (the aspherical surface coefficients not indicated are zero (0.00)):

| Surf. No. | K | A4 | A6 | A8 |
|---|---|---|---|---|
| 3 | 0.000 | $0.1948 \times 10^{-2}$ | $-0.6276 \times 10^{-4}$ | $0.7502 \times 10^{-6}$ |
| 4 | 0.000 | $0.1680 \times 10^{-2}$ | $-0.2414 \times 10^{-4}$ | $-0.1921 \times 10^{-5}$ |
| 5 | 0.000 | $-0.7892 \times 10^{-3}$ | $0.4118 \times 10^{-4}$ | $-0.1602 \times 10^{-5}$ |
| 6 | 0.000 | $-0.9165 \times 10^{-3}$ | $0.7586 \times 10^{-5}$ | $0.3065 \times 10^{-6}$ |
| 10 | 0.000 | $0.3573 \times 10^{-2}$ | $-0.4299 \times 10^{-4}$ | $-0.1717 \times 10^{-4}$ |
| 11 | 0.000 | $0.7537 \times 10^{-2}$ | $0.2240 \times 10^{-3}$ | $-0.5621 \times 10^{-5}$ |
| 12 | 0.000 | $-0.4639 \times 10^{-4}$ | $-0.9596 \times 10^{-5}$ | $-0.8985 \times 10^{-6}$ |
| 13 | 0.000 | $0.2784 \times 10^{-3}$ | $-0.2713 \times 10^{-4}$ | $-0.3906 \times 10^{-6}$ |

TABLE 27

Lens Data (Zoom Ratio = 3.88)

|  | Short Focal Length Extremity | Intermediate Focal Length Position | Long Focal Length Extremity |
|---|---|---|---|
| FNO. = | 2.7 | 3.7 | 6.0 |
| f = | 5.00 | 9.62 | 19.41 |
| W = | 38.7 | 22.8 | 11.5 |
| fB = | 0.59 | 0.59 | 0.59 |
| L = | 36.54 | 31.93 | 36.52 |
| D6 = | 14.973 | 5.555 | 0.969 |
| D11 = | 3.034 | 7.917 | 18.989 |
| D13 = | 3.794 | 3.715 | 1.823 |

TABLE 28

Lens Group Data of Zoom Lens System

| Lens Group | First Surf. No. | Focal Length |
|---|---|---|
| 1 | 1 | −13.30 |
| 2 | 7 | 10.11 |
| 3 | 12 | 21.47 |

Embodiment 8

Figure 29:
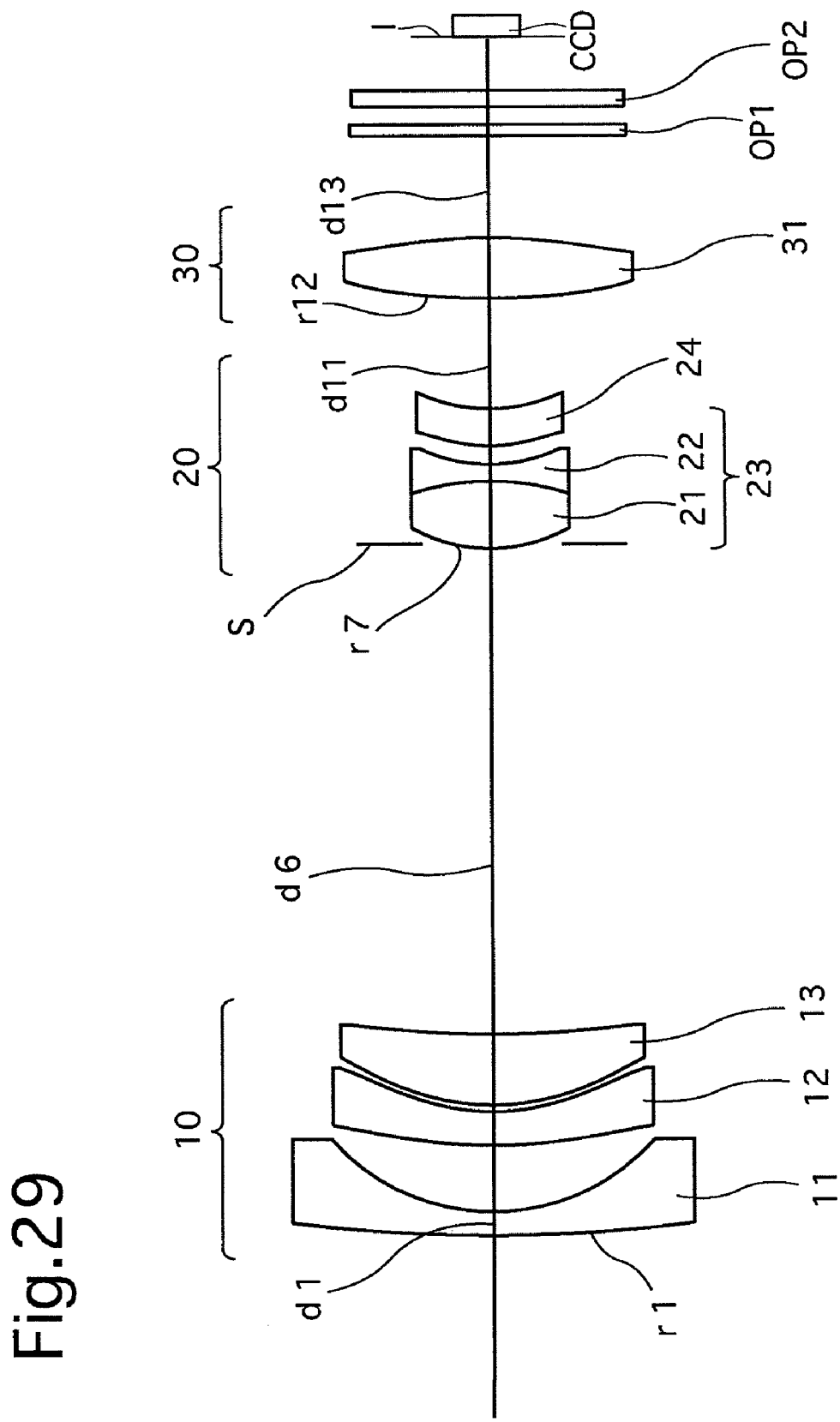
FIG. 29 shows a lens arrangement of an eighth embodiment of a zoom lens system according to the present invention.
Figure 30A:
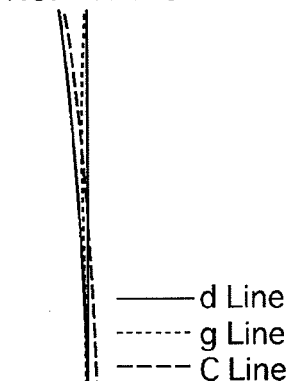
FIGS. 30A, 30B, 30C and 30D show aberrations of the lens arrangement shown in FIG. 29 at the short focal length extremity when an object at infinity is in an in-focus state.
Figure 30B:
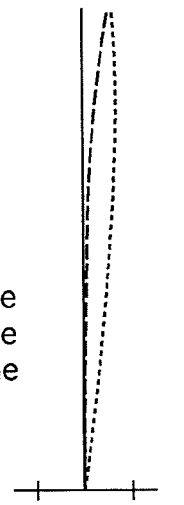
Figure 30C:
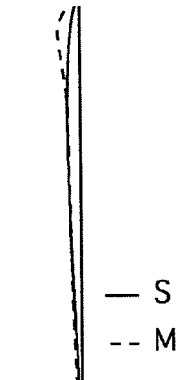
Figure 30D:
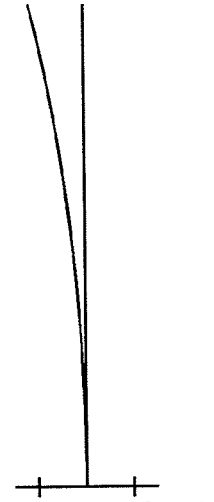
Figure 31A:
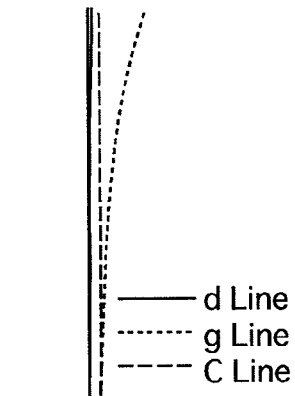
FIGS. 31A, 31B, 31C and 31D show aberrations of the lens arrangement shown in FIG. 29 at an intermediate focal length position when an object at infinity is in an in-focus state.
Figure 31B:
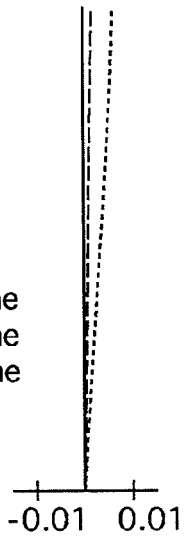
Figure 31C:
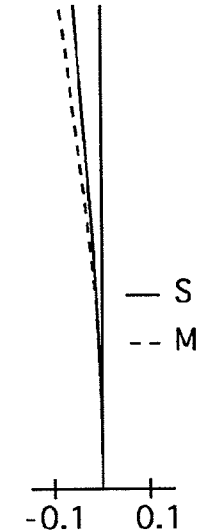
Figure 31D:
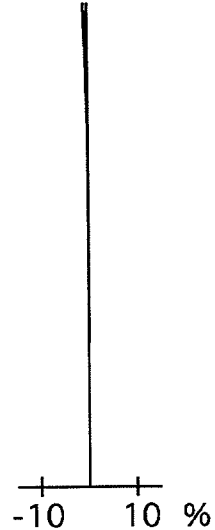

FIG. 29 shows the lens arrangement of the eighth embodiment of a zoom lens system according to the present invention. FIGS. 30A through 30D show aberrations of the lens arrangement shown in FIG. 29 at the short focal length extremity when an object at infinity is in an in-focus state. FIGS. 31A through 31D show aberrations of the lens arrangement shown in FIG. 29 at an intermediate focal length position when an object at infinity is in an in-focus state. FIGS. 32A through 32D show aberrations of the lens arrangement shown in FIG. 29 at the long focal length extremity when an object at infinity is in an in-focus state.

Table 29 shows the lens-surface data of the zoom lens system, Table 30 shows the aspherical-surface data, Table 31 shows the data on the variable values according to zooming, and Table 32 shows lens-group data.

The basic lens arrangement of the eighth embodiment is the same as that of the first embodiment and only the numerical data shown in Tables 29 through 32 differ.

The diaphragm S is provided at a position where the diaphragm S contacts surface No. 7, i.e., the front surface of the cemented lens (lens element 21) of the positive second lens group 20.

TABLE 29

Surface Data

| Surf. No. | r | d | Nd | ν |
|---|---|---|---|---|
| 1 | 67.936 | 0.700 | 1.71300 | 53.9 |
| 2 | 6.998 | 1.551 | | |
| 3* | 11.905 | 0.900 | 1.54358 | 55.7 |
| 4* | 6.059 | 0.549 | | |
| 5* | 6.963 | 2.200 | 1.60641 | 27.2 |
| 6* | 21.709 | D6 | | |
| 7 | 4.861 | 2.000 | 1.88300 | 40.8 |
| 8 | −7.772 | 0.500 | 1.76182 | 26.6 |
| 9 | 4.920 | 0.550 | | |
| 10* | 4.359 | 1.100 | 1.54358 | 55.7 |
| 11* | 4.558 | D11 | | |
| 12* | 28.646 | 1.900 | 1.54358 | 55.7 |
| 13* | −13.323 | D13 | | |
| 14 | ∞ | 0.350 | 1.51633 | 64.1 |
| 15 | ∞ | 0.510 | | |
| 16 | ∞ | 0.500 | 1.51633 | 64.1 |
| 17 | ∞ | — | | |

The symbol * designates the aspherical surface which is rotationally symmetrical with respect to the optical axis.

TABLE 30

Aspherical surface data (the aspherical surface coefficients not indicated are zero (0.00)):

| Surf. No. | K | A4 | A6 |
|---|---|---|---|
| 3 | 0.000 | −0.3106 × 10$^{-3}$ | 0.2220 × 10$^{-4}$ |
| 4 | 0.000 | −0.1223 × 10$^{-2}$ | 0.4536 × 10$^{-4}$ |
| 5 | 0.000 | −0.6219 × 10$^{-3}$ | 0.1581 × 10$^{-4}$ |
| 6 | 0.000 | −0.2584 × 10$^{-3}$ | 0.1054 × 10$^{-5}$ |
| 10 | 0.000 | −0.2668 × 10$^{-2}$ | −0.3241 × 10$^{-3}$ |
| 11 | 0.000 | 0.1534 × 10$^{-2}$ | −0.1814 × 10$^{-3}$ |
| 12 | 0.000 | 0.6196 × 10$^{-3}$ | −0.1516 × 10$^{-4}$ |
| 13 | 0.000 | 0.1049 × 10$^{-2}$ | −0.2768 × 10$^{-4}$ |

| Surf. No. | A8 | A10 |
|---|---|---|
| 3 | −0.6500 × 10$^{-6}$ | 0.2771 × 10$^{-8}$ |
| 4 | −0.1917 × 10$^{-5}$ | 0.0000 |
| 5 | −0.6449 × 10$^{-6}$ | 0.0000 |
| 6 | 0.0000 | 0.0000 |
| 10 | −0.6194 × 10$^{-4}$ | 0.1882 × 10$^{-5}$ |
| 11 | −0.8794 × 10$^{-4}$ | 0.8495 × 10$^{-5}$ |
| 12 | 0.7013 × 10$^{-6}$ | 0.0000 |
| 13 | 0.9258 × 10$^{-6}$ | 0.0000 |

TABLE 31

Lens Data (Zoom Ratio = 3.88)

| | Short Focal Length Extremity | Intermediate Focal Length | Long Focal Length Extremity |
|---|---|---|---|
| FNO. = | 2.6 | 3.7 | 5.9 |
| f = | 5.00 | 9.62 | 19.41 |
| W = | 39.9 | 22.6 | 11.5 |
| fB = | 0.59 | 0.59 | 0.59 |
| L = | 37.03 | 32.66 | 37.03 |
| D6 = | 15.422 | 6.031 | 0.919 |
| D11 = | 3.152 | 8.588 | 18.981 |
| D13 = | 3.158 | 2.744 | 1.830 |

TABLE 32

Lens Group Data of Zoom Lens System

| Lens Group | First Surf. No. | Focal Length |
|---|---|---|
| 1 | 1 | −14.05 |
| 2 | 7 | 10.44 |
| 3 | 12 | 17.00 |

Embodiment 9

Figure 33:
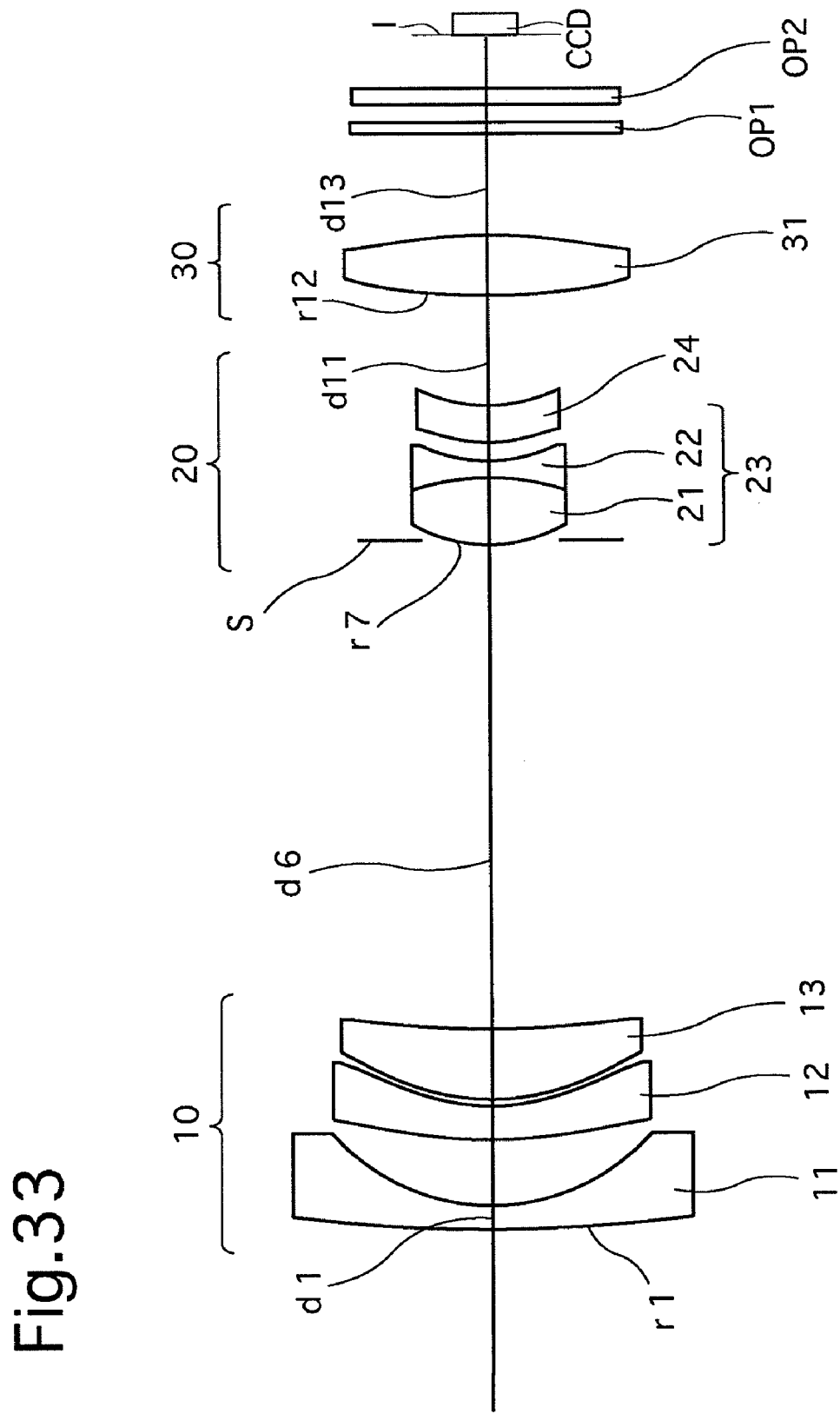
FIG. 33 shows a lens arrangement of a ninth embodiment of a zoom lens system according to the present invention.
Figure 36A:
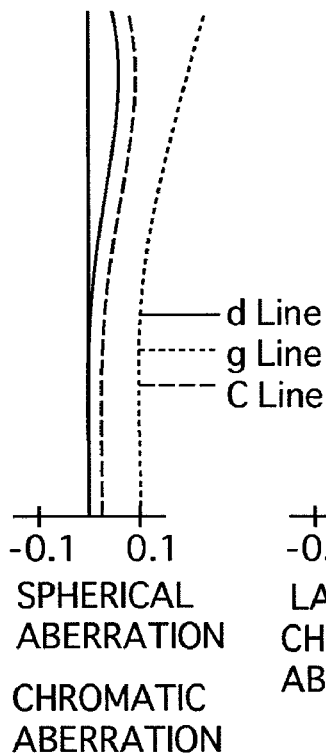
FIGS. 36A, 36B, 36C and 36D show aberrations of the lens arrangement shown in FIG. 33 at the long focal length extremity when an object at infinity is in an in-focus state.
Figure 36B:
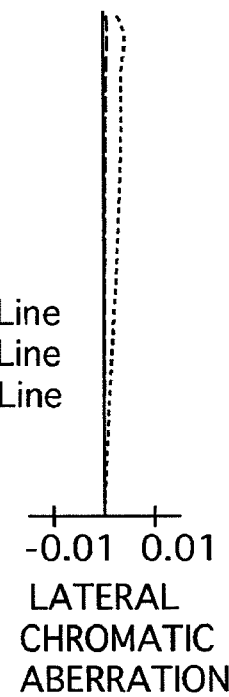
Figure 36C:
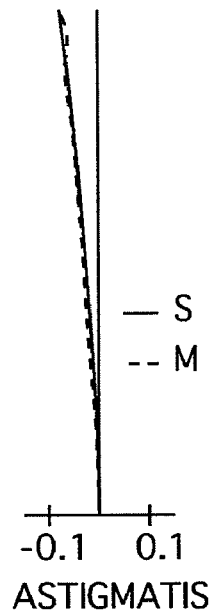
Figure 36D:
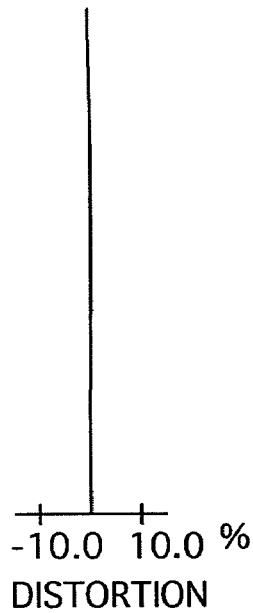

FIG. 33 shows the lens arrangement of the ninth embodiment of a zoom lens system according to the present invention. FIGS. 34A through 34D show aberrations of the lens arrangement shown in FIG. 33 at the short focal length extremity when an object at infinity is in an in-focus state. FIGS. 35A through 35D show aberrations of the lens arrangement shown in FIG. 33 at an intermediate focal length position when an object at infinity is in an in-focus state. FIGS. 36A through 36D show aberrations of the lens arrangement shown in FIG. 33 at the long focal length extremity when an object at infinity is in an in-focus state.

Table 33 shows the lens-surface data of the zoom lens system, Table 34 shows the aspherical-surface data, Table 35 shows the data on the variable values according to zooming, and Table 36 shows lens-group data.

The basic lens arrangement of the ninth embodiment is the same as that of the second embodiment and only the numerical data shown in Tables 33 through 36 differ. The diaphragm S is provided at a position where the diaphragm S contacts surface No. 7, i.e., the front surface of the cemented lens (lens element 21) of the positive second lens group 20.

TABLE 33

Surface Data

| Surf. No. | r | d | Nd | ν |
|---|---|---|---|---|
| 1 | 30.044 | 0.700 | 1.72000 | 50.3 |
| 2 | 7.065 | 2.571 | | |
| 3* | 27.380 | 1.000 | 1.54358 | 55.7 |
| 4* | 12.456 | 0.200 | | |
| 5 | 9.467 | 1.500 | 1.94594 | 18.0 |
| 6 | 12.991 | D6 | | |
| 7 | 4.719 | 1.800 | 1.88300 | 40.8 |
| 8 | −7.863 | 0.600 | 1.76182 | 26.6 |
| 9 | 4.741 | 0.550 | | |
| 10* | 4.014 | 1.100 | 1.54358 | 55.7 |
| 11* | 4.308 | D11 | | |
| 12* | 43.104 | 1.800 | 1.54358 | 55.7 |
| 13* | −11.461 | D13 | | |
| 14 | ∞ | 0.350 | 1.51633 | 64.1 |

TABLE 33-continued

Surface Data

| Surf. No. | r | d | Nd | ν |
|---|---|---|---|---|
| 15 | ∞ | 0.510 | | |
| 16 | ∞ | 0.500 | 1.51633 | 55.7 |
| 17 | ∞ | — | | |

The symbol * designates the aspherical surface which is rotationally symmetrical with respect to the optical axis.

TABLE 34

Aspherical surface data (the aspherical surface coefficients not indicated are zero (0.00)):

| Surf. No. | K | A4 | A6 |
|---|---|---|---|
| 3 | 0.000 | $-0.7896 \times 10^{-3}$ | $0.2251 \times 10^{-4}$ |
| 4 | 0.000 | $-0.9238 \times 10^{-3}$ | $0.2759 \times 10^{-4}$ |
| 10 | 0.000 | $-0.3010 \times 10^{-2}$ | $-0.3940 \times 10^{-3}$ |
| 11 | 0.000 | $0.1504 \times 10^{-2}$ | $-0.9286 \times 10^{-4}$ |
| 12 | 0.000 | $0.5870 \times 10^{-3}$ | $-0.2874 \times 10^{-4}$ |
| 13 | 0.000 | $0.1085 \times 10^{-2}$ | $-0.4917 \times 10^{-4}$ |

| Surf. No. | A8 | A10 |
|---|---|---|
| 3 | $-0.3171 \times 10^{-6}$ | $-0.1611 \times 10^{-8}$ |
| 4 | $-0.4950 \times 10^{-6}$ | 0.0000 |
| 10 | $-0.6527 \times 10^{-4}$ | $0.2043 \times 10^{-7}$ |
| 11 | $-0.1479 \times 10^{-3}$ | $0.1371 \times 10^{-4}$ |
| 12 | $0.6167 \times 10^{-6}$ | 0.0000 |
| 13 | $0.9812 \times 10^{-6}$ | 0.0000 |

TABLE 35

Lens Data (Zoom Ratio = 3.88)

| | Short Focal Length Extremity | Intermediate Focal Length | Long Focal Length Extremity |
|---|---|---|---|
| FNO. = | 2.7 | 3.7 | 5.9 |
| f = | 5.00 | 9.62 | 19.42 |
| W = | 39.9 | 22.8 | 11.6 |
| fB = | 0.59 | 0.59 | 0.59 |
| L = | 36.04 | 31.71 | 35.64 |
| D6 = | 14.890 | 5.867 | 0.995 |
| D11 = | 3.000 | 8.107 | 17.929 |
| D13 = | 2.977 | 2.563 | 1.550 |

TABLE 36

Lens Group Data of Zoom Lens System

| Lens Group | First Surf. No. | Focal Length |
|---|---|---|
| 1 | 1 | -13.89 |
| 2 | 7 | 9.90 |
| 3 | 12 | 16.85 |

Embodiment 10

Figure 37:
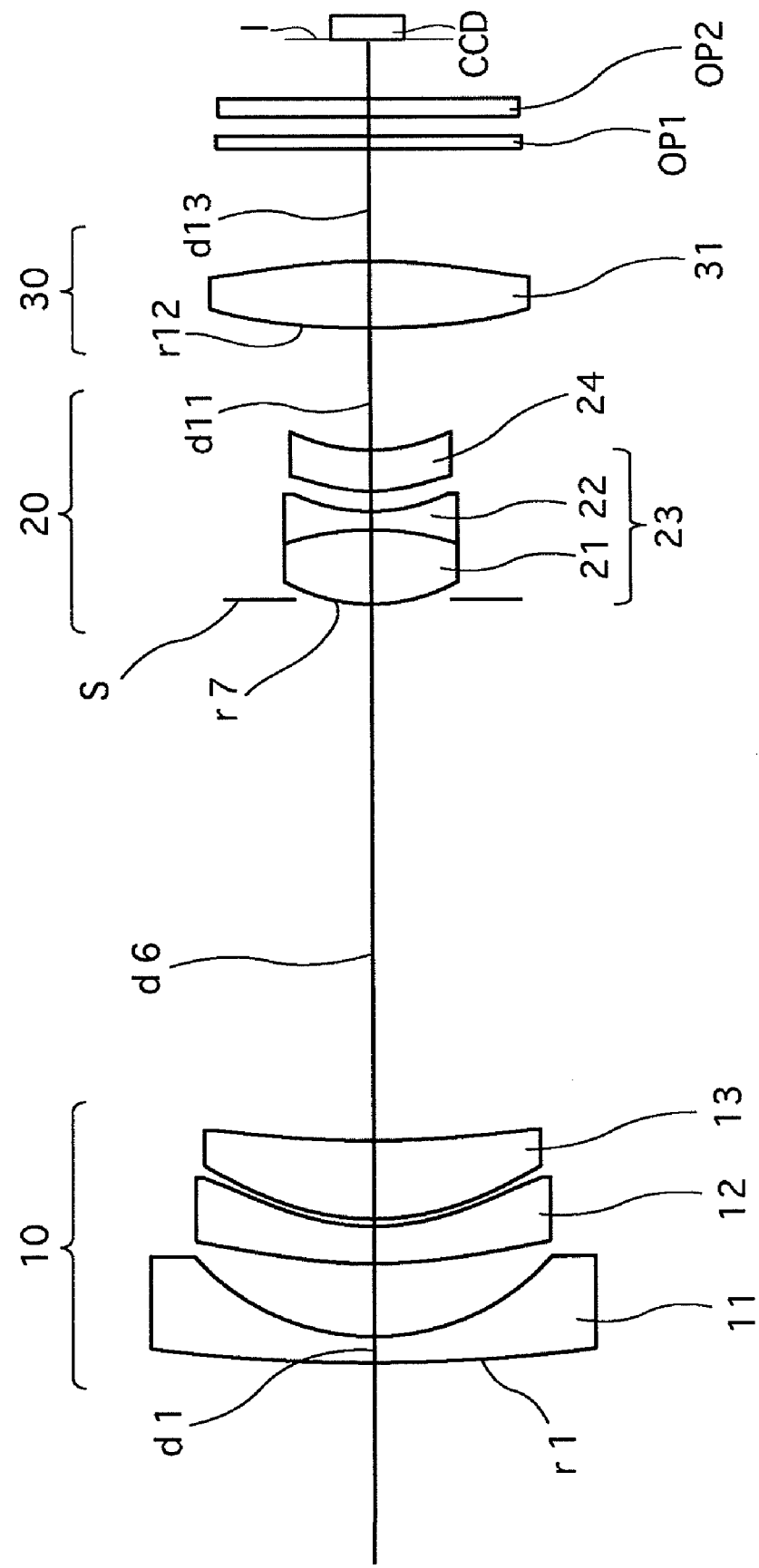
FIG. 37 shows a lens arrangement of a tenth embodiment of a zoom lens system according to the present invention.

FIG. 37 shows the lens arrangement of the tenth embodiment of a zoom lens system according to the present invention. FIGS. 38A through 38D show aberrations of the lens arrangement shown in FIG. 37 at the short focal length extremity when an object at infinity is in an in-focus state. FIGS. 39A through 39D show aberrations of the lens arrangement shown in FIG. 37 at an intermediate focal length position when an object at infinity is in an in-focus state. FIGS. 40A through 40D show aberrations of the lens arrangement shown in FIG. 37 at the long focal length extremity when an object at infinity is in an in-focus state.

Table 37 shows the lens-surface data of the zoom lens system, Table 38 shows the aspherical-surface data, Table 39 shows the data on the variable values according to zooming, and Table 40 shows lens-group data.

The basic lens arrangement of the tenth embodiment is the same as that of the first embodiment and only the numerical data shown in Tables 37 through 40 differ.

The diaphragm S is provided at a position where the diaphragm S contacts surface No. 7, i.e., the front surface of the cemented lens (lens element 21) of the positive second lens group 20.

TABLE 37

Surface Data

| Surf. No. | r | d | Nd | ν |
|---|---|---|---|---|
| 1 | 37.028 | 0.700 | 1.71300 | 53.9 |
| 2 | 6.443 | 1.769 | | |
| 3* | 11.672 | 0.900 | 1.54358 | 55.7 |
| 4* | 6.159 | 0.486 | | |
| 5* | 6.721 | 2.200 | 1.60641 | 27.2 |
| 6* | 16.211 | D6 | | |
| 7 | 4.886 | 2.000 | 1.88300 | 40.8 |
| 8 | -8.499 | 0.500 | 1.76182 | 26.6 |
| 9 | 5.019 | 0.711 | | |
| 10* | 4.748 | 1.100 | 1.54358 | 55.7 |
| 11* | 5.509 | D11 | | |
| 12* | 17.952 | 1.800 | 1.54358 | 55.7 |
| 13* | -36.133 | D13 | | |
| 14 | ∞ | 0.350 | 1.51633 | 64.1 |
| 15 | ∞ | 0.510 | | |
| 16 | ∞ | 0.500 | 1.51633 | 55.7 |
| 17 | ∞ | — | | |

The symbol * designates the aspherical surface which is rotationally symmetrical with respect to the optical axis.

TABLE 38

Aspherical surface data (the aspherical surface coefficients not indicated are zero (0.00)):

| Surf. No. | K | A4 | A6 |
|---|---|---|---|
| 3 | 0.000 | $-0.3745 \times 10^{-3}$ | $0.2216 \times 10^{-4}$ |
| 4 | 0.000 | $-0.1287 \times 10^{-2}$ | $0.3475 \times 10^{-4}$ |
| 5 | 0.000 | $-0.6656 \times 10^{-3}$ | $0.5393 \times 10^{-5}$ |
| 6 | 0.000 | $-0.2304 \times 10^{-3}$ | $-0.6080 \times 10^{-5}$ |
| 10 | 0.000 | $-0.2577 \times 10^{-2}$ | $-0.3048 \times 10^{-3}$ |
| 11 | 0.000 | $0.1295 \times 10^{-2}$ | $-0.9968 \times 10^{-4}$ |
| 12 | 0.000 | $0.6674 \times 10^{-3}$ | $-0.2151 \times 10^{-4}$ |
| 13 | 0.000 | $0.9647 \times 10^{-3}$ | $-0.3374 \times 10^{-4}$ |

| Surf. No. | A8 | A10 |
|---|---|---|
| 3 | $-0.6238 \times 10^{-6}$ | $0.5114 \times 10^{-8}$ |
| 4 | $-0.1393 \times 10^{-5}$ | 0.0000 |
| 5 | $-0.5194 \times 10^{-6}$ | 0.0000 |
| 6 | 0.0000 | 0.0000 |
| 10 | $-0.4118 \times 10^{-4}$ | $-0.1786 \times 10^{-6}$ |
| 11 | $-0.7221 \times 10^{-4}$ | $0.6361 \times 10^{-5}$ |
| 12 | $0.9254 \times 10^{-6}$ | 0.0000 |
| 13 | $0.1151 \times 10^{-5}$ | 0.0000 |

TABLE 39

Lens Data (Zoom Ratio = 3.88)

|  | Short Focal Length Extremity | Intermediate Focal Length Position | Long Focal Length Extremity |
|---|---|---|---|
| FNO. = | 2.7 | 3.7 | 6.0 |
| f = | 5.00 | 9.62 | 19.42 |
| W = | 39.9 | 22.9 | 11.5 |
| fB = | 0.59 | 0.59 | 0.59 |
| L = | 36.55 | 32.22 | 36.63 |
| D6 = | 14.875 | 5.733 | 0.992 |
| D11 = | 2.871 | 8.024 | 18.706 |
| D13 = | 3.292 | 2.952 | 1.413 |

TABLE 40

Lens Group Data of Zoom Lens System

| Lens Group | First Surf. No. | Focal Length |
|---|---|---|
| 1 | 1 | −13.10 |
| 2 | 7 | 10.00 |
| 3 | 12 | 22.33 |

Embodiment 11

Figure 41:
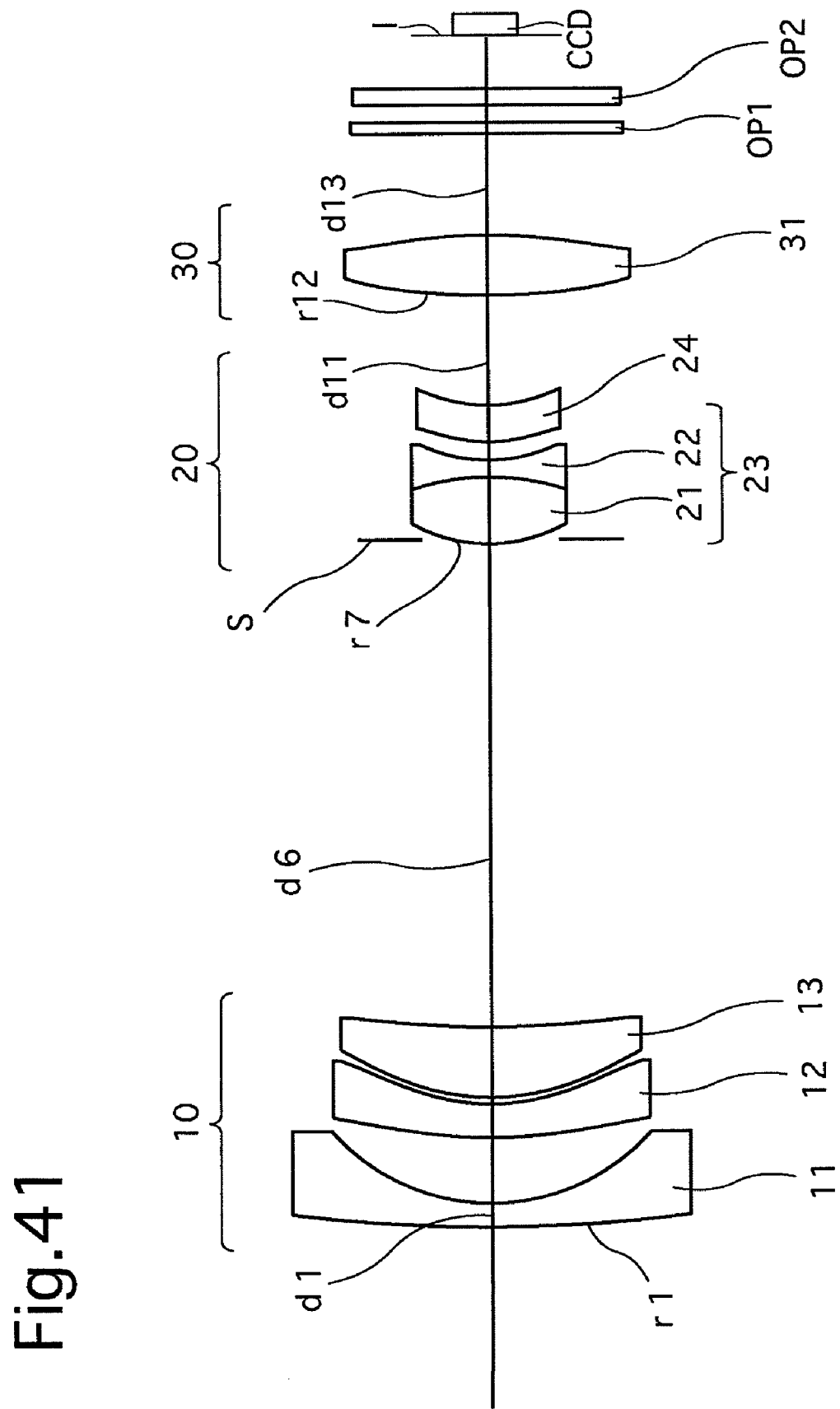
FIG. 41 shows a lens arrangement of an eleventh embodiment of a zoom lens system according to the present invention.
Figure 42A:
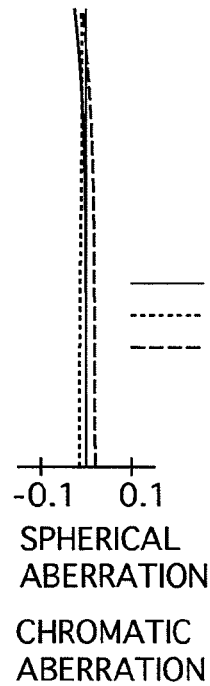
FIGS. 42A, 42B, 42C and 42D show aberrations of the lens arrangement shown in FIG. 41 at the short focal length extremity when an object at infinity is in an in-focus state.
Figure 42B:
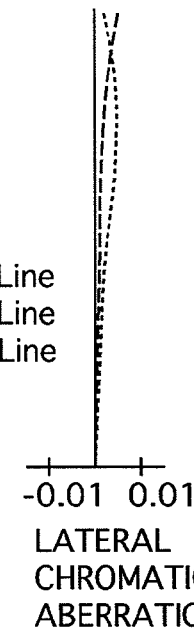
Figure 42C:
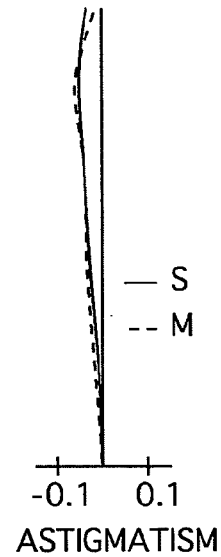
Figure 42D:
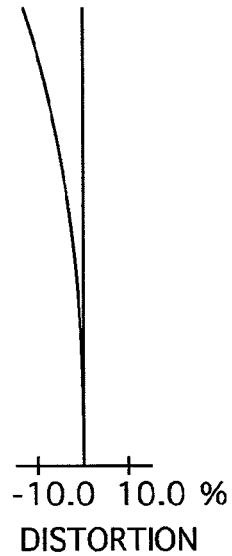
Figure 43A:
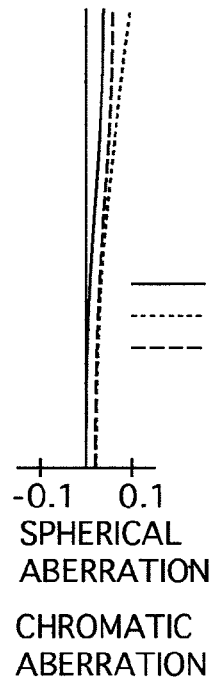
FIGS. 43A, 43B, 43C and 43D show aberrations of the lens arrangement shown in FIG. 41 at an intermediate focal length position when an object at infinity is in an in-focus state.
Figure 43B:
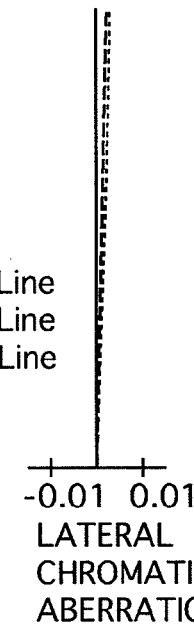
Figure 43C:
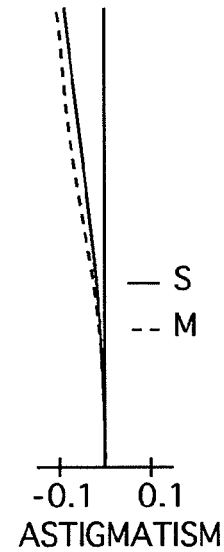
Figure 43D:
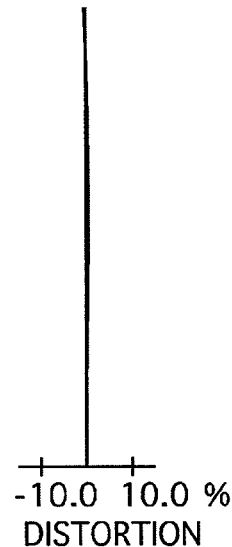
Figure 48A:
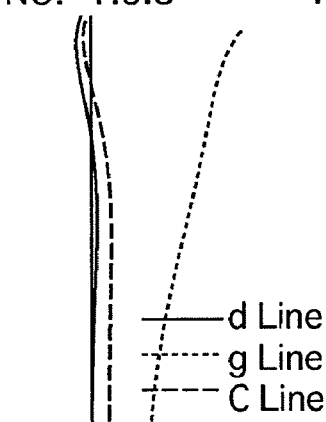
FIGS. 48A, 48B, 48C and 48D show aberrations of the lens arrangement shown in FIG. 45 at the long focal length extremity when an object at infinity is in an in-focus state.
Figure 48B:
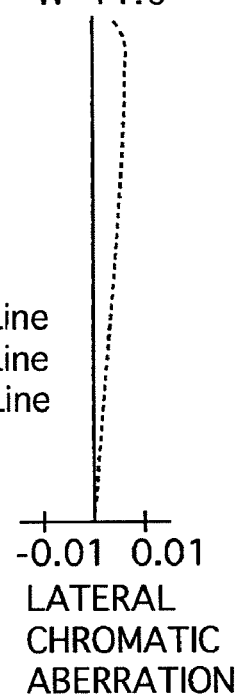
Figure 48C:
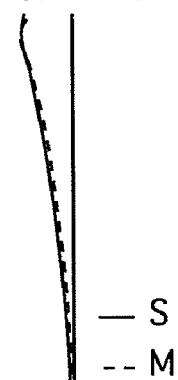
Figure 48D:
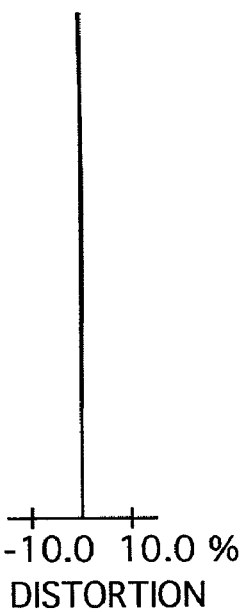

FIG. 41 shows the lens arrangement of the eleventh embodiment of a zoom lens system according to the present invention. FIGS. 42A through 42D show aberrations of the lens arrangement shown in FIG. 41 at the short focal length extremity when an object at infinity is in an in-focus state. FIGS. 43A through 43D show aberrations of the lens arrangement shown in FIG. 41 at an intermediate focal length position when an object at infinity is in an in-focus state. FIGS. 44A through 44D show aberrations of the lens arrangement shown in FIG. 41 at the long focal length extremity when an object at infinity is in an in-focus state.

Table 41 shows the lens-surface data of the zoom lens system, Table 42 shows the aspherical-surface data, Table 43 shows the data on the variable values according to zooming, and Table 44 shows lens-group data.

The basic lens arrangement of the tenth embodiment is the same as that of the first embodiment except that the negative lens element (the negative meniscus lens element) 11 of the negative first lens group 10 is a biconcave negative lens element 11.

The diaphragm S is provided at a position where the diaphragm S contacts surface No. 7, i.e., the front surface of the cemented lens (lens element 21) of the positive second lens group 20.

TABLE 41

Surface Data

| Surf. No. | r | d | Nd | ν |
|---|---|---|---|---|
| 1 | −170.949 | 0.700 | 1.64000 | 60.2 |
| 2 | 10.784 | 0.444 | | |
| 3* | 13.915 | 0.900 | 1.54358 | 55.7 |
| 4* | 6.051 | 1.306 | | |
| 5* | 7.057 | 2.200 | 1.60641 | 27.2 |
| 6* | 13.480 | D6 | | |
| 7 | 4.797 | 2.000 | 1.88300 | 40.8 |
| 8 | −7.325 | 0.500 | 1.74077 | 27.8 |
| 9 | 4.297 | 0.164 | | |
| 10* | 4.149 | 1.100 | 1.54358 | 55.7 |
| 11* | 4.788 | D11 | | |

TABLE 41-continued

Surface Data

| Surf. No. | r | d | Nd | ν |
|---|---|---|---|---|
| 12* | 23.259 | 1.800 | 1.54358 | 55.7 |
| 13* | −11.921 | D13 | | |
| 14 | ∞ | 0.350 | 1.51633 | 64.1 |
| 15 | ∞ | 0.510 | | |
| 16 | ∞ | 0.500 | 1.51633 | 55.7 |
| 17 | ∞ | — | | |

The symbol * designates the aspherical surface which is rotationally symmetrical with respect to the optical axis.

TABLE 42

Aspherical surface data (the aspherical surface coefficients not indicated are zero (0.00)):

| Surf. No. | K | A4 | A6 |
|---|---|---|---|
| 3 | 0.000 | $0.9963 \times 10^{-3}$ | $-0.2554 \times 10^{-4}$ |
| 4 | 0.000 | $0.3428 \times 10^{-3}$ | $0.2967 \times 10^{-4}$ |
| 5 | 0.000 | $-0.8426 \times 10^{-3}$ | $0.4634 \times 10^{-4}$ |
| 6 | 0.000 | $-0.6056 \times 10^{-3}$ | $0.2143 \times 10^{-4}$ |
| 10 | 0.000 | $-0.2354 \times 10^{-2}$ | $-0.2696 \times 10^{-3}$ |
| 11 | 0.000 | $0.2210 \times 10^{-2}$ | $0.7862 \times 10^{-4}$ |
| 12 | 0.000 | $0.5234 \times 10^{-3}$ | $-0.2642 \times 10^{-4}$ |
| 13 | 0.000 | $0.1135 \times 10^{-2}$ | $-0.4950 \times 10^{-4}$ |

| Surf. No. | A8 | A10 |
|---|---|---|
| 3 | $0.3308 \times 10^{-6}$ | $-0.3143 \times 10^{-8}$ |
| 4 | $-0.1584 \times 10^{-5}$ | 0.0000 |
| 5 | $-0.1317 \times 10^{-5}$ | $0.2016 \times 10^{-8}$ |
| 6 | $-0.6433 \times 10^{-6}$ | 0.0000 |
| 10 | $-0.4764 \times 10^{-4}$ | $-0.2013 \times 10^{-5}$ |
| 11 | $-0.1067 \times 10^{-3}$ | $0.8766 \times 10^{-5}$ |
| 12 | $0.1165 \times 10^{-5}$ | 0.0000 |
| 13 | $0.1635 \times 10^{-5}$ | 0.0000 |

TABLE 43

Lens Data (Zoom Ratio = 3.88)

|  | Short Focal Length Extremity | Intermediate Focal Length Position | Long Focal Length Extremity |
|---|---|---|---|
| FNO. = | 2.7 | 3.7 | 5.9 |
| f = | 5.00 | 9.62 | 19.42 |
| W = | 39.6 | 22.5 | 11.4 |
| fB = | 0.59 | 0.59 | 0.59 |
| L = | 36.52 | 31.95 | 36.12 |
| D6 = | 15.630 | 6.209 | 1.000 |
| D11 = | 3.741 | 8.911 | 18.857 |
| D13 = | 2.688 | 2.364 | 1.796 |

TABLE 44

Lens Group Data of Zoom Lens System

| Lens Group | First Surf. No. | Focal Length |
|---|---|---|
| 1 | 1 | −14.58 |
| 2 | 7 | 10.28 |
| 3 | 12 | 14.76 |

Embodiment 12

FIG. 45 shows the lens arrangement of the twelfth embodiment of a zoom lens system according to the present invention. FIGS. 46A through 46D show aberrations of the lens arrangement shown in FIG. 45 at the short focal length extremity when an object at infinity is in an in-focus state. FIGS. 47A through 47D show aberrations of the lens arrangement shown in FIG. 45 at an intermediate focal length position when an object at infinity is in an in-focus state. FIGS. 48A through 48D show aberrations of the lens arrangement shown in FIG. 45 at the long focal length extremity when an object at infinity is in an in-focus state.

Table 45 shows the lens-surface data of the zoom lens system, Table 46 shows the aspherical-surface data, Table 47 shows the data on the variable values according to zooming, and Table 48 shows lens-group data.

The basic lens arrangement of the tenth embodiment is the same as that of the first embodiment except that the meniscus lens element 24, of the positive second lens group 20, has a negative refractive power.

The diaphragm S is provided at a position where the diaphragm S contacts surface No. 7, i.e., the front surface of the cemented lens (lens element 21) of the positive second lens group 20.

TABLE 45

Surface Data

| Surf. No. | r | d | Nd | ν |
|---|---|---|---|---|
| 1 | 29.371 | 0.700 | 1.61800 | 63.4 |
| 2 | 5.852 | 1.800 | | |
| 3* | 12.000 | 1.000 | 1.54358 | 55.7 |
| 4* | 7.453 | 0.460 | | |
| 5* | 6.077 | 2.000 | 1.60641 | 27.2 |
| 6* | 8.929 | D6 | | |
| 7 | 5.359 | 1.900 | 1.88300 | 40.8 |
| 8 | −9.497 | 0.500 | 1.84666 | 23.8 |
| 9 | 22.152 | 0.400 | | |
| 10* | 200.000 | 0.900 | 1.60641 | 27.2 |
| 11* | 10.633 | D11 | | |
| 12* | 49.550 | 1.800 | 1.54358 | 55.7 |
| 13* | −14.133 | D13 | | |
| 14 | ∞ | 0.350 | 1.51633 | 64.1 |
| 15 | ∞ | 0.510 | | |
| 16 | ∞ | 0.500 | 1.51633 | 55.7 |
| 17 | ∞ | — | | |

The symbol * designates the aspherical surface which is rotationally symmetrical with respect to the optical axis.

TABLE 46

Aspherical surface data (the aspherical surface coefficients not indicated are zero (0.00)):

| Surf. No. | K | A4 | A6 | A8 |
|---|---|---|---|---|
| 3 | 0.000 | $0.1316 \times 10^{-2}$ | $-0.3179 \times 10^{-4}$ | $0.3822 \times 10^{-6}$ |
| 4 | 0.000 | $0.1163 \times 10^{-2}$ | $0.4664 \times 10^{-5}$ | $-0.9154 \times 10^{-6}$ |
| 5 | 0.000 | $-0.8606 \times 10^{-3}$ | $0.3269 \times 10^{-4}$ | $-0.1394 \times 10^{-5}$ |
| 6 | 0.000 | $-0.9417 \times 10^{-3}$ | $0.6230 \times 10^{-5}$ | $-0.4551 \times 10^{-6}$ |
| 10 | 0.000 | $0.3269 \times 10^{-2}$ | $-0.3587 \times 10^{-4}$ | $-0.1852 \times 10^{-4}$ |
| 11 | 0.000 | $0.6755 \times 10^{-2}$ | $0.2505 \times 10^{-3}$ | $-0.1878 \times 10^{-4}$ |
| 12 | 0.000 | $0.5430 \times 10^{-4}$ | $-0.1411 \times 10^{-4}$ | $-0.6304 \times 10^{-6}$ |
| 13 | 0.000 | $0.3553 \times 10^{-3}$ | $-0.3169 \times 10^{-4}$ | $-0.1580 \times 10^{-6}$ |

TABLE 47

Lens Data (Zoom Ratio = 3.88)

| | Short Focal Length Extremity | Intermediate Focal Length Position | Long Focal Length Extremity |
|---|---|---|---|
| FNO. = | 2.7 | 3.6 | 5.8 |
| f = | 5.00 | 9.62 | 19.41 |
| W = | 40.1 | 23.0 | 11.6 |
| fB = | 0.59 | 0.59 | 0.59 |
| L = | 36.57 | 31.95 | 36.50 |
| D6 = | 14.821 | 5.621 | 1.072 |
| D11 = | 3.911 | 8.410 | 18.818 |
| D13 = | 3.023 | 3.112 | 1.800 |

TABLE 48

Lens Group Data of Zoom Lens System

| Lens Group | First Surf. No. | Focal Length |
|---|---|---|
| 1 | 1 | −12.90 |
| 2 | 7 | 9.74 |
| 3 | 12 | 20.43 |

The numerical values of each condition for each embodiment are shown in Table 33.

TABLE 49

| | Cond. (1) | Cond. (2) | Cond. (3) | Cond. (4) | Cond. (5) | Cond. (6) |
|---|---|---|---|---|---|---|
| Embod. 1 | 0.214 | 0.892 | 0.479 | 0.059 | 1.117 | 0.426 |
| Embod. 2 | 0.289 | 0.891 | 0.083 | 0.007 | 1.132 | — |
| Embod. 3 | 0.213 | 0.870 | 0.691 | 0.029 | 1.117 | 0.296 |
| Embod. 4 | 0.215 | 0.878 | 1.195 | 0.018 | 1.107 | 0.054 |
| Embod. 5 | 0.172 | 0.884 | 0.429 | 0.057 | 1.100 | 0.429 |
| Embod. 6 | 0.498 | 0.825 | 0.937 | 0.032 | 1.103 | 0.240 |
| Embod. 7 | −0.388 | 1.106 | 0.219 | −0.047 | 1.125 | 0.244 |
| Embod. 8 | 0.206 | 0.876 | 0.458 | 0.069 | 1.113 | 0.434 |
| Embod. 9 | 0.272 | 0.868 | 0.302 | −0.136 | 1.120 | — |
| Embod. 10 | 0.306 | 1.150 | 0.434 | 0.044 | 1.113 | 0.444 |
| Embod. 11 | 0.396 | 0.760 | 0.771 | 0.077 | 1.089 | 0.236 |
| Embod. 12 | −0.391 | 1.053 | 0.305 | −0.102 | 1.079 | 0.371 |

As can be understood from Table 49, all the embodiments except the sixth embodiment satisfy both condition (1) and condition (2); and, condition (6) is not calculated with respect to the second and ninth embodiments, since the lens arrangements of these embodiments are different from those of other embodiments. Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a positive second lens group and a positive third lens group, in this order from an object,
   wherein upon zooming from the short focal length extremity to the long focal length extremity, each of said negative first lens group, said positive second lens group and said positive third lens group is moved along the optical axis of said zoom lens system;

wherein said negative first lens group comprises a negative first lens element, a negative second lens element, and a positive third lens element, in this order from the object;

wherein said positive second lens group comprises a cemented lens comprising a positive first lens element and a negative second lens element in this order from the object, and a meniscus lens element having the concave surface facing toward the image, in this order from the object; and wherein said zoom lens system satisfies the following conditions:

$$-0.4 < f23/f24 < 0.4$$

$$0.7 < f3/ft < 1.3$$

wherein f23 designates the combined focal length of the cemented lens of said positive second lens group;

f24 designates the focal length of said meniscus lens element, of said positive second lens group, having the concave surface facing toward the image;

f3 designates the focal length of said positive third lens group; and ft designates the focal length of the entire zoom lens system at the long focal length extremity.

2. The zoom lens system according to claim 1, satisfying the following conditions:

$$0.3 < f11/f12 < 1.3$$

$$-0.14 < (R15-R14)/(R15+R14) < 0.14$$

wherein f11 designates the focal length of said negative first lens element of said negative first lens group;

f12 designates the focal length of said negative second lens element of said negative first lens group;

R14 designates the radius of curvature of the image-side surface of said negative second lens element of said negative first lens group; and R15 designates the radius of curvature of the object-side surface of said positive third lens element of said negative first lens group.

3. The zoom lens system according to claim 1, satisfying the following condition:

$$1.05 < \beta 3t/\beta 3w < 1.3$$

wherein $\beta 3t$ designates the lateral magnification of said positive third lens group at the long focal length extremity when an object at infinity is in an in-focus state; and $\beta 3w$ designates the lateral magnification of said positive third lens group at the short focal length extremity when an object at infinity is in an in-focus state.

4. The zoom lens system according to claim 1, wherein said negative second lens element and said positive third lens element, in said negative first lens group, are made of resin, and each of said negative second lens element and said positive third lens element respectively has at least one aspherical surface;

wherein said meniscus lens element having the concave surface facing toward the image, in said positive second lens group, is made of resin, and has at least one aspherical surface; and wherein said resin lens elements satisfy the following condition:

$$|f1/f1p - f2/f2p| < 0.6$$

wherein f1 designates the focal length of said negative first lens group;

f1p designates the combined focal length of said resin lens elements in said negative first lens group;

f2 designates the focal length of said positive second lens group; and f2p designates the combined focal length of said resin lens element in said positive second lens group.

5. The zoom lens system according to claim 1, wherein said positive third lens group comprises a resin lens element having at least one aspherical surface, and moves along the optical axis when focusing from infinity to an object at a closer distance is performed.

6. An electronic imaging device comprising said zoom lens system according to claim 1.

7. A zoom lens system comprises a negative first lens group, a positive second lens group and a positive third lens group, in this order from the object, wherein upon zooming from the short focal length extremity to the long focal length extremity, each of said first lens group, said second lens group and said third lens group is moved along the optical axis thereof;

wherein said negative first lens group comprises a negative first lens element, a negative second lens element, and a positive third lens element, in this order from the object;

wherein said positive second lens group comprises a cemented lens comprising a positive first lens element and a negative second lens element, and a meniscus lens element having the concave surface facing toward the image, in this order from the object; and wherein said zoom lens system satisfies the following conditions:

$$0.3 < f11/f12 < 1.3$$

$$-0.14 < (R15-R14)/(R15+R14) < 0.14$$

wherein f11 designates the focal length of said negative first lens element of said negative first lens group;

f12 designates the focal length of said negative second lens element of said negative first lens group;

R14 designates the radius of curvature of the image-side surface of said negative second lens element of said negative first lens group; and R15 designates the radius of curvature of the object-side surface of said positive third lens element of said negative first lens group.

8. An electronic imaging device comprising said zoom lens system according to claim 7.

* * * * *